(12) United States Patent
Bambrogan et al.

(10) Patent No.: US 9,517,901 B2
(45) Date of Patent: Dec. 13, 2016

(54) TRANSPORTATION SYSTEM

(71) Applicant: HYPERLOOP TECHNOLOGIES, INC., Los Angeles, CA (US)

(72) Inventors: Brogan Bambrogan, Los Angeles, CA (US); Joshua Giegel, Hawthorne, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/007,452

(22) Filed: Jan. 27, 2016

(65) Prior Publication Data

US 2016/0229417 A1    Aug. 11, 2016

Related U.S. Application Data

(60) Provisional application No. 62/113,511, filed on Feb. 8, 2015.

(51) Int. Cl.
*B61B 13/10* (2006.01)
*B65G 67/60* (2006.01)
*B63B 27/28* (2006.01)
*B23K 31/02* (2006.01)
*B23P 15/20* (2006.01)
(Continued)

(52) U.S. Cl.
CPC ........... *B65G 67/603* (2013.01); *B23K 31/027* (2013.01); *B23P 11/025* (2013.01); *B23P 15/20* (2013.01); *B60L 13/06* (2013.01); *B61B 1/02* (2013.01); *B61B 13/08* (2013.01); *B61B 13/10* (2013.01); *B61L 19/00* (2013.01); *B61L 23/002* (2013.01); *B63B 27/28* (2013.01); *B63B 38/00* (2013.01); *B65G 67/24* (2013.01); *B66C 25/00* (2013.01); *E01B 2/003* (2013.01); *E02D 29/04* (2013.01); *E02D 29/063* (2013.01); *B60L 2200/26* (2013.01)

(58) Field of Classification Search
CPC .............. B61B 13/10; F16K 3/30; F16K 3/03; F16K 3/12
USPC .................................. 104/138.1, 138.2, 140
See application file for complete search history.

(56) References Cited

U.S. PATENT DOCUMENTS 131,322 A    9/1872    Anderson
2,296,771 A    9/1942    Crawford et al.
(Continued)

FOREIGN PATENT DOCUMENTS

EP          2371613       10/2011
WO    WO03002370 A1      1/2003
(Continued)

OTHER PUBLICATIONS

Musk, E., "Hyperloop White Paper," dated Aug. 12, 2013.
(Continued)

*Primary Examiner* — Jason C Smith
(74) *Attorney, Agent, or Firm* — Greenblum & Bernstein, P.L.C.

(57) ABSTRACT

A high-speed transportation system, includes at least one transportation tube having at least one track, at least one capsule configured for travel through the at least one tube between stations, a propulsion system adapted to propel the at least one capsule through the tube, a levitation system adapted to levitate the capsule within the tube. The at least one transportation tube is structured and arranged as a net-tension tube.

29 Claims, 64 Drawing Sheets

(51) Int. Cl.
  *B63B 38/00* (2006.01)
  *B65G 67/24* (2006.01)
  *B66C 25/00* (2006.01)
  *E01B 2/00* (2006.01)
  *E02D 29/00* (2006.01)
  *E02D 29/063* (2006.01)
  *B60L 13/06* (2006.01)
  *B61B 13/08* (2006.01)
  *B61L 19/00* (2006.01)
  *B23P 11/02* (2006.01)
  *B61B 1/02* (2006.01)
  *B61L 23/00* (2006.01)

(56) References Cited

U.S. PATENT DOCUMENTS

| | | | |
|---|---|---|---|
| 2,488,287 A | 11/1949 | Goddard | |
| 2,511,979 A | 6/1950 | Goddard | |
| 2,791,633 A | 9/1956 | Sindzinski | |
| 2,956,823 A | 10/1960 | Benjamin, Jr. et al. | |
| 3,006,288 A | 10/1961 | Brown | |
| 3,083,528 A | 4/1963 | Brown | |
| 3,100,454 A | 8/1963 | Dennis | |
| 3,132,416 A | 5/1964 | Hait | |
| 3,233,559 A | 2/1966 | Smith et al. | |
| 3,605,629 A | 9/1971 | Edwards | |
| 3,610,163 A | 10/1971 | Edwards | |
| 3,738,281 A | 6/1973 | Waidelich | |
| 3,750,803 A | 8/1973 | Paxton | |
| 3,768,417 A | 10/1973 | Thornton et al. | |
| 3,776,141 A | 12/1973 | Gelhard et al. | |
| 3,854,411 A | 12/1974 | Lichtenberg | |
| 3,952,667 A | 4/1976 | Kovanov et al. | |
| 3,954,064 A | 5/1976 | Minovitch | |
| 4,015,540 A | 4/1977 | Roxberry | |
| 4,023,500 A * | 5/1977 | Diggs | B65G 51/04 104/138.1 |
| 4,075,948 A | 2/1978 | Minovitch | |
| 4,108,077 A | 8/1978 | Laing | |
| 4,148,260 A | 4/1979 | Minovitch | |
| 4,175,414 A | 11/1979 | Peytavin | |
| 4,202,272 A | 5/1980 | Teodorescu et al. | |
| 4,400,655 A | 8/1983 | Curtiss et al. | |
| 4,427,740 A | 1/1984 | Stackhouse et al. | |
| 4,676,295 A | 6/1987 | Samuelson | |
| 4,718,459 A | 1/1988 | Adorjan | |
| 4,823,847 A | 4/1989 | Grosse et al. | |
| 4,881,469 A * | 11/1989 | Hirtz | E01B 25/12 104/138.1 |
| 5,146,853 A | 9/1992 | Suppes | |
| 5,282,424 A | 2/1994 | O'Neill | |
| 5,388,527 A | 2/1995 | Thornton et al. | |
| 5,619,930 A | 4/1997 | Alimanestiano | |
| 5,899,635 A | 5/1999 | Kuja et al. | |
| 5,950,543 A | 9/1999 | Oster | |
| 6,178,892 B1 * | 1/2001 | Harding | B60V 3/04 104/119 |
| 6,250,230 B1 | 6/2001 | Post | |
| 6,279,485 B1 * | 8/2001 | Schlienger | B60V 3/04 104/138.1 |
| 6,311,476 B1 | 11/2001 | Frye et al. | |
| 6,373,153 B1 | 4/2002 | Hazelton et al. | |
| 6,374,746 B1 | 4/2002 | Fiske | |
| 6,418,857 B1 | 7/2002 | Okano et al. | |
| 6,502,517 B1 | 1/2003 | Groening et al. | |
| 6,629,503 B2 | 10/2003 | Post | |
| 6,633,217 B2 | 10/2003 | Post | |
| 6,664,880 B2 | 12/2003 | Post | |
| 6,684,794 B2 | 2/2004 | Fiske et al. | |
| 6,758,146 B2 | 7/2004 | Post | |
| 7,096,794 B2 | 8/2006 | Post | |
| 7,114,882 B1 * | 10/2006 | Friedmann | E02D 27/50 405/194 |
| 7,478,598 B2 | 1/2009 | Post | |
| 7,762,938 B2 | 7/2010 | Gale | |
| 7,835,830 B2 | 11/2010 | Ellmann et al. | |
| 7,841,564 B2 | 11/2010 | Ellmann et al. | |
| 8,006,625 B2 | 8/2011 | Yang | |
| 8,192,341 B2 | 6/2012 | Gale | |
| 8,214,957 B2 | 7/2012 | Miettinen | |
| 8,250,990 B2 | 8/2012 | Kunz | |
| 8,281,723 B2 | 10/2012 | Loeser et al. | |
| 8,297,195 B2 | 10/2012 | Loser et al. | |
| 8,468,949 B2 * | 6/2013 | Kwon | B61B 13/08 104/155 |
| 8,500,373 B1 | 8/2013 | Epps | |
| 8,534,197 B2 | 9/2013 | Miller | |
| 8,578,860 B2 | 11/2013 | Post | |
| 8,585,565 B2 | 11/2013 | Gale | |
| 8,734,139 B2 | 5/2014 | Burns et al. | |
| 8,795,806 B2 | 8/2014 | Pflug et al. | |
| 8,915,192 B2 | 12/2014 | Zhou | |
| 8,917,086 B2 | 12/2014 | Post | |
| 8,985,030 B2 | 3/2015 | Post | |
| 9,085,304 B2 | 7/2015 | Oster | |
| 9,228,298 B2 | 1/2016 | Oster | |
| 9,254,759 B1 | 2/2016 | Henderson et al. | |
| 9,290,187 B2 | 3/2016 | Dalrymple | |
| 9,302,577 B2 | 4/2016 | Catalan | |
| 2001/0037747 A1 | 11/2001 | Svensson | |
| 2002/0197135 A1 | 12/2002 | Arntzen et al. | |
| 2004/0056538 A1 | 3/2004 | Du et al. | |
| 2004/0139723 A1 | 7/2004 | Parkin | |
| 2004/0144096 A1 | 7/2004 | Wollenweber | |
| 2004/0155031 A1 | 8/2004 | Toyooka et al. | |
| 2005/0076802 A1 | 4/2005 | Pulliam | |
| 2006/0032063 A1 | 2/2006 | Tomasello et al. | |
| 2006/0091347 A1 * | 5/2006 | McGuire | F16K 3/0236 251/326 |
| 2006/0150858 A1 * | 7/2006 | Appleton | F16L 55/34 104/138.1 |
| 2006/0233616 A1 * | 10/2006 | Friedmann | E02D 27/50 405/224 |
| 2006/0235589 A1 | 10/2006 | Deng et al. | |
| 2007/0187556 A1 | 8/2007 | Yoshitake | |
| 2007/0214994 A1 * | 9/2007 | Ardente | B62D 61/06 104/138.1 |
| 2008/0275572 A1 | 11/2008 | Tillotson | |
| 2008/0277534 A1 | 11/2008 | Ellmann et al. | |
| 2009/0101040 A1 * | 4/2009 | Yang | B61B 13/10 104/138.1 |
| 2009/0158955 A1 | 6/2009 | Pulliam | |
| 2010/0005997 A1 | 1/2010 | Tozoni | |
| 2010/0083864 A1 * | 4/2010 | Flynn | B61B 13/10 104/138.1 |
| 2010/0092243 A1 | 4/2010 | Bauder | |
| 2010/0115947 A1 | 5/2010 | Galbraith | |
| 2010/0143044 A1 | 6/2010 | Kadaster et al. | |
| 2010/0183407 A1 | 7/2010 | Kim | |
| 2010/0192799 A1 * | 8/2010 | Miller | B60L 13/04 104/138.1 |
| 2011/0042592 A1 * | 2/2011 | Elliott | F16K 47/08 251/120 |
| 2011/0226151 A1 * | 9/2011 | Pumpelly | B60L 11/00 104/118 |
| 2011/0226764 A1 | 9/2011 | Smith et al. | |
| 2011/0283914 A1 | 11/2011 | Kwon et al. | |
| 2012/0089525 A1 | 4/2012 | Kley et al. | |
| 2012/0153744 A1 | 6/2012 | Criswell et al. | |
| 2012/0285575 A1 | 11/2012 | Catha et al. | |
| 2012/0299684 A1 | 11/2012 | Won | |
| 2013/0025493 A1 * | 1/2013 | Friedmann | B60L 13/04 104/138.1 |
| 2013/0125779 A1 * | 5/2013 | De Matias Jimenez | B61B 1/00 104/138.1 |
| 2013/0136546 A1 * | 5/2013 | Friedmann | B60L 13/04 406/181 |
| 2013/0276665 A1 | 10/2013 | Dalrymple | |
| 2014/0000473 A1 | 1/2014 | Miller | |
| 2014/0261054 A1 * | 9/2014 | Oster | E01B 25/34 104/130.02 |

(56) References Cited

U.S. PATENT DOCUMENTS

2014/0261055 A1 9/2014 Oster
2014/0354064 A1 12/2014 Tseliakhovich
2016/0061640 A1 3/2016 Joshi et al.

FOREIGN PATENT DOCUMENTS

WO WO03003389 A1 1/2003
WO WO2007087028 A2 8/2007
WO WO2009/135389 11/2009

OTHER PUBLICATIONS

Wright, I., "Engineering the Hyperloop: Testing 4 Core Elements," dated Feb. 16, 2016.
Protalinski, E., "Hyperloop's intro video claims the future is now," dated Sep. 17, 2015.
GNB Corporation Product Catalog, 20 pages, (Mar. 14, 2013).
Khatait, J., et al., "Design and development of orifice-type aerostatic thrust bearing," SIMTech technical reports, vol. 6, No. 1 (Jan. 2005).
Barsikow, B., et al., "Noise Characteristics of the Transrapid TR08 Maglev System," US Department of Transportation, 338 pages (Jul. 2002).
Brecher, A., et al., "Electromagnetic Field Characteristics of the Transrapid TR08 Maglev System," US Department of Transportation, 224 pages (May 2002).
Chan, L., et al., "Vibration Characteristics of the Transrapid TR08 Maglev System," US Department of Transportation, 143 pages (Mar. 2002).
Todorovich et al., "High-Speed Rail—International Lessons for U.S. Policy Makers," Lincoln Institute of Land Policy, 64 pages (2011).
Peterman, D., et al., "The Development of High Speed Rail in the United States: Issues and Recent Events," Congressional Research Service, 35 pages (Dec. 20, 2013).
International Search Report and Written Opinion of International Searching Authority for related Application No. PCT/US2016/015231, dated Mar. 25, 2016.
International Search Report and Written Opinion of International Searching Authority for related Application No. PCT/US16/15228, dated Apr. 8, 2016.
International Search Report and Written Opinion of International Searching Authority for related Application No. PCT/US16/15215, dated Apr. 8, 2016.
International Search Report and Written Opinion of International Searching Authority for related Application No. PCT/US2016/015234, dated Apr. 4, 2016.
Barboza, D., "A New Port in Shanghai, 20 Miles Out to Sea," The New York Times, Dec. 12, 2005.
International Search Report and Written Opinion of International Searching Authority for related Application No. PCT/US2016/015221, dated Mar. 31, 2016.
International Search Report and Written Opinion of International Searching Authority for related Application No. PCT/US2016/015224, dated Apr. 11, 2016.
International Search Report and Written Opinion of International Searching Authority for related Application No. PCT/US2016/015229, dated Apr. 4, 2016.
Thornton. R., "The Future of Maglev," Magnemotion, Nov. 5, 2007.
International Search Report and Written Opinion of International Searching Authority for related Application No. PCT/US2016/015206, dated Apr. 1, 2016.
International Search Report and Written Opinion of International Searching Authority for related Application No. PCT/US2016/015236, dated Mar. 29, 2016.
International Search Report and Written Opinion of International Searching Authority for related Application No. PCT/US2016/015238, dated Apr. 1, 2016.
International Search Report and Written Opinion of International Searching Authority for related Application No. PCT/US2016/015239, dated Mar. 30, 2016.
International Search Report and Written Opinion of International Searching Authority for related Application No. PCT/US2016/015232, dated Jun. 9, 2016.

* cited by examiner

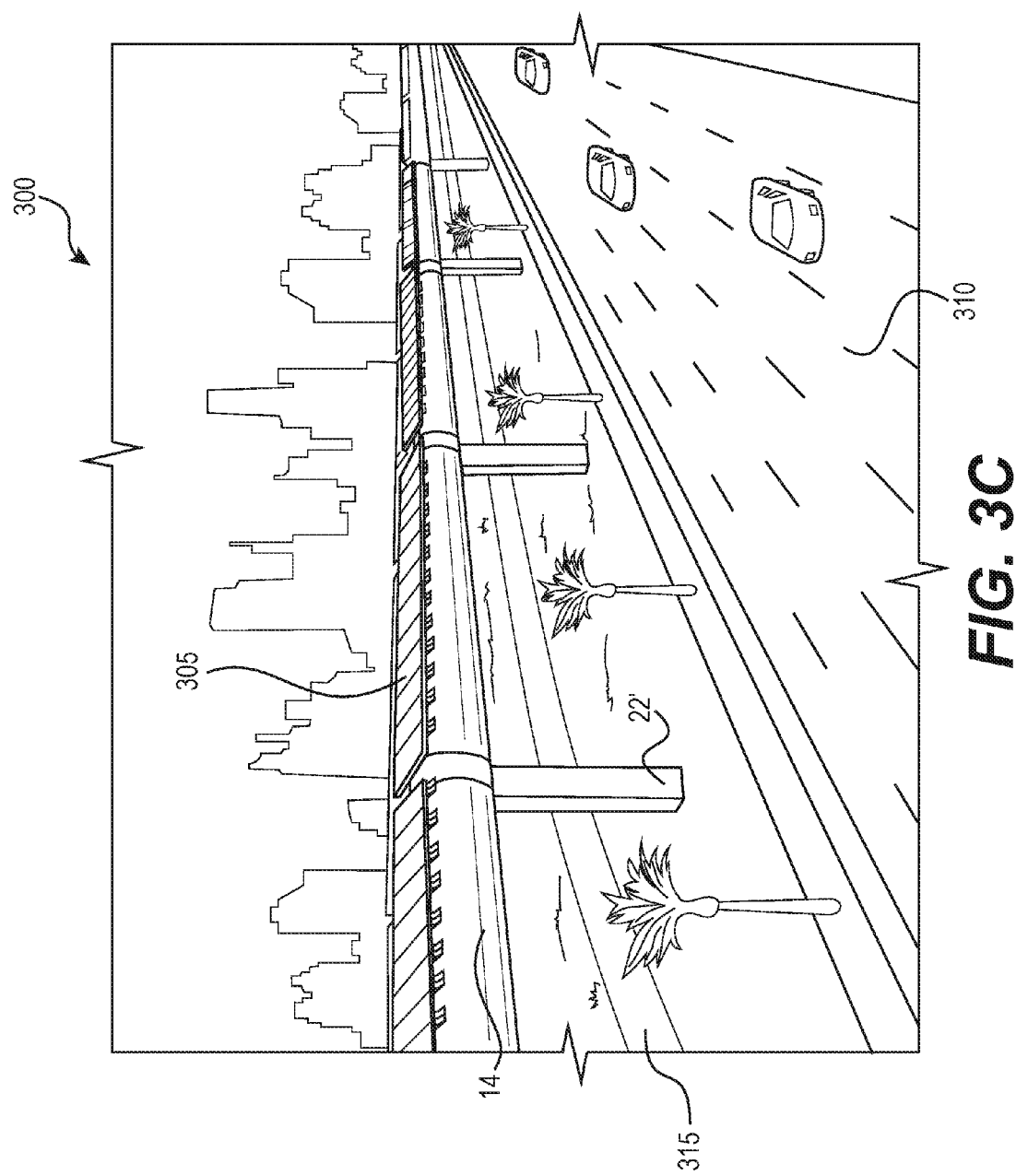

MARSEILLE FOS PORT: TODAY 897

890

MARSEILLE FOS PORT: FUTURE
• 10,400 HECTARES
• $200B IN REAL ESTATE POTENTIAL

899

Section A-A

Section B-B

TRANSPORTATION SYSTEM

CROSS REFERENCE TO RELATED APPLICATION

The present application claims the benefit of U.S. Provisional Application No. 62/113,511 filed on Feb. 8, 2015, the disclosure of which is expressly incorporated by reference herein in its entirety.

FIELD OF THE DISCLOSURE

The present disclosure relates to systems and methods for high-speed transportation of people and/or materials between locations.

BACKGROUND OF THE DISCLOSURE

Traditional transportation modes via water, land, rail, and air revolutionized the movement and growth of our current culture. The adverse environmental, societal and economic impacts of these traditional modes of transportation, however, initiated a movement to find alternative modes of transportation that take advantage of the significant improvements in transportation technology so as to efficiently move people and materials between locations. High-speed transportation systems utilizing rails or other structural guidance components have been contemplated as a solution to existing transportation challenges while improving safety, decreasing the environmental impact of traditional modes of transportation and reducing the overall time commuting between, for example, major metropolitan communities.

SUMMARY OF THE EMBODIMENTS OF THE DISCLOSURE

At least some embodiments of the present disclosure are directed to a high-speed transportation system, comprising at least one transportation tube having at least one track, at least one capsule configured for travel through the at least one tube between stations, a propulsion system adapted to propel the at least one capsule through the tube, a levitation system adapted to levitate the capsule within the tube. The at least one transportation tube is structured and arranged as a net-tension tube.

In some embodiments, the at least one transportation tube comprises two tubes in a side-by-side configuration.

In further embodiments, the at least one transportation tube comprises one tube with two discrete capsule passageways.

In additional embodiments, the at least one transportation tube comprises one tube with four discrete capsule passageways.

In yet further embodiments, the at least one tube comprises a walkway configured for passengers arranged adjacent the track.

In some embodiments, the at least one tube is formed from uniform thickness steel or a metal-composite material.

In further embodiments, the system further comprises a plurality of supports spaced along a path of the at least one tube to support the at least one tube at an elevation above ground.

In additional embodiments, the at least one tube is self-supporting between adjacent supports.

In yet further embodiments, the system further comprises a support structure arranged between adjacent supports, above the supports and beneath the at least one tube, wherein the support structure is self-supporting and supports the at least one tube between the adjacent supports.

In some embodiments, each tube between adjacent supports is configured for handling dynamic forces expected within and outside the tube, and wherein the support structure between the adjacent supports is configured for handling the static forces of the weight of the tube and support structure and for dynamic forces acting within and outside the tube.

In further embodiments, the at least one tube comprises an inner layer and an outer layer, with a middle layer between the inner layer and the outer layer.

In additional embodiments, the inner layer and the outer layer comprise a metal and the middle layer comprises a foam material.

In yet further embodiments, the net-tensioned tube comprises at least one compression member extending between different points on an inner wall of the tube, the compression member creating a restrained load that induces tension in an outer wall of the tube.

In some embodiments, the at least one compression member comprises two compression members positioned orthogonally relative to each other.

In further embodiments, the at least one tube comprises a plurality of tube sections, wherein the tube sections comprise uniform tube configurations along a transportation route between stations.

In additional embodiments, uniform tube configurations comprise tubes having approximately the same outer diameter and wall thickness.

In yet further embodiments, the at least one tube comprises a plurality of tube sections, at least some of the tube sections comprising differing tube configurations along a transportation route between stations.

In some embodiments, the at least one tube comprises a uniform wall thickness and diameter along a transportation route between stations.

In further embodiments, the at least one tube comprises one or more portions having different wall cross-sectional areas at different positions along a transportation route between stations so as to vary an airflow passage around the capsule within the tube.

In additional embodiments, the different wall cross-sectional areas are created by different wall thicknesses at the different positions.

In yet further embodiments, the different wall cross-sectional areas are created by different tube diameters at the different positions.

In some embodiments, the at least one tube comprises one or more portions having different wall thicknesses configured for different expected loads.

Additional aspects of the disclosure are directed to a high-speed transportation system comprising at least one transportation tube having at least one track, at least one capsule configured for travel through the at least one tube between stations, a propulsion system adapted to propel the at least one capsule through the tube, and a levitation system adapted to levitate the capsule within the tube. The at least one tube comprises an inner layer and an outer layer, and a middle layer positioned between the inner layer and the outer layer.

In additional embodiments, the inner layer is selected and/or configured for exposure to an interior environment of the tube and the outer layer is selected and/or configured exposure to an exterior environment of the tube.

In yet further embodiments, the inner layer and the outer layer comprise metals and the middle layer comprises a foam material.

In some embodiments, the foam material comprises a foamed metal material.

In further embodiments, the foam material at least one of reduces thermal conductivity, increases stiffness, increases strength, and reduces weight of the tube.

In additional embodiments, the at least one transportation tube is structured and arranged as a net-tension tube.

Additional aspects of the disclosure are directed to a method of manufacturing a tensioned tube comprising an inner wall and an outer structure. The method comprises expanding the inner wall through a loading process, attaching the outer structure to the expanded inner wall as the loading process is completed, creating a net compression state in the outer structure and a net tension state in the inner wall.

In embodiments, the loading process comprises applying at least one of internal pressure and heat to the inner wall.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein:

FIGS. 3A-3C illustrate views of at least one tube for use in the transportation system in accordance with embodiments of the present disclosure;

DETAILED DISCLOSURE

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

Transportation System Overview

Figure 1:
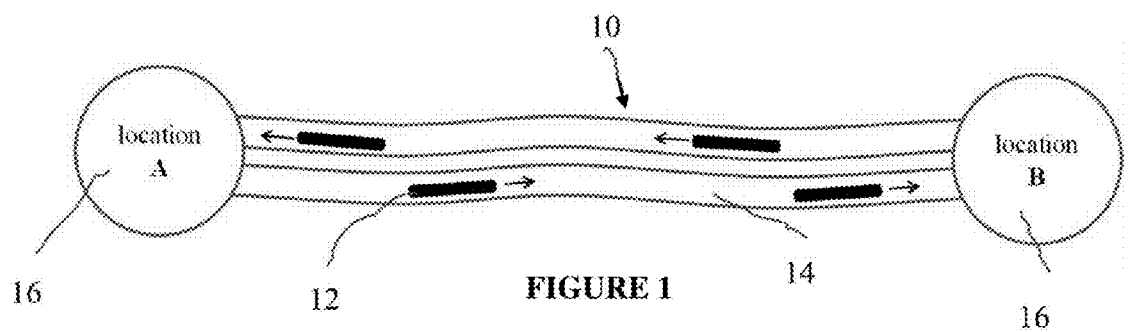
FIG. 1 is a schematic view of the transportation system in accordance with embodiments of the present disclosure.

Referring to FIG. 1, a transportation system 10 in accordance with aspects of the present disclosure is illustrated. In embodiments, the transportation system 10 comprises one or more capsules or transport pods 12 traveling through at least one tube 14 between two or more stations 16. In one exemplary embodiment of the present disclosure, the one or more capsules 12 of the transportation system 10 move through a low-pressure environment within the at least one tube 14. In accordance with certain aspects of the disclosure, a low-pressure environment includes (but is not limited to) any pressure that is below 1 atmosphere (or approximately 1 bar) at sea level.

Some elements of a high-speed transportation system are discussed in Hyperloop Alpha, a white paper authored by Elon Musk, which includes some structural and system examples, the entire content of which is expressly incorporated by reference herein in its entirety.

In an exemplary and non-limiting embodiment of the present disclosure, a system comprises one or more partially evacuated tubes 14 that connect, for example, stations 16 in a closed loop system. In other contemplated embodiments, the system may include a one-way connection between an origin and a destination. In embodiments, tubes 14 may be sized for optimal air flow around the capsule 12 to improve performance and energy consumption efficiency at the expected or design travel speed. In accordance with aspects of the disclosure, the low-pressure environment in the tubes 14 minimizes the drag force on the capsule 12, while maintaining the relative ease of pumping out the air from the tubes.

In embodiments, the capsule may be levitated over a track using a pressurized fluid flow (e.g., air or liquid) exiting out, e.g., a bottom side of the capsule and interacting with the corresponding track. In further contemplated embodiments, the capsule may be levitated using, for example, passive magnetic levitation (e.g., mag-lev), with, for example, non-superconducting magnets. In certain embodiments, the capsule may be levitated using rockets, wings, aerodynamic (control) surfaces, ion engines, electromagnets, and/or slipper pads. Additionally, the capsule may include one or more permanent magnets. e.g., in a Halbach array on the capsule, which interact with a passive, conducting track to levitate the capsule. By utilizing passive magnetic levitation, a high lift-to-drag ration can be achieved, which results in a very low power consumption. Moreover, in accordance with some aspects of the disclosure, the efficiency of the passive (e.g., permanent) magnetic levitation system may increase (at least in some respects) as the vehicle speed increases. Other embodiments may utilize superconducting magnets for levitating the capsule.

By implementing aspects of the present disclosure, the capsules are operable or available on-demand, which further enables an on-demand economy. For example, in embodiments, capsules may depart a station as (e.g., launched in a tube of the transportation system), as frequently as every ten seconds. In such a manner, for example, the capsules are operable or available on-demand Implementing aspects of the present disclosure, will, in embodiments, cause a transformation of cities and will unlock real estate values, and will have the ability to reshape shipping and logistics industries, for example. Additionally, implementing aspects of the disclosure will profoundly impact human behavior and human interaction with the Earth, and will reduce transportation and shipping pollution.

While embodiments of the present disclosure are directed to using a low-pressure environment, in some contemplated embodiments, the environment may be at atmospheric pressure (i.e., not a low-pressure environment), which may be easier to maintain as compared to a low-pressure environment. For example (and as discussed in more detail herein), with some shorter travel distances (for example, short enough that the capsule may not easily attain a high speed before needing to slow down again), it may be more efficient to run the system in an environment that is at atmospheric pressure to, for example, reduce costs of maintaining a low-pressure environment. For example, if a travel route is only 30 km long, the capsule may not be able to achieve its top speed (due to relatively short distance of the route). In such embodiments, the disclosure contemplates that it may be unnecessary to reduce the operating pressure of the environment below atmospheric pressure.

In accordance with aspects of the disclosure, in embodiments, the pressure of the environment may be, by design, operating at a uniform pressure (e.g., a uniform low pressure). The inventors contemplate, however, that embodiments of the disclosure may include different regions of the tube that are operating at different pressures (e.g., two different low pressures). For example, a section of tube may be maintained at normal pressure for loading a capsule. Once the capsule is loaded, an airlock may be closed and the tube section may be depressurized to the low pressure of the transportation system, after which another air lock is opened, and the capsule is sent along a path of the transportation system. Aspects of airlocks and gate valves for a high-speed transportation system are discussed in commonly-assigned U.S. application Ser. No. 15/007,712, filed in the USPTO on even date herewith, the content of which is expressly incorporated by reference herein in its entirety.

The capsules are transported at both low and high speeds throughout the length of the tube and may be supported on a cushion of pressurized air with aerodynamic lift or may be levitated with rockets, wings, aerodynamic (control) surfaces, ion engines, electromagnets, slipper pads, permanent magnets (e.g., a Halbach array), or superconducting magnets, for example. In some embodiments, the capsule may also be supported (e.g., intermittently) on wheels. As discussed in more detail herein, it is understood that numerous other mechanisms and environments may be provided to accomplish the aims of the disclosure.

In accordance with aspects of the disclosure, the capsules, elements of the tube, and the track are able to communicate with each other so as to, for example, control a capsule traveling within the tube and/or control operating conditions of the tube or track. As one example, spacing between capsules within the same tube may be maintained using autonomous vehicles that are aware of the other capsules' relative location. By autonomous, it should be understood that the vehicle is not driven by an operator on the vehicle, but is operated using at least one computerized controller. Thus, if a vehicle ahead on the tube path has slowed (e.g., due to a malfunction), then other capsules upstream of the slowed capsule may include sensors to detect, recognize, and analyze such a situation, and may slow the velocity of the upstream capsules. As another example, the capsules may be in communication with a central command (which is aware of the location and speed of each capsule in the system), and receive an instruction from a central control to slow the velocity of the capsule if a capsule in front of said capsule is moving too slowly. As a further example of communication between elements of the system in order to control operating conditions, during a seismic event, portions of a tube that detect the seismic activity (e.g., are closer in proximity to the epicenter of the seismic activity), may communicate with portions of the tube further from the epicenter to adjust operating conditions of the tube and/or tube support structures (e.g., thermal expansion joints, or vibration dampening elements) to account for the seismic activity.

In embodiments, should there be a loss of communication between capsules themselves, or between the capsules and the track or tube, for example, the transportation system (or portions thereof) may shut down, and for example, let air pressure into the low-pressure environment of the tube so as to assist in deceleration of the capsules. That is, by removing or reducing the low-pressure environment in the tube (e.g., bringing the pressure to atmospheric pressure), the capsules will encounter greater air resistance, which will cause the capsules to slow down. In embodiments, the capsules may each be equipped with onboard emergency power systems sufficient to provide auxiliary propulsion to the capsule (e.g., to propel the capsule (or cause the capsule to crawl) to the next station or to an emergency egress) in the event of an emergency (e.g., loss of low-pressure environment). Additional emergency measures may include a pathway, for example, adjacent the track, as a walkway for passengers, should exit from the capsule be necessary. The emergency walkway may include lighting to assist the debarked passengers in navigating the emergency walkway, and may also include an airflow (e.g., oxygen) system to provide breathable air to the debarked passengers. In embodiments, areas for passenger egress outside the tube may be provided, for example, in the event of a failure or emergency.

Figure 2A:
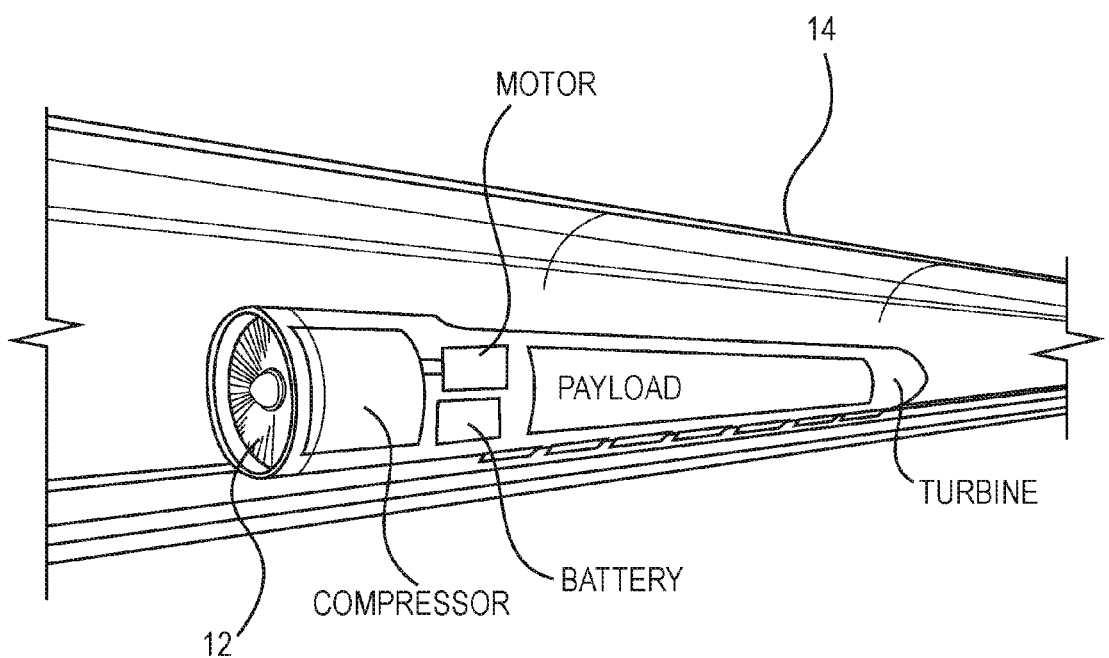
FIGS. 2A-2C illustrate views of exemplary capsules for use in the transportation system in accordance with embodiments of the present disclosure.

Referring now to FIG. 2A, an exemplary and non-limiting depiction of a capsule (or transport pod) 12 of the transportation system is illustrated. In embodiments, the capsule 12 may be streamlined to reduce an air drag coefficient as the capsule 12 travels through the low-pressure environment of the at least one tube 14 of the transportation system. In accordance with aspects of the disclosure, in certain embodiments, a compressor arranged at the front end of the capsule is operable to ingest at least a portion of the incoming air and pass it through the capsule (instead of displacing the air around the vehicle). For example, as schematically shown in the exemplary embodiment of FIG. 2A, the capsule 12 may include a compressor at its leading face. In embodiments, the compressor is operable to ingest oncoming air and utilize the compressed air for the levitation process (when, for example, the capsules are supported via air bearings that operate using compressed air and aerodynamic lift). Additionally, as schematically shown in the exemplary embodiment of FIG. 2A, in embodiments, the compressed air may be used to spin a turbine, for example, located at the rear end of the capsule, to provide power to the capsule 12. As schematically shown in the exemplary embodiment of FIG. 2A, the capsule 12 may also include a motor structured and arranged to drive the compressor, and a battery for storing energy, e.g., derived from the turbine. Additional power systems are discussed in commonly-assigned U.S. application Ser. No. 15/007,974, entitled "Power Supply System And Method For A Movable Vehicle Within A Structure," filed in the USPTO on even date herewith, the content of which is expressly incorporated by reference herein in its entirety. The capsule 12 also includes a payload area, which may be configured for humans, for cargo, and/or for both humans and cargo.

Figure 2B:
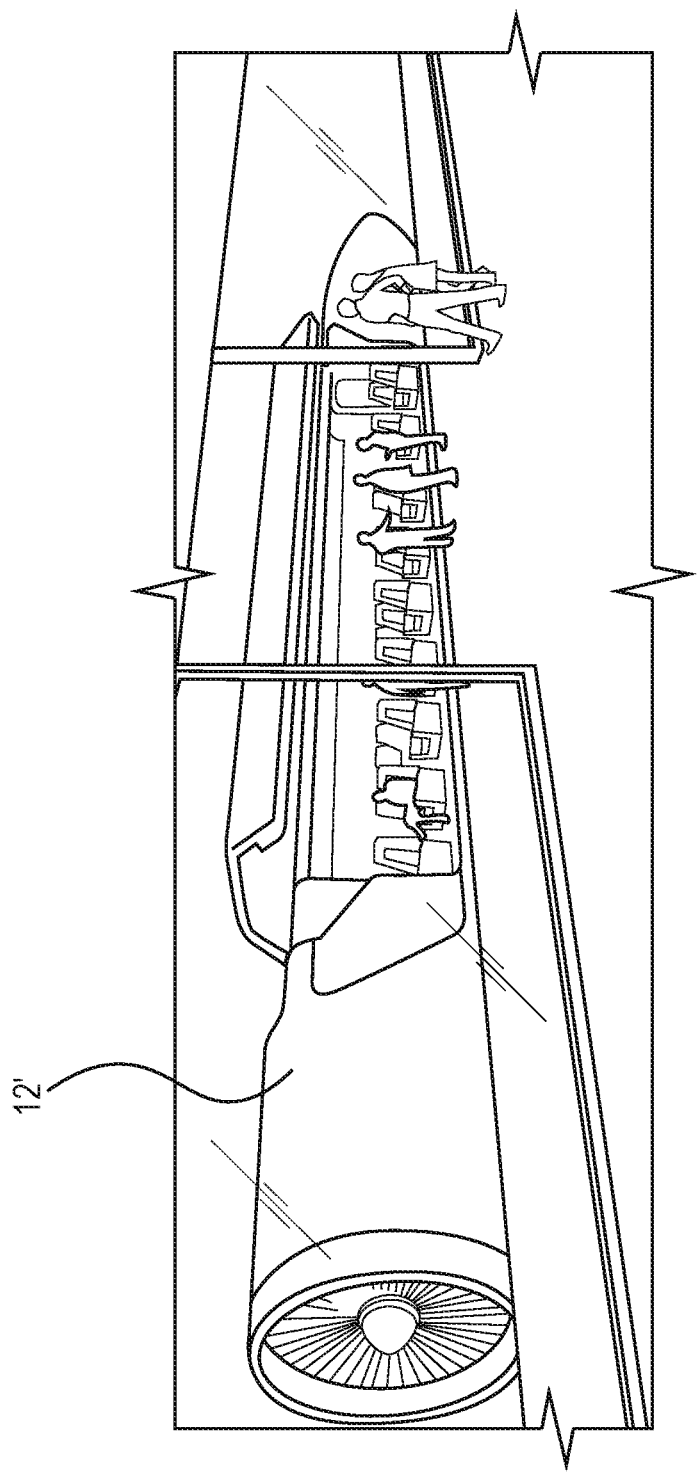

As depicted in the exemplary embodiment of FIG. 2B, the interior (e.g., the payload area) of the capsule 12' may be configured as a passenger service vehicle to carry a number of passengers, for example, with safety and comfort in mind. In accordance with aspects of the disclosure, a tube and/or the capsule, when configured or structured for human passengers, may include more stringent safety and/or escape measures. For example, human-carrying capsules may include (or have more robust) environmental controls and life support (ECLS) systems.

With an exemplary and non-limiting embodiment, a capsule 12 may be configured to carry eight people, and in another non-limiting embodiment, a capsule 12 may be configured to carry eighty people. In accordance with aspects of the disclosure, smaller capsules (e.g., those configured to carry 8 passengers), will not need as long to be loaded and reach their capacity, which allows such capsules to be sent more frequently, as soon as they are loaded. In such a manner, with smaller capacity capsules, the capsules are able to be dispatched in an on-demand manner. In contrast, with a capsule configured to carry 80 people, for example, it may take more time for the capsule to be filled to capacity, which may necessitate that some passengers wait a longer period of time before departing. In accordance with aspects of the disclosure, with a larger-capacity capsule, however, the capsules may not need to be sent as frequently.

Passengers may enter and exit the capsule at stations (for example, as depicted in FIG. 2B) located either at the ends of the tube, or branches along the tube length. In accordance with aspects of the disclosure, the capsule seats may conform to the body of the passenger to maintain comfort, for example, during high speed accelerations and/or decelerations experienced during travel. In some embodiments, the seats can be orientable and/or adjustable to best handle the induced acceleration loads from the vehicle on the passengers.

In an alternative embodiment of the disclosure, the capsule is configured to allow the transportation of a payload, such as materials or goods, e.g., automobiles, cargo containers, along with passengers between locations. With such embodiments, the inventors contemplate embodiments having separate loading stations for the passengers and the cargo. That is, the cargo may be loaded into a capsule (e.g., first) at a cargo loading station. Once the cargo containing region of the capsule is filled, the capsule may be directed to a passenger loading area, from where the passengers may enter the capsule. In such a manner, the passengers who have boarded the capsule need not wait for cargo to be loaded, as the cargo has already been loaded prior to passenger boarding.

Figure 2C:
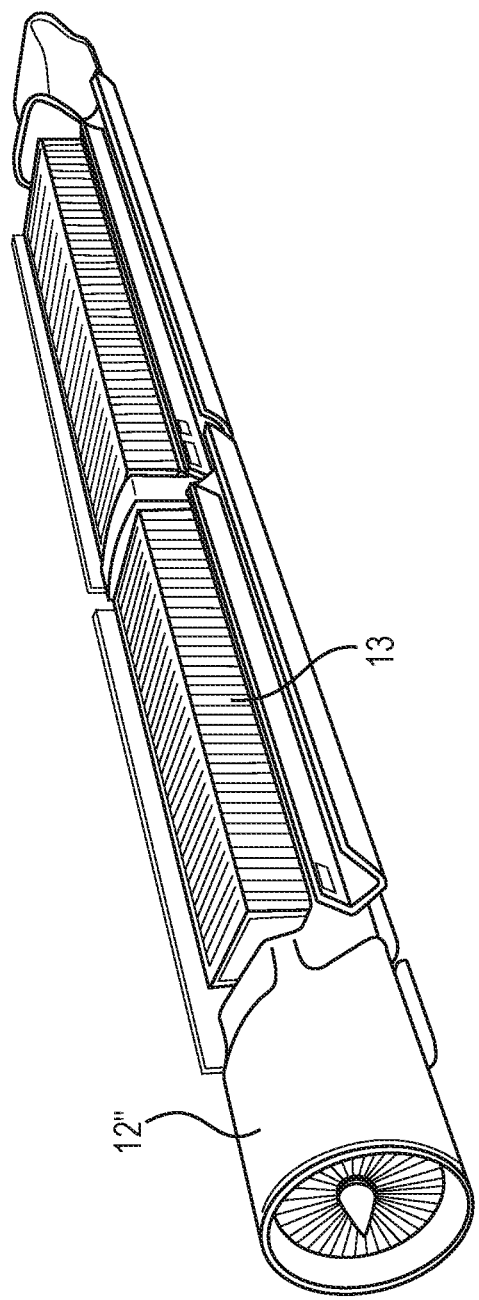

In yet a further contemplated embodiment, for example as depicted in the exemplary embodiment of FIG. 2C, a capsule 12″ may be configured for containing cargo only (that is, the capsule may not be configured for carrying human passengers). In such instance, a capsule may be configured to transport one or two FEU (forty foot equivalent unit) containers 13. In an exemplary and non-limiting embodiment, a transportation system may be operable to send a capsule as frequently as one every ten seconds. By implementing aspects of the disclosure, the transportation system is operable to provide cost-effective and fast method of shipping time sensitive goods. Moreover, a capsule configured and operable to transport cargo only may be operated at faster speeds (as compared to a human carrying capsule) due to allowable G-loading.

For example, in those embodiments in which the capsule is only transporting, for example, non-human cargo, the capsule may not be restricted (or may be less restricted) in the speeds it travels through the tube. As a capsule moves through a path that is bending (or turning), the contents of the capsule will be subjected to increased G-forces. When the contents of the capsule include humans (or other animals), the capsule speed may be reduced in such bending paths to reduce the degree of G-forces experienced by the passengers. Non-human cargo, however, may be less impacted by increased G-forces, and in such embodiments, it may be unnecessary to slow a capsule carrying non-human cargo during bending paths (or a capsule may be slowed to a lesser extent than would a human-carrying capsule). Additionally, with such embodiments in which the capsule is only transporting, for example, non-human cargo, the capsule may not need the same level of safety mechanisms (e.g., life support systems) that would be utilized with a human-carrying capsule.

In embodiments, the capsules may be configured (or constructed) with spaces designated for accommodating cargo so that the cargo is more likely to sustain the expected G-forces. Such designated spaces should be designed to maintain the cargo or other payload in its loaded positions, so that during travel of the capsule, the cargo and/or payload and objects inside the capsule are prevented from moving.

As should be understood, if the cargo were to move (or be shifted) during travel, such movement could upset the balance of the capsule, and detrimentally impact travel of the capsule.

In accordance with further aspects of the disclosure, a cargo or payload orientation tester may be used to test (or measure) a loaded capsule (e.g., with cargo and/or other payload, including passengers) to ensure the capsule is properly loaded (e.g., properly balanced), and provide an indication (e.g., alert) when the cargo-loaded capsule is not properly (e.g., evenly) loaded. For example, for much of the travel distance along the tubes, the capsules are gliding and may be free to relatively rotate around its longitudinal axis in the tube (for example, as turns in the tube are traveled). If the capsule is not properly or sufficiently balanced, this rotation of the capsule may become too extreme to maintain a comfortable traveling experience. Scales and attached sensors and alarms can be provided to measure the weight and/or balance (e.g., weight distribution in the capsule) and provide an alert when necessary.

In accordance with additional aspects of the disclosure, in embodiments utilizing both human-carrying capsule (or pods) and cargo-containing capsules, these respective capsules may be sized differently, and in embodiments, may utilize separate track systems and tubes, which are each optimized for the respective capsules.

As shown in FIG. 2A, capsule 12 includes one or more onboard compressors. Additional aspects of compressors are discussed in commonly-assigned U.S. application Ser. No. 15/007,801, entitled "Axial Compressor Configuration," filed in the USPTO on even date herewith, the content of which is expressly incorporated by reference herein in its entirety.

In accordance with aspects of the disclosure, the compressor allows the capsule to traverse the relatively narrow tube 14 without impeding air flow that travels between the capsule and the walls of the tube. For example, operation of the capsule 12 through the tube 14 may result in a build-up of air mass in front of the capsule 12, which may increase the drag coefficient and/or detrimentally affect capsules ahead of the current capsule. The compressor is operable to compress air that is bypassed through the capsule 12. That is, instead of the oncoming air being passed around the capsule 12, in certain embodiments, the compressor is operable to ingest at least a portion of the oncoming air, which is passed through a passageway provided in the capsule, so as to reduce drag on the capsule 12. In exemplary and non-limiting embodiments, the compressor ratio of the compressor may be 30/1, may be 4/1, or may be somewhere within this range. In further embodiments, the capsule may not include an onboard compressor at all.

The compressor may also operate to supply air to, e.g., a bottom side of the capsule 12 to air bearings, which provide a cushion of air to support the weight of the capsule throughout the journey. In further embodiments, a capsule may utilize wheels, for example, during an initial acceleration (e.g., at lower speeds, when the air bearings and lift are not sufficient to levitate the capsule) and/or during emergencies. As discussed in more detail herein, in some embodiments, wheels may be arranged at a fixed height that will engage a track only when the air bearings (or other levitation system) are not sufficient to lift the wheels off the tracks. In other contemplated embodiments, the wheels may be deployable from a recessed position.

In accordance with aspects of the disclosure, the capsule 12 may be accelerated via a magnetic linear accelerator or linear motor (e.g., a linear synchronous motor (LSM) or a linear induction motor (LIM)) affixed at various locations along the low pressure tube (e.g., at stations and/or at selected locations along the tube) with rotors contained in or on each capsule 12. Aspects of the linear motors are discussed in commonly-assigned application Ser. No. 15/007,940, entitled "Continuous Winding For Electric Motors," and commonly-assigned application Ser. No. 15/008,024, entitled "Dynamic Linear Stator Segment Control," both filed with the USPTO on even date herewith, the contents of which are hereby expressly incorporated by reference herein in their entireties.

Rotors are located on the capsules to transfer momentum to the capsules via the linear accelerators. In embodiments of the present disclosure, a moving motor element or rotor is located on the capsule that cooperates with the stator or stationary motor elements located on the track that drive the capsule. The stator is structured and arranged to locally guide and accelerate and/or decelerate the capsule.

The linear accelerators are constructed along the length of the tube at various locations to accelerate the capsules. That is, in accordance with aspects of the disclosure, the linear accelerators may not be located along the entire track (e.g., from point A to point B), but only in discrete segments. As the capsule is operating in a low-pressure environment, once accelerated, the capsule will travel a significant distance before losing significant speed (for example, the capsule may travel 100 km before losing 10% of its initial speed). As such, once accelerated, the capsule may only need intermittent speed boosts (provided by the discrete segments of linear accelerators (e.g., LSMs or LIMs)) as the capsule travels from point A to point B.

In other exemplary embodiments, the capsule 12 may be accelerated (and decelerated) using one or more of: jet thrust, a turbofan, a turboprop, a propeller, hydraulic cylinders, pneumatic cylinders, cables, fluid, fluid jets, and/or thermal gradients.

Figure 3A:
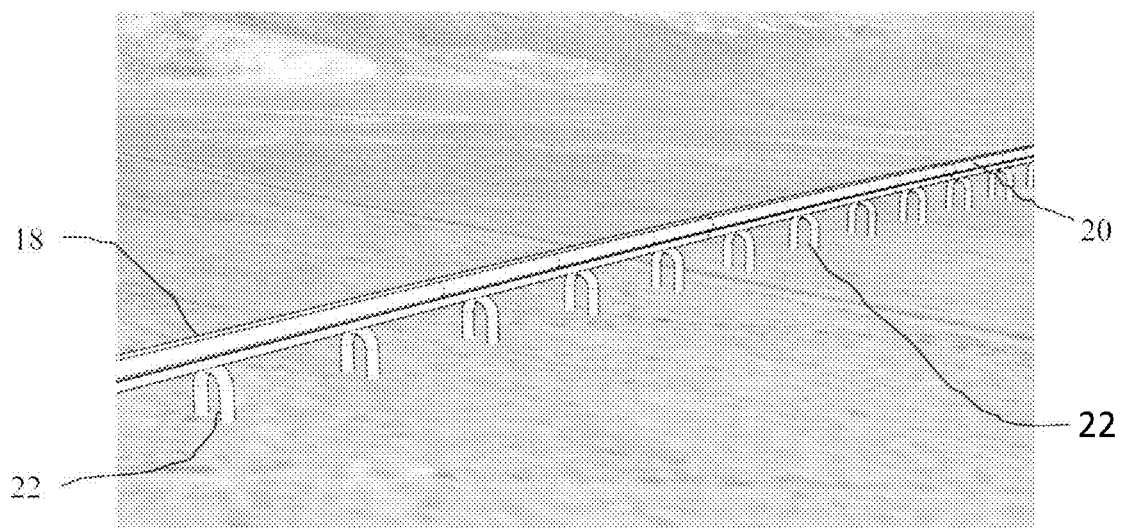

Referring now to FIG. 3A, one or more tubes 14 of transportation system 10 is/are described in greater detail. In one exemplary and non-limiting embodiment of the present disclosure, a pair of cylindrical tubes 18, 20 are generally positioned in a side-by-side configuration. In accordance with aspects of the disclosure, the side-by-side configuration of tubes 18, 20 decreases the overall physical footprint of the transportation system and provides efficient use and management of utilities and system components. As shown in the exemplary embodiment of FIG. 3A, tubes 18, 20 are supported above ground by a series of supports (e.g., pillars or pylons 22) spaced apart along a path of travel. In an exemplary embodiment, the pillars 22 are placed approximately every 100 feet (30 m) along the transportation path, with other spacings between pillars contemplated, for example, at turns or as needed.

In such embodiments, use of pillars (or supports) 22 to support the tubes 18, 20 of the transportation system provides numerous benefits. In embodiments, the pillars 22 may include one or more dampers to adjust for lateral and/or vertical forces or displacements (e.g., due to forces caused by the capsule movement, thermal considerations, or seismic events). Tubes 18, 20 need not be fixed to the pillars 22, but can instead be fixed to a dampening system that is supported by pillars 22. The pillars 22 and the dampening system are structured and arranged to constrain the tubes 18, 20 in a vertical direction while allowing longitudinal slip for thermal expansion as well as dampened lateral slip. Some embodiments may also allow for some movement in the vertical direction between the pillars 22 and the tubes 18, 20, and/or between the pillar and the ground. In addition, in accordance with aspects of the disclosure, the position of the pillar-to-tube connection may be adjustable vertically and/or laterally, for example, to ensure proper alignment of the tube, and to provide for a smoother ride. In another embodiment of the present disclosure, slip joints may be provided at each station to adjust for tube length variance due to, for example, thermal expansion.

Figure 3B:
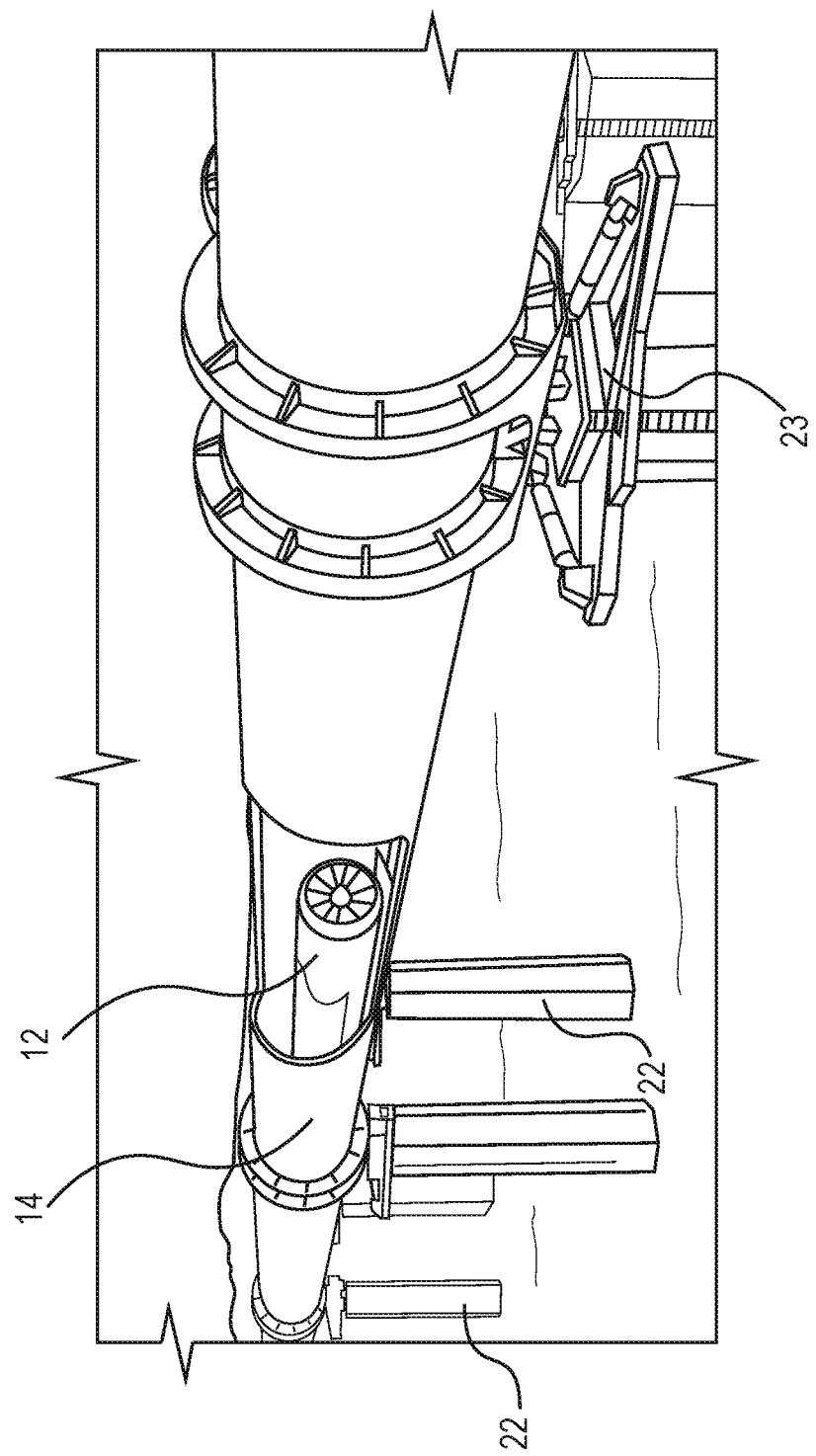

FIG. 3B illustrates an exemplary and non-limiting depiction of tubes 14 of the transportation system 10 with a partial sectioned view showing an interior of the tube 14 with a capsule 12 therein. As shown in FIG. 3B, the tubes 14 need not be fixed to the pillars 22, but rather, can be fixed to a dampening system 23, which is supported by the pillars 22. The dampening system 23 is structured and arranged to constrain the tubes 14 in a vertical direction while allowing longitudinal slip for thermal expansion as well as dampened lateral slip. Additional embodiments and details of a dampening system are discussed in commonly-assigned U.S. application Ser. No. 15/007,745, entitled "Expansion Joints, Dampers and Control Systems for a Tubular Transportation Structure Stability System," filed in the USPTO on even date herewith, the entire content of which is hereby expressly incorporated by reference herein in its entirety.

FIG. 3C depicts an exemplary and non-limiting depiction of tubes 14 of a transportation system 300. As shown in FIG. 3C, the tubes 14 have thereon, one or more solar panels (e.g., photovoltaic cells) 305 for capturing solar energy. The captured solar energy may be stored in appropriate storage devices (e.g., batteries), which are not shown. The stored solar energy may be used, for example, within the transportation system (e.g., to power the capsule propulsion system, tube pressurization systems, and/or life support systems) and/or for transferring (e.g., selling) excess power back to power company and/or to other downstream users. In accordance with aspects of the disclosure, by utilizing solar energy to power the transportation system, the energy and/or environmental costs for operation of the transportation system may be reduced or minimized. In accordance with further aspects of the disclosure, as the transportation system will involve installation of the tubes 14, additional costs for installing solar power systems are minimized. It should be understood that the solar power system 300 may utilize suitable conventional power storage and distribution controls (e.g., one or more processors) that may be located, for example, at one or more "central" locations and/or distributed throughout the transportation system. As further shown in FIG. 3C, in accordance with aspects of the disclosure, the tubes 14 are arranged along a right of way (ROW) of another transportation system (e.g., a highway 310, train tracks, bike paths, and/or sidewalks 315), which may be, for example, already existing and/or concurrently developed with the transportation system 300. In contrast to the supports 22 of FIG. 3B, which have an upside-down "U" shape with two pillar legs, the supports 22' of the exemplary embodiment of FIG. 3C utilize a single pillar structure.

In accordance with aspects of the disclosure, by arranging the transportation tubes over land (e.g., above-grade) or within the land (e.g., below-grade), the need for grading can be eliminated or reduced. Additionally, above-grade tubes can more easily cross natural barriers. For example, bridges may be less expensive, for example, due to low mass per capsule, and tunnels may be less expensive, for example, due to a tube's resistance to external pressure. Additionally, arranging the transportation tubes over land (e.g., above-grade) or within the land (e.g., below-grade) may present fewer barriers to construction (e.g., easy to obtain rights-of-way (or ROW)). In embodiments, the tubes may reach city centers, for example, above-grade or via a tunnel below-grade.

Alternative Tube Locations

Referring now to FIGS. 4A-8G, a series of alternative embodiments of the transportation system of the present disclosure are illustrated. Unlike the exemplary and non-limiting above-ground (or above-grade) transportation system of FIGS. 3A-3C, in embodiments, at least one tube may be at least partially disposed in alternative locations, such as below-ground or below a body of water to, for example, achieve superior structural and/or operating performance and/or to reduce land acquisition and/or air rights costs, and avoid interference with other modes of transportation. For example, constructing a transportation system over or in water (for example, at least partially) may present less barriers to construction (e.g., easy to obtain rights-of-way (or ROW)). Additionally, by locating the transportation system in (or over) a body of water, there may be less obstructions along the transportation path, allowing for a straighter (and shorter) transportation path. Additionally, water-based systems (e.g., under water-based systems) enable offshore ports that can deliver goods to inland ports, for example, via tunneling (e.g., minor tunneling). As further discussed below, implementing aspects of the disclosure will also enable the reallocation of waterfront property, for example, that was previously utilized by ports.

Generally vertical/up and down movement of the capsule (e.g., to change elevation to rise over hills or mountains) is more difficult to achieve than a left and right movement of the capsule. Thus, in accordance with aspects of the disclosure, by locating the transportation system over (or in) a body of water, transportation paths having significant changes in elevation can be avoided (or reduced).

Figure 4A:
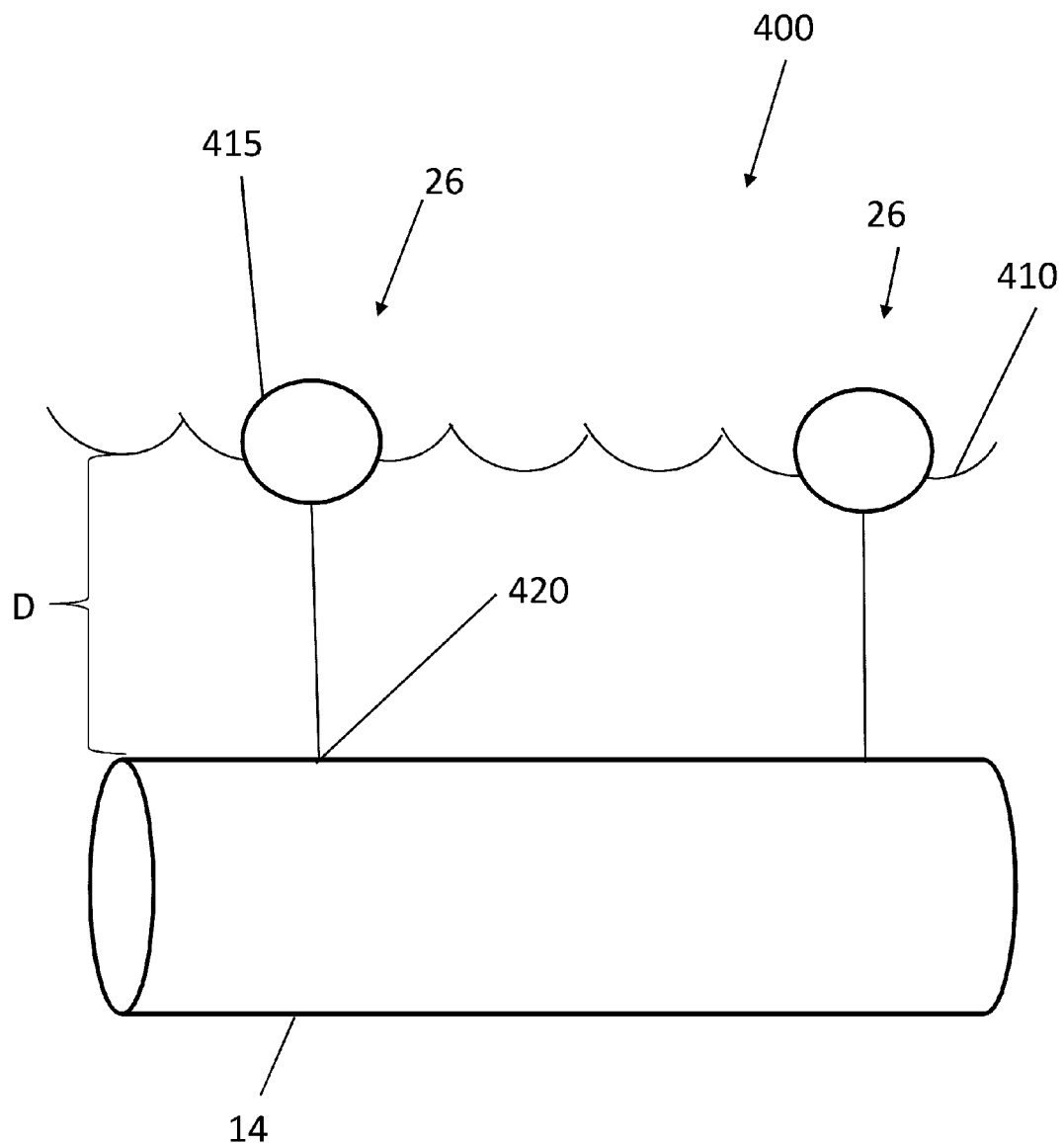
FIGS. 4A-4C are exemplary schematic depictions of a tube and support configuration for positioning the tube at a depth in a body of water for use in the transportation system in accordance with embodiments of the present disclosure.

FIG. 4A illustrates one exemplary and non-limiting embodiment of an underwater support configuration 400 of the present disclosure for positioning the tubes 14 at a predetermined depth D (e.g., a predetermined depth) in a body of water 410. As shown in FIG. 4A, the at least one tube 14 is disposed beneath the surface of the water 410 and maintained at a designated depth D by one or more buoys 26.

In accordance with additional aspects of the disclosure, in embodiments, the tube 14 may be constructed of materials such that the state of the tube may be naturally buoyant, neutrally buoyant, or naturally sinking in the water. With an exemplary embodiment, the tube is naturally very buoyant, and may include counterweights to achieve neutral buoyancy. Additional embodiments may utilize anchors, spar-buoys, and/or tension lag platforms to assist in maintaining a position and/or orientation of the tube in the water. In further contemplated embodiments, the tube 14 may have different buoyancy characteristics along different portions of the tube 14. For example, different portions of the tube 14 may comprise different materials, different construction, and/or different thicknesses to provide different buoyancy characteristics along different portions of the tube 14. Buoys 26 may be adapted to the physical state of the tube 14 to ensure that the tube remains in a generally static position.

Figure 4B:
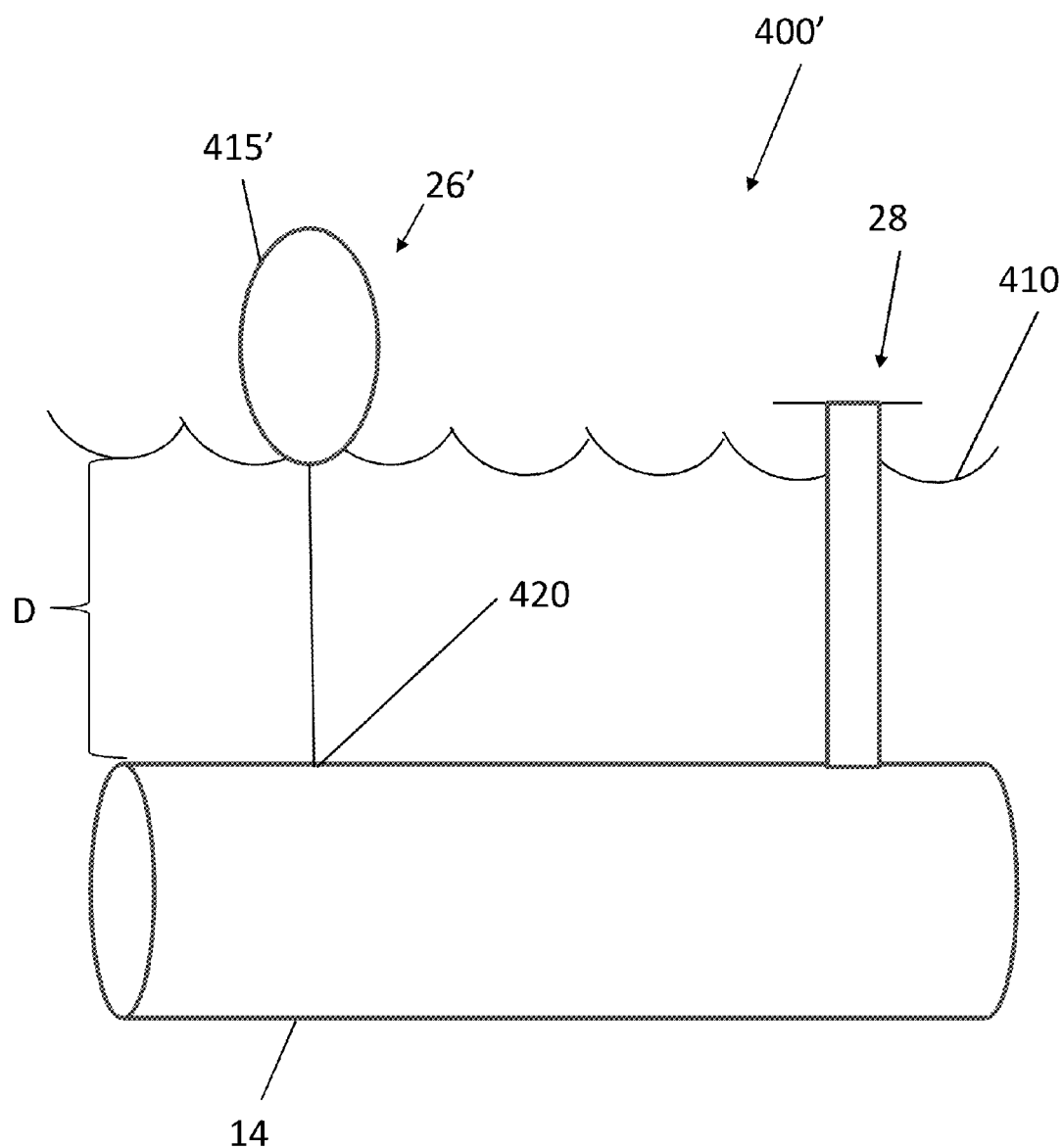

Buoys 26 may be configured in a variety of ways to accomplish aims of the present disclosure. As shown in FIG. 4A, buoy 26 includes a floating element 415 disposed at a first end and a connection portion 420 engaging (e.g., releasably) the floating element 415 at a first end, and engaging (e.g., releasably) a portion of the outer surface of the tube 14 at a second end. In embodiments, the connection portion 420 may be a cable (e.g., steel cable), a fiber, a webbing, organic material, or metal rod, with suitable connections on its ends to connect with the floating element 415 and the tube 14. The tube 14 may be provided with suitable receiving loops (e.g., welded or otherwise fastened to the tube), for example, to receive the connection of the connection portion 420. It is contemplated that the floating element 415 of the buoy 26 may be disposed on the surface of the water (e.g., as shown in FIG. 4A) or, in the alternative, the floating element 415' of the buoy 26' may be disposed above the surface of the water 410 (e.g., as shown in FIG. 4B) to accomplish aims of the present disclosure. In embodiments, the buoy 26 may also be secured to the sea floor, e.g., with a cable (not shown), to maintain the relative position of the buoy 26. While the present specification describes positioning of tubes at a predetermined depth, it should be understood that surface waters may undergo deflections of between, for example, 2-40 meters. As such, embodiments that are supported (at least in part) utilizing buoys may undergo changes in relative depth as the water surface undergoes deflection. As such, the description of predetermined depth in the present disclosure should not be construed to limit any embodiments of the present disclosure.

In the exemplary and non-limiting embodiment of the present disclosure shown in FIG. 4B, the transportation system 400' may include one or more support structure 28 in electromechanical communication with the tube 14. In embodiments, support structure 28 may provide secondary flotation support for the tube 14. Alternatively or additionally, the support structure 28 may serve alternative functions in the transportation system, including, but not limited to, receiving and transmitting data between the tube 14 and one or more remote monitoring stations (not shown), providing an air exchange and vent interchange connection and/or a portal functioning as an emergency escape path and/or connection to a passenger docking area for boats and/or helicopters. For example, in embodiments, one or more of the buoys 26 and/or support structure 28 may include an antenna or telemetry systems, solar or other power systems, a human ingress/egress interface system (e.g., a helicopter pad, or boat dock), cameras, lighting systems, Wi-Fi (or wireless fidelity) systems, one or more ballast tanks, and/or propellers and drives. Additionally, the buoys 26 and/or support structure 28 may include life support systems including one or more of, for example, a snorkel system to provide air to the tube 14 (e.g., including ducting or pipes), a vent for the tube 14, a vacuum pump for maintaining or reestablishing a low-pressure environment within the tube, and a surface-level vehicle (e.g., a boat) for passenger escape from the transportation system.

Figure 4C:
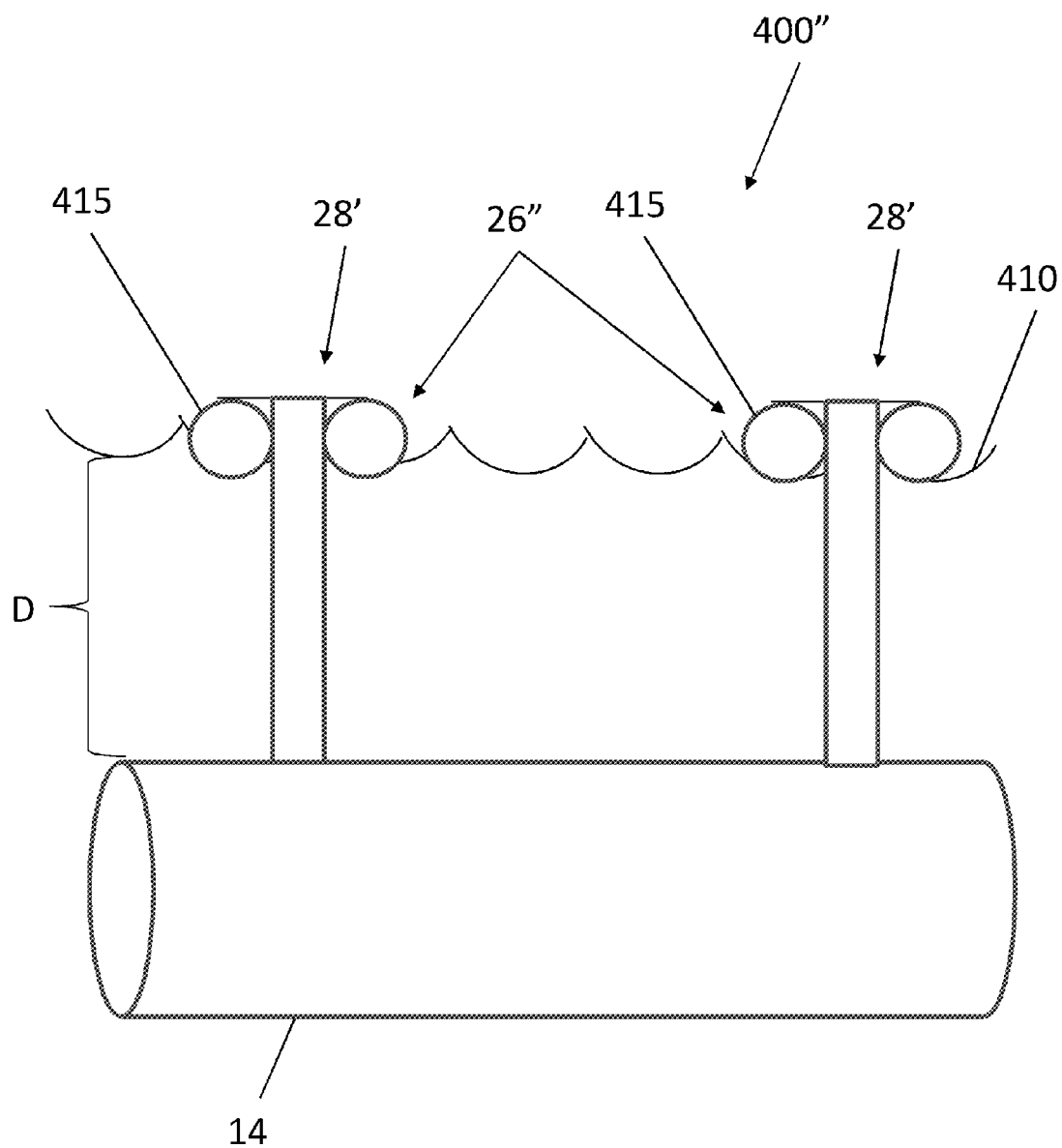

It should also be understood that the buoys 26 may also be configured to support a serve purpose to the support structure 28. For example, as depicted in FIG. 4C, the support structure 28' include buoys 26" having one or more floating elements 415.

Figure 5:
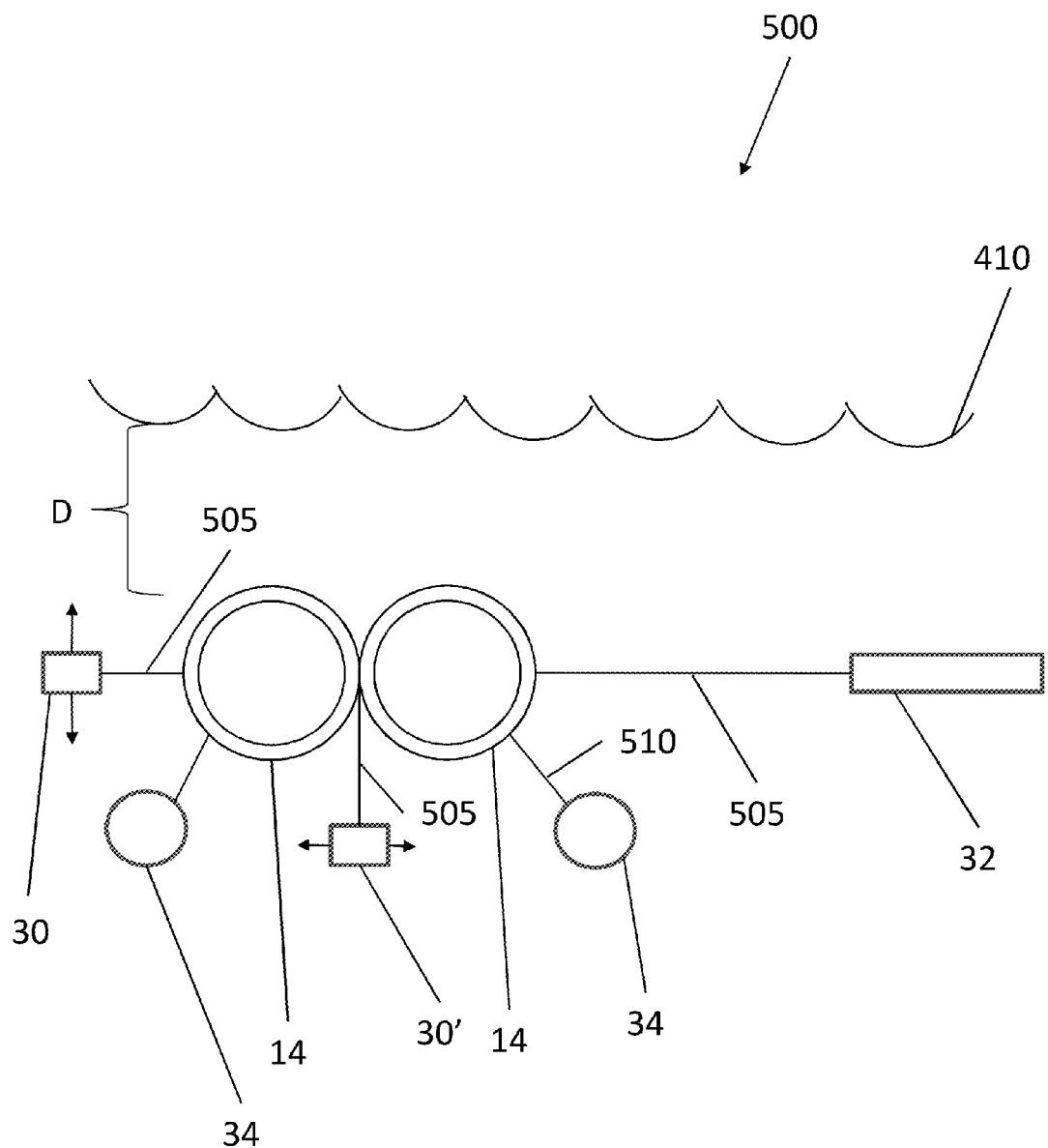
FIG. 5 is a diagram of another exemplary schematic depiction of a tube and support configuration for positioning the tubes at a depth in a body of water for use in the transportation system in accordance with embodiments of the present disclosure.

FIG. 5 illustrates another exemplary and non-limiting embodiment of a support configuration 500 of the present disclosure for positioning the tubes at a predetermined depth D in a body of water 410. The at least one tube 14 (here depicted as two tubes 14 in a side-by-side configuration) is disposed beneath the surface of the water 410 and maintained at a designated depth D by at least one active stabilizer (e.g., vertical active stabilizers 30 and/or horizontal active stabilizers 30') and at least one passive stabilizer 32. The one or more active stabilizers 30, 30' are secured to tube 14 via respective stabilizer connections 505, and respectively include one or more motors (not shown) that can be activated to adjust the position and/or rotation of the tube 14 to maintain a generally static relative position and/or orientation. One or more processors may be configured to receive relative position and/or orientation information (e.g., from gyroscopes, optical sensors, and/or pressure sensors), and control the active stabilizers 30, 30' and/or ballasts to maintain a relative position and/or orientation. The passive stabilizer 32 is structured and arranged to act as a stabilizing keel (which may be oriented vertically or horizontally, as depicted). The configuration 500 may also include one or more sensors (e.g., pressure sensors and/or gyroscopes) to determine the depth and/or orientation of the tube 14. The support configuration 500 also includes one or more ballasts 34, which may be connected to the tubes 14 via respective ballast connections 510. In embodiments, one or more passive stabilizers 32 may cooperate with the active stabilizers 30, 30' and ballasts 34 (e.g., ballast tanks and valve systems) to adjust and/or maintain the depth and/or rotation of the tubes 14 in the water 410. The ballasts 34 can be filled with, for example, seawater to decrease the buoyancy of the support configuration 500, or alternatively, may be filled with air to increase the buoyancy of the support configuration 500. As shown in FIG. 5, the one or more passive stabilizers 32 are connected to the tube 14 (via stabilizer connection 505) at a distance from the tube 14, and is structured and arranged to provide stability to the tubes 14. As should be understood, as shown in FIG. 5, the vertical active stabilizer 30 provides stability and/or adjustment in the vertical direction (e.g., up and/or down) to adjust a depth of the tube 14, and horizontal active stabilizer 30' provides stability and/or adjustment in the horizontal direction (e.g., left and/or right) to adjust a position of the tube 14. As noted herein, other embodiments may utilize spar buoys, a pendulum and a natural frequency of oscillation to provide additional horizontal and/or vertical stability.

Figure 6A:
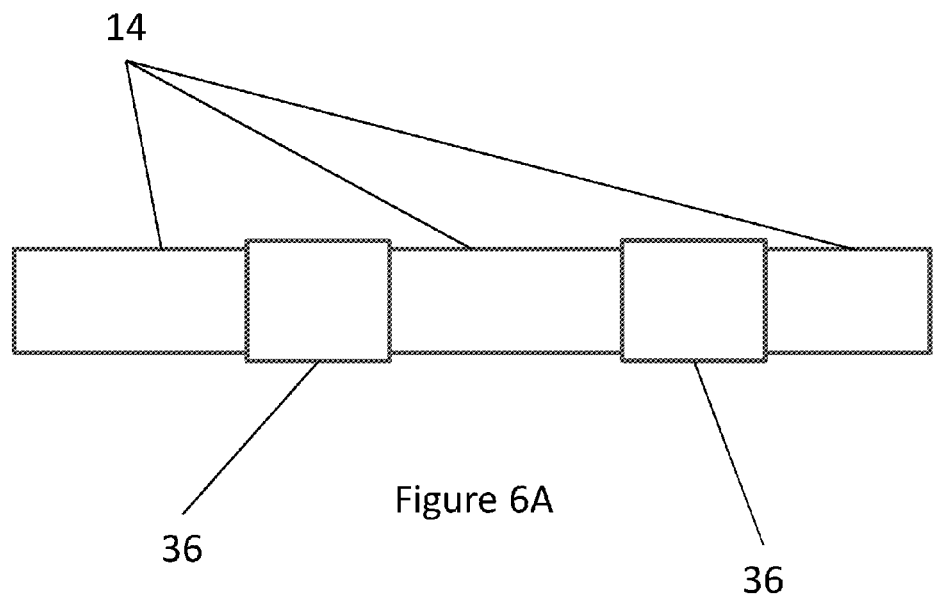
FIGS. 6A-6E are exemplary schematic depictions of additional tube and support configurations for positioning the tubes at a depth in a body of water for use in the transportation system in accordance with embodiments of the present disclosure.

FIGS. 6A-6E illustrate additional embodiments of a support configuration of the present disclosure for positioning the tubes at a depth in a body of water. As shown in FIG. 6A, a series of joints 36 are provided at discrete locations in the transportation system between two sections of tube 14. In some embodiments, for example, these joints 36 may be used in regions of slower capsule speeds (e.g., near stations, and/or at land/sea junctions). In accordance with aspects of the disclosure, the joints 36 allow the corresponding tube sections to adjust (or move), e.g., with the flow of the body of water, while maintaining a stable tube environment for capsule travel. Is should be understood that the joints 36 are 360° around the tube 14. In embodiments, the joints 36 may comprise a rubber material, elastomeric material, polytetrafluoroethylene (PTFE), ethylene tetrafluoroethylene (ETFE), other flexible material, and or composite materials (e.g., polymer material reinforced with flexible metal cables, wires, fibers, or strands). The joints 36 may be attached to the respective tubes 14, for example, using welding, clamping, or using fasteners.

In one exemplary and non-limiting embodiment of the present disclosure, each joint 36 allows relative angular movement of one tube 14 relative to its adjacent tube 14 within one or more predetermined angles of deflection θ. It should be understood that the one or more predetermined angles of deflection θ should be determined so that too great an angle between adjacent tube sections 14 is prevented. That is, as the capsule travels the tube 14, if the angle of deflection between adjacent tube sections is too great, then, for example, the passengers may be subjected to very high G-forces as the capsule passes this deflection angle. As such, in accordance with aspects of the present disclosure, the amount of deflection between adjacent tube sections 14 may be limited to a maximum deflection angle θ. In embodiments, the maximum deflection angle θ may be determined based on, for example, capsule design speed and type of cargo (e.g., human cargo, non-human cargo, or non-living cargo).

Figure 6B:
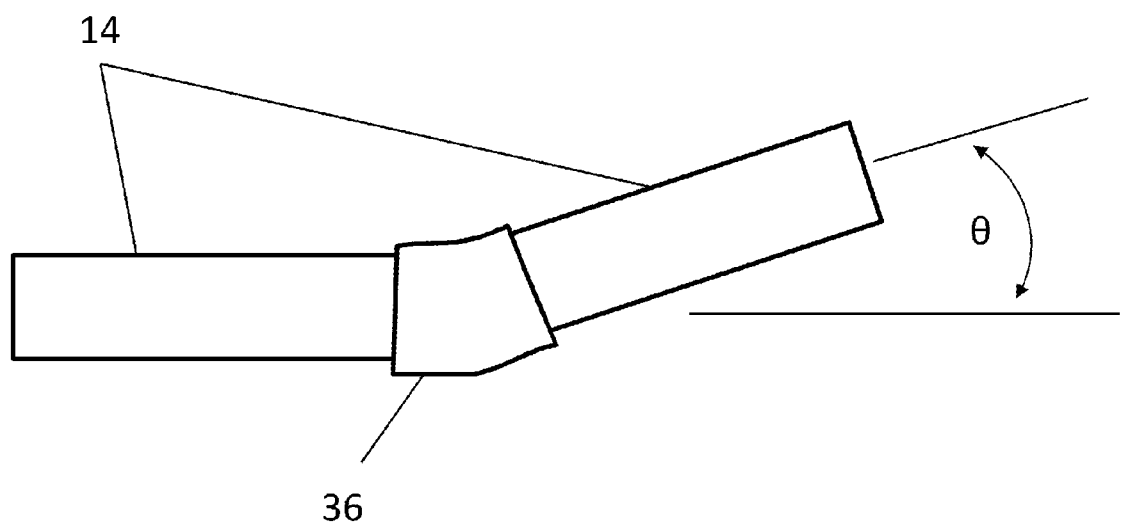
Figure 6C:
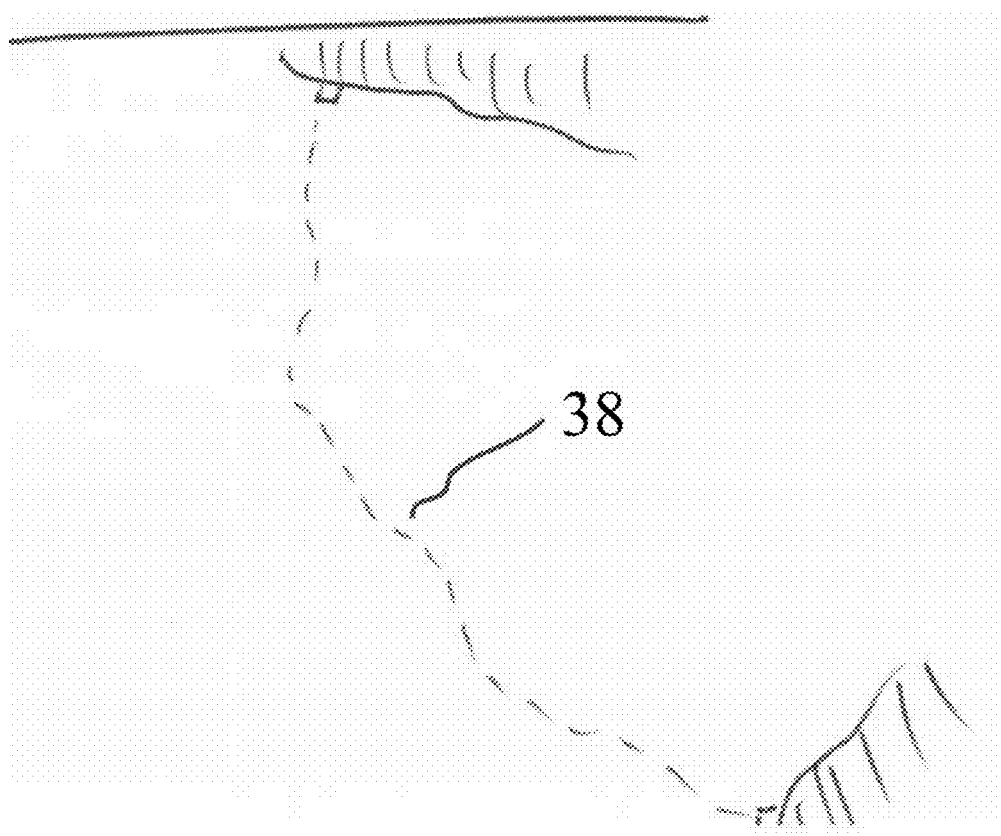

As shown in FIG. 6B, should the joint 36 reach the predetermined limit of deflection θ, the joint 36 stops at angle limit of deflection θ, in position, thereby allowing a corresponding joint (e.g., a downstream or upstream joint 36) to deflect to maintain the capsule system travel path 38, for example, as shown in FIG. 6C. Moreover, in accordance with aspects of the disclosure, the deflection depicted in FIG. 6B may be a vertical deflection (e.g., up or down), a horizontal deflection (e.g., left or right), or may be a combination of both vertical and horizontal deflections. The range of movement of the joint 36 may be limited utilizing one or more structures that limit the bending of the joint 36. For example, an approximately double cone-shaped restrainer may be arranged around or within the joint 36 to prevent the joint from bending beyond the include angle of the double cone-shape (which is configured to only allow the maximum deflection angle θ). With another exemplary embodiment, the joints 36 may include electromechanical actuators configured to limit the relative bending of the tubes to the maximum deflection angle θ and/or to control (e.g., limit or delay) the unbending of the joint 36. After the joint "locks out" it is configured and operable to transfer the deflection to the neighboring tube(s). In such a manner, when a maximum deflection is reached, the joints 36 are operable to transfer load(s) to a neighboring tube.

Figure 6D:
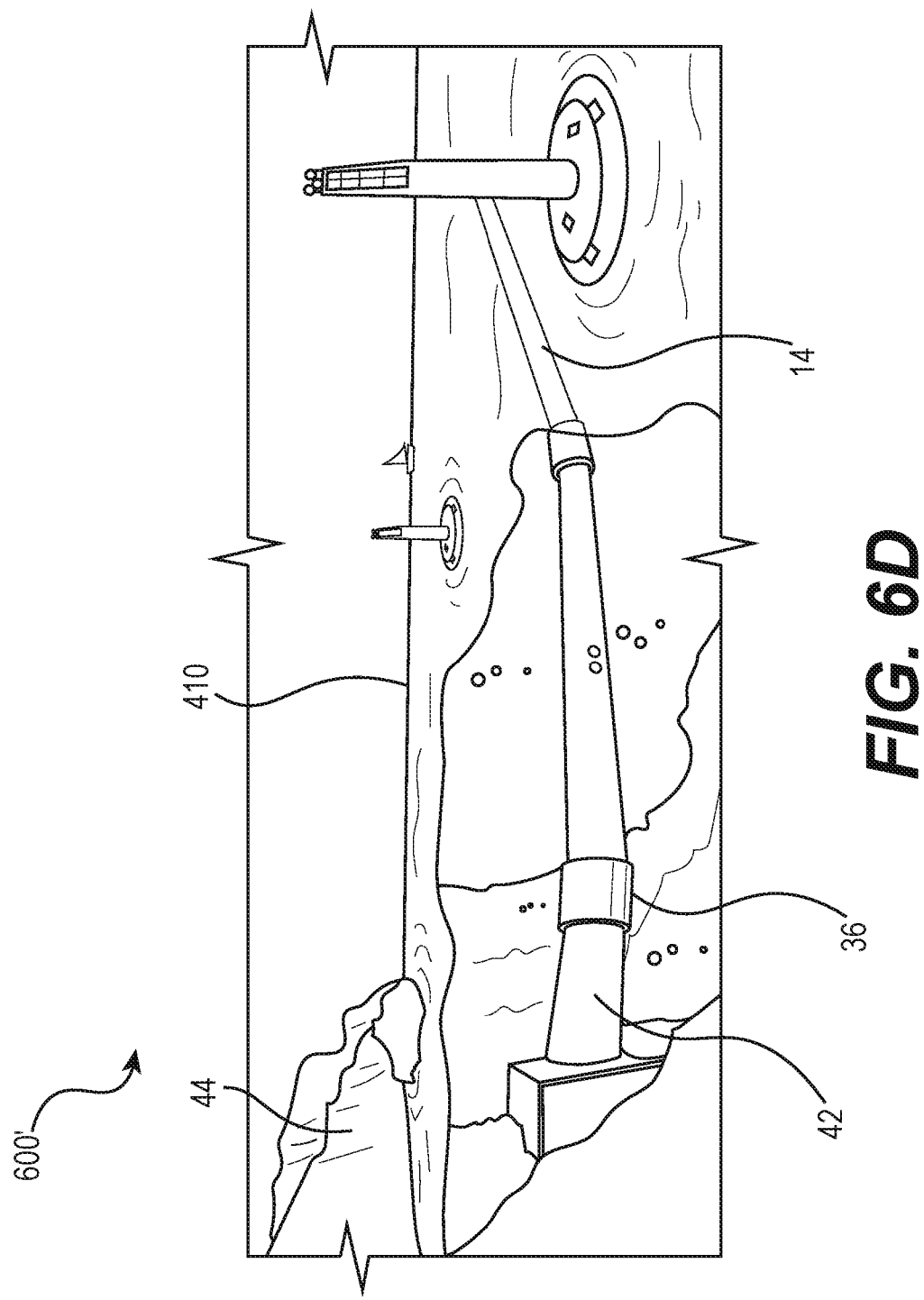

In embodiments, the tube may be above land (e.g., suspended off the ground over land or water), on land (e.g., on the surface of land or water), below ground, and/or below the surface of the water. In accordance with aspects of the disclosure, FIG. 6D illustrates a tube arrangement 600' having the at least one tube 14 disposed beneath the surface of the water 410 and connected to an inlet tube 42 through a joint 36. As shown in FIG. 6D, inlet tube 42 includes a first end that may at least partially be disposed in the water and a second end extending into a portion of land 44 abutting the water 410.

Figure 6E:
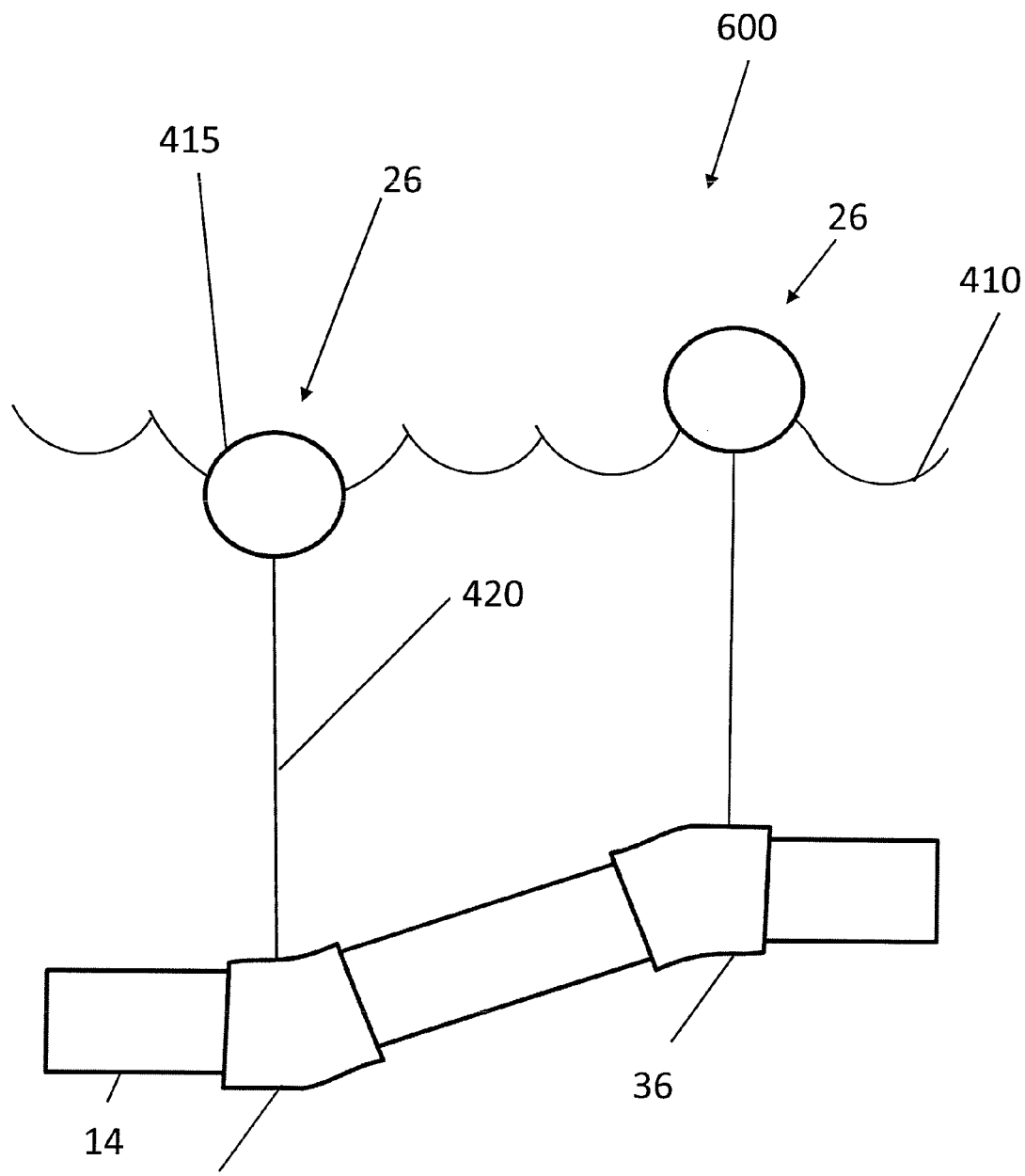

FIG. 6E illustrates another embodiment 600 of the present disclosure, wherein one or more buoys 26 and/or support members (not shown) are connected (via connections 420) with respective joints 36. In accordance with aspects of the disclosure, for example, in relatively calmer waters (e.g., in a bay or port area), as the floating elements 415 of the buoys 26 move with the surface of the water 410, the tube sections 14 are able to move relative to one another within the permitted angular range of the respective joints 36.

In embodiments, upon reaching the maximum deflection angle θ, the joint 36 may be temporarily locked (e.g., for a short period) at this maximum deflection angle θ before allowing the affected tube sections 14 to "unbend" toward a linear alignment. In embodiments, the "unbending" of the affected tube sections 14 may be slowed. For example, the forces (e.g., tidal forces) acting on tube sections 14 may cause two tube sections to deflect relative to one another, which will cause the joint 36 to bend. Assuming with this example, that the joint 36 was bent to its maximum deflection angle θ, upon a subsiding of the forces (e.g., tidal forces), which otherwise might allow the tube sections to return to their fully aligned state, the joint 36 remains at the maximum deflection angle θ for a period of time (e.g., 15 seconds), and then released (e.g., slowly). In accordance with aspects of the disclosure, by delaying and/or slowing the release of the angular orientation of the joint 36 (e.g., from the maximum deflection angle θ), sudden changes in the tube direction may be avoided. In certain embodiments, the delayed and/or slowed unbending may be utilized when a capsule is approaching or within the joint 36 bent at the maximum deflection angle θ.

In embodiments, the transportation system may be configured to shut down (e.g., temporarily), to slow the speeds of capsule in the system, or to stop sending additional capsules into the system should, for example, the body of water be experiencing extreme turbulence (e.g., large waves) that may cause high levels of tube movement. For example, sensors and or GPS information may be configured and/or utilized to detect extreme conditions (e.g., larger than normal waves, impactful weather) and actively control, for example, portions of the transportation system to adjust for the conditions. Such sensors may include, e.g., accelerometers, gyroscopes, and/or optical sensors. Such active controls may include, for example, slowing the capsule in the immediate area of the disturbance, as well as adjusting speeds of upstream capsules. The capsules may be slowed, for example, by controlling the propulsion systems to not provide acceleration to a passing capsule, deploying capsule braking systems (e.g., passive electromagnetic braking) or deploying a deceleration device. Examples of braking devices are also disclosed in commonly-assigned U.S. application Ser. No. 15/007,718, entitled "Deployable Decelerator," filed in the USPTO on even date herewith, the content of which is hereby incorporated herein by reference in its entirety. In additional embodiments, the active controls may include looking ahead along the travel path and adjusting the speed there through and/or adjusting alignment of the tube sections. The system may utilize the communication capabilities of the tubes and/or capsules to send and/or receive instructions for adjustments to the speed there through and/or adjustments for alignment of the tube sections.

Figure 7A:
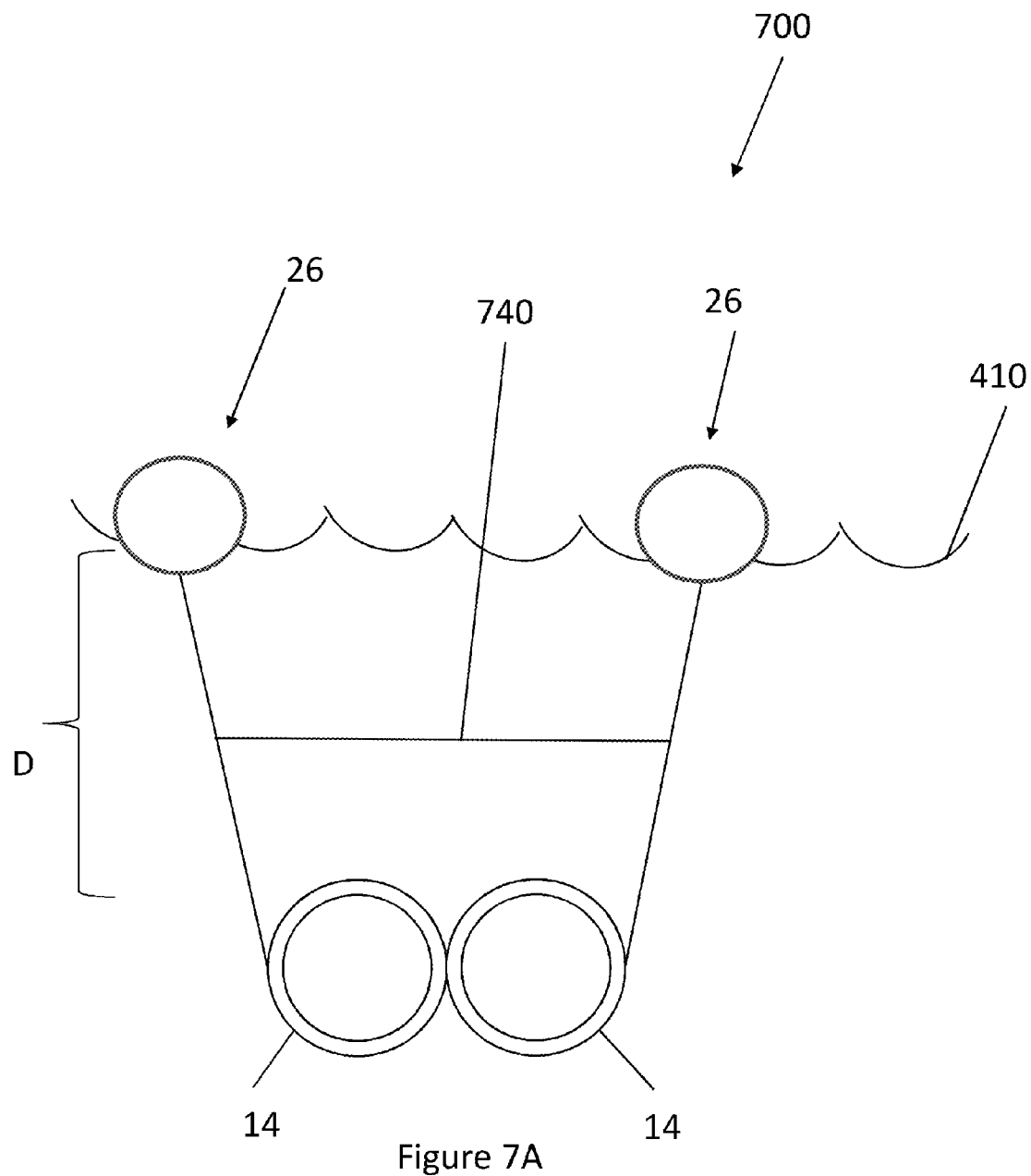
FIGS. 7A-7C are exemplary schematic depictions of additional tube and support configurations for positioning the tubes at a depth in a body of water for use in the transportation system in accordance with embodiments of the present disclosure.

FIGS. 7A-7D illustrate yet another embodiment of the support configuration of the present disclosure for positioning the tubes 14 at a predetermined depth in a body of water. As shown in FIG. 7A, with this exemplary and non-limiting embodiment, a cross support member 740 extends between the plurality of buoys 26 to provide lateral support and structure to the system. It should be understood that this cross support member 740 is optional. The at least one tube 14 is disposed beneath the surface of the water 410 and maintained at a designated depth D by a plurality of buoys 26. As the structure may undergo torsional deflections, the structure may include one or more stabilizers (e.g., passive or active), anchors, or other suitable structures, for example, along the length of the tubes, to reduce or minimize such torsional deflections.

Figure 7B:
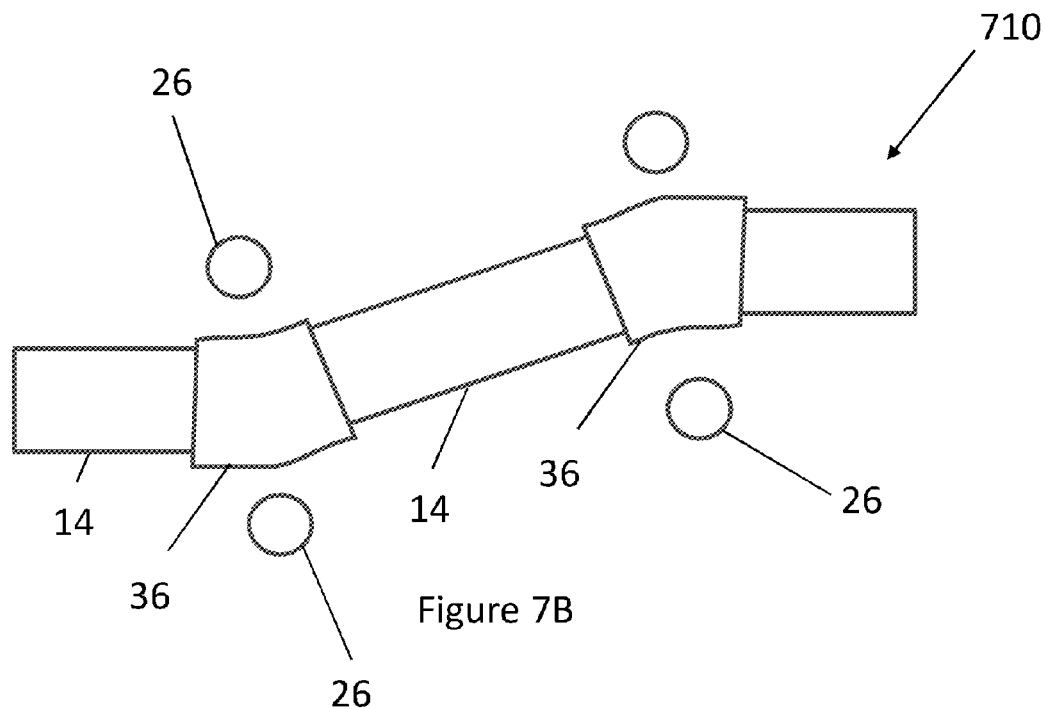
Figure 7C:
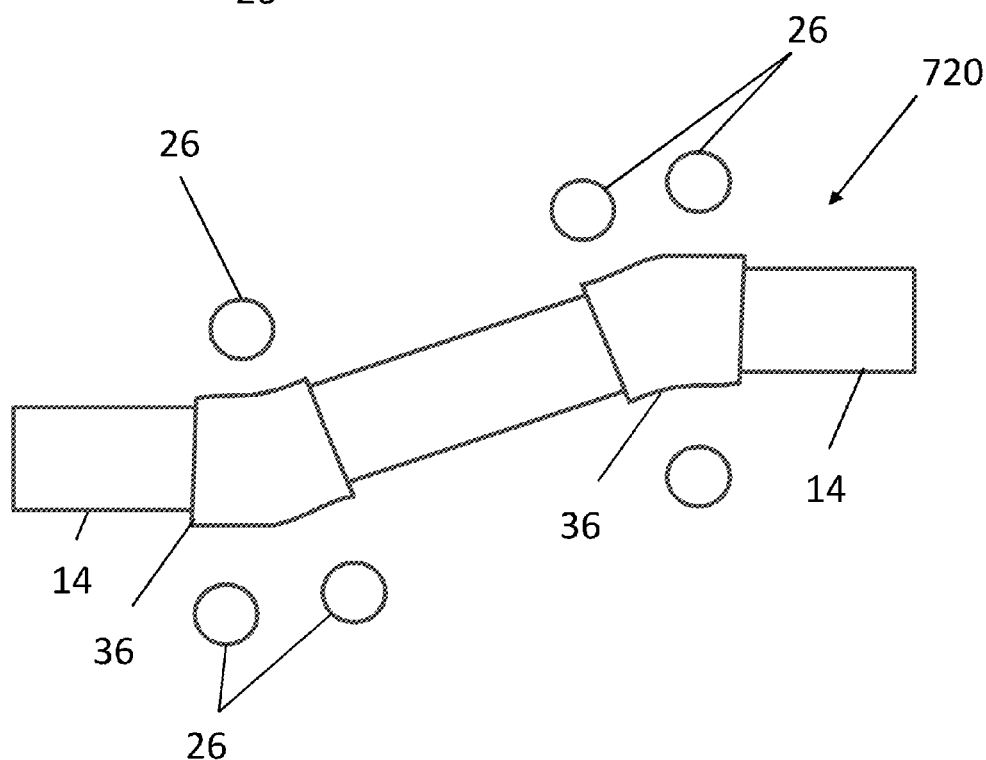

As shown in FIGS. 7B and 7C, in another embodiment of the present disclosure, the plurality of buoys may be grouped in a variety of numbers to ensure proper alignment of the tubes 14 relative to each other. For example, as shown in FIG. 7B, a pair of buoys 26 is attached to each joint 36 on opposite sides via attachments (not shown). As shown, in FIG. 7C, three buoys 26 are attached to each joint 36 via attachments (not shown), with two buoys arranged on the outside of the "curve" and one buoy arranged on the inside of the "curve." While the exemplary embodiment of FIG. 7C depicts two buoys arranged on the outside of the "curve" and one buoy arranged on the inside of the "curve," the disclosure contemplates other arrangements. For example, two buoys may be arranged on the inside of the "curve" and one buoy arranged on the outside of the "curve," or a set of four buoys 26 may be attached to each joint 36. Moreover, while this embodiment depicts the buoys attached at the joints 36, the disclosure contemplates additional buoys may be attached to the tube 14 itself. The buoys may be attached to the joints 36 and/or to the tube 14 itself using, for example, steel cables with suitable connectors (e.g., hooks).

Figure 8A:
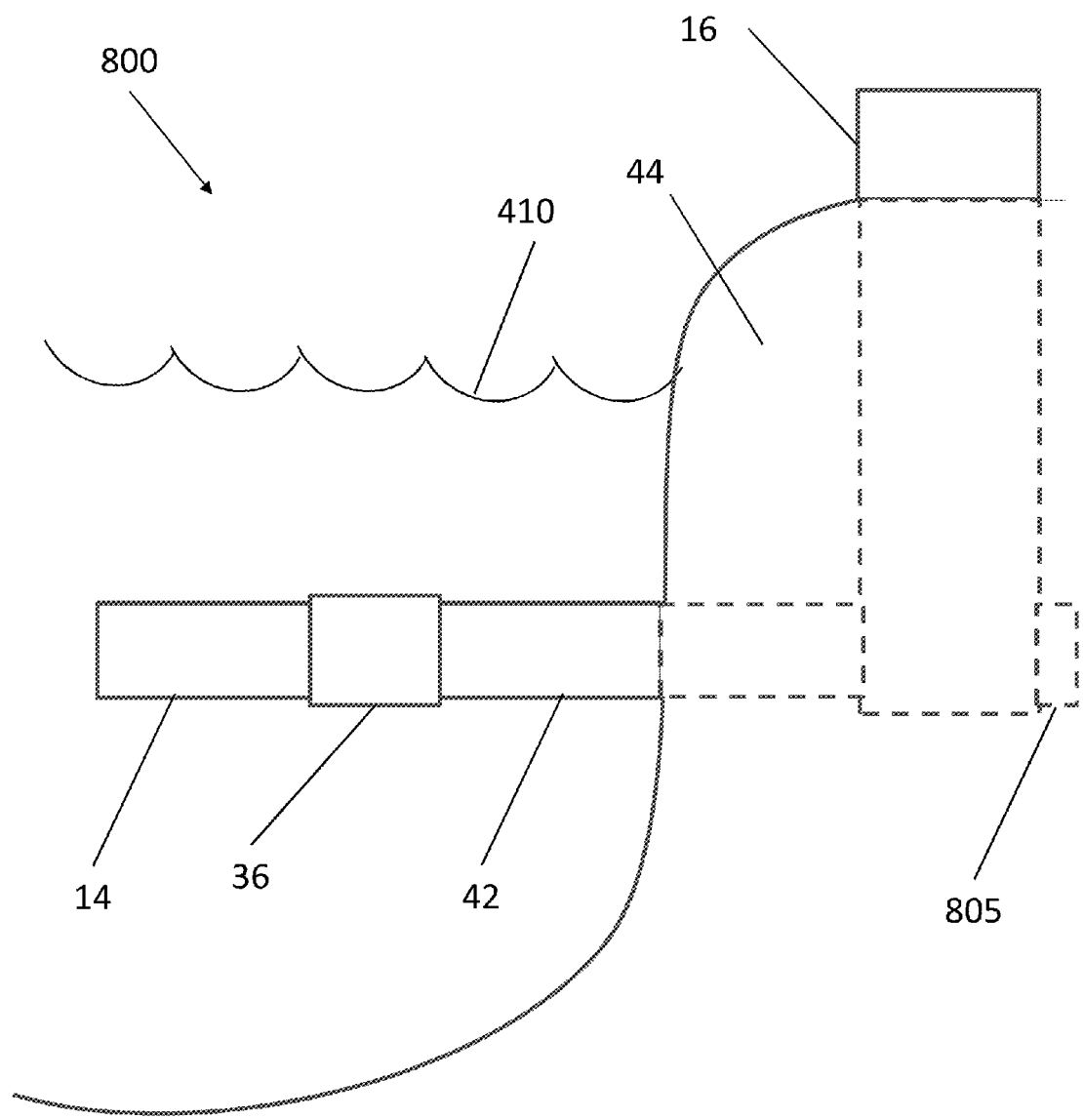
FIG. 8A-8G are illustrations of exemplary tube and support configurations for positioning the tubes at a depth in a body of water for use in the transportation system and depictions of an off-shore shipping port (and the results thereof) in accordance with embodiments of the present disclosure.

FIGS. 8A-8G illustrate further exemplary and non-limiting aspects of embodiments of the present disclosure. As discussed herein, in embodiments, the tube may be above land (e.g., suspended off the ground over land or water), on land (e.g., on the surface of land or water), below ground, and/or below the surface of the water. In accordance with aspects of the disclosure, FIG. 8A illustrates a tube arrangement 800 having the at least one tube 14 disposed beneath the surface of the water 410 and connected to an inlet tube 42 through a joint 36. As shown in FIG. 8A, inlet tube 42 includes a first end that is at least partially disposed in the water and a second end extending into a portion of land 44 abutting the water 410. In accordance with aspects of the present disclosure, inlet tube 42 may be configured to allow access to station 16 and/or to a further section of tube 805 extending inland.

Figure 8B:
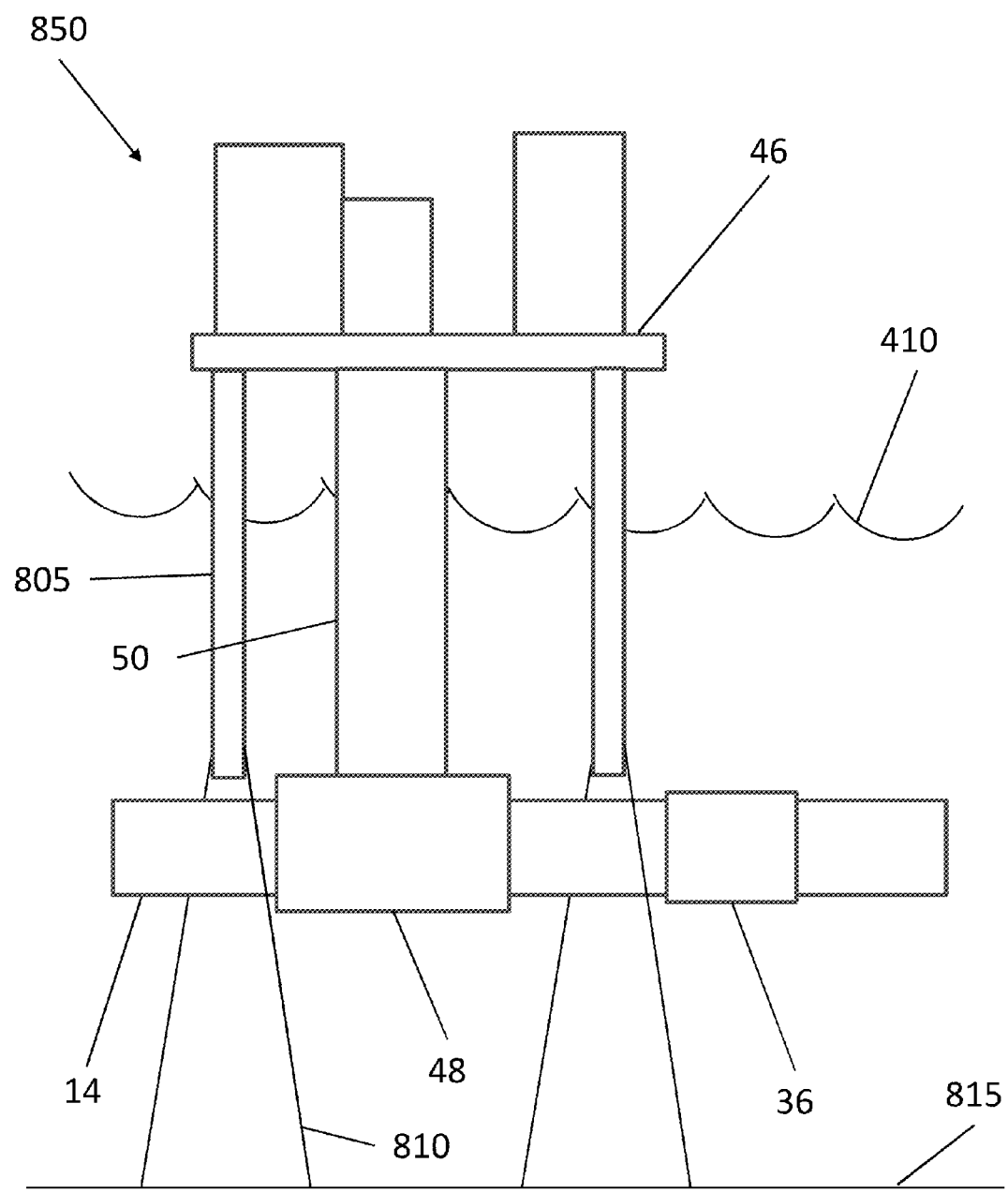

In accordance with aspects of embodiments of the present disclosure, FIGS. 8B, 8C, 8D, 8E and 8F depict platforms for accessing the transportation system from a water-based access port. For example, as shown in FIG. 8B, with this arrangement 850, a platform 46 is disposed above a station 48 provided in the transportation system. An access channel 50 (e.g., including one or more elevators, stairs, escalators, etc.) connects the station 48 and the platform 46. In embodiments, the platform 46 may be free floating (e.g., using buoys), releasably secured to the tube or station of the system, or secured to the sea floor below the tube. As shown in FIG. 8B, with arrangement 850, the platform 46 is secured to the sea floor 815 below the tube 14 with vertical beams 805 and A-frame supports 810. In embodiments, for example, the platform 46 may be an oil drilling rig, and the tube and capsules may be configured to transport petroleum products or materials from the drilling rig to, for example, an onshore petroleum refining facility. As noted above, the platform 46 may be releasably secured to the tube 14 or station 48 of the system instead of (or in addition to) being secured to the sea floor 815. In accordance with aspects of the disclosure, for example, with the platform 46 releasably secured to the tube or station of the system, should the platform 46 need to be moved to another location, the platform 46 can be released from its current location, moved to a new location along the tube 14, and reattached to the tube 14 at the new location. In embodiments, the platform 46 may include a tension-leg platform and/or a spar platform.

Off-Shore Loading/In-Land Port

Figure 8C:
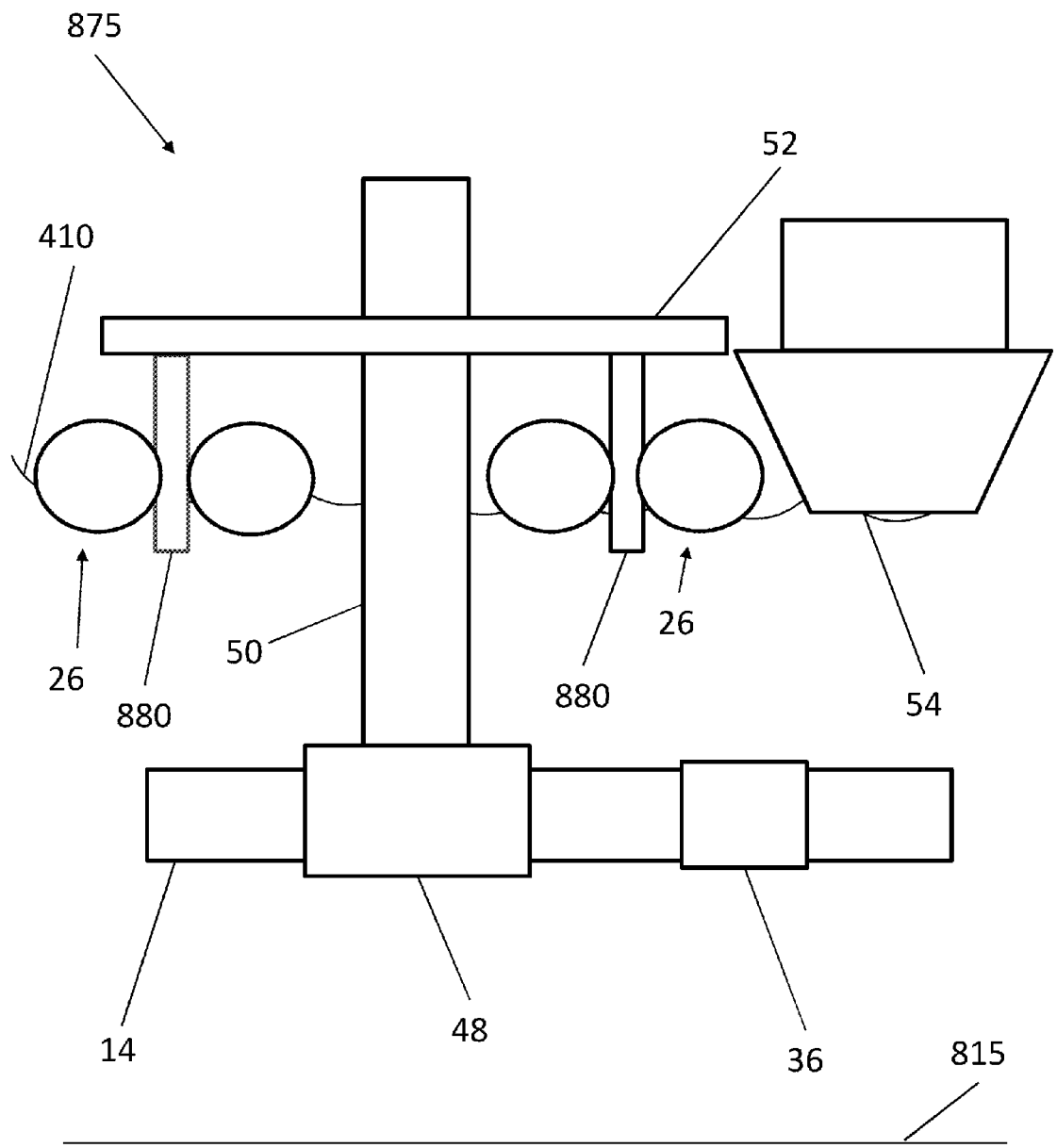

As shown in the exemplary embodiment of FIG. 8C, arrangement 875 includes a docking platform 52 structured and arranged for allowing a boat 54 or other non-water transport vehicle (e.g., helicopter) to have access to the underwater station 48. As shown in FIG. 8C, with this arrangement 875, the platform 52 is floating on the surface of the water 410 above the sea floor 815, and with this exemplary and non-limiting embodiment, utilizes buoys 26 attached to vertical beams 880 secured to the platform 52. In certain embodiments, the platform 52 may be tethered to the sea floor.

Figure 8D:
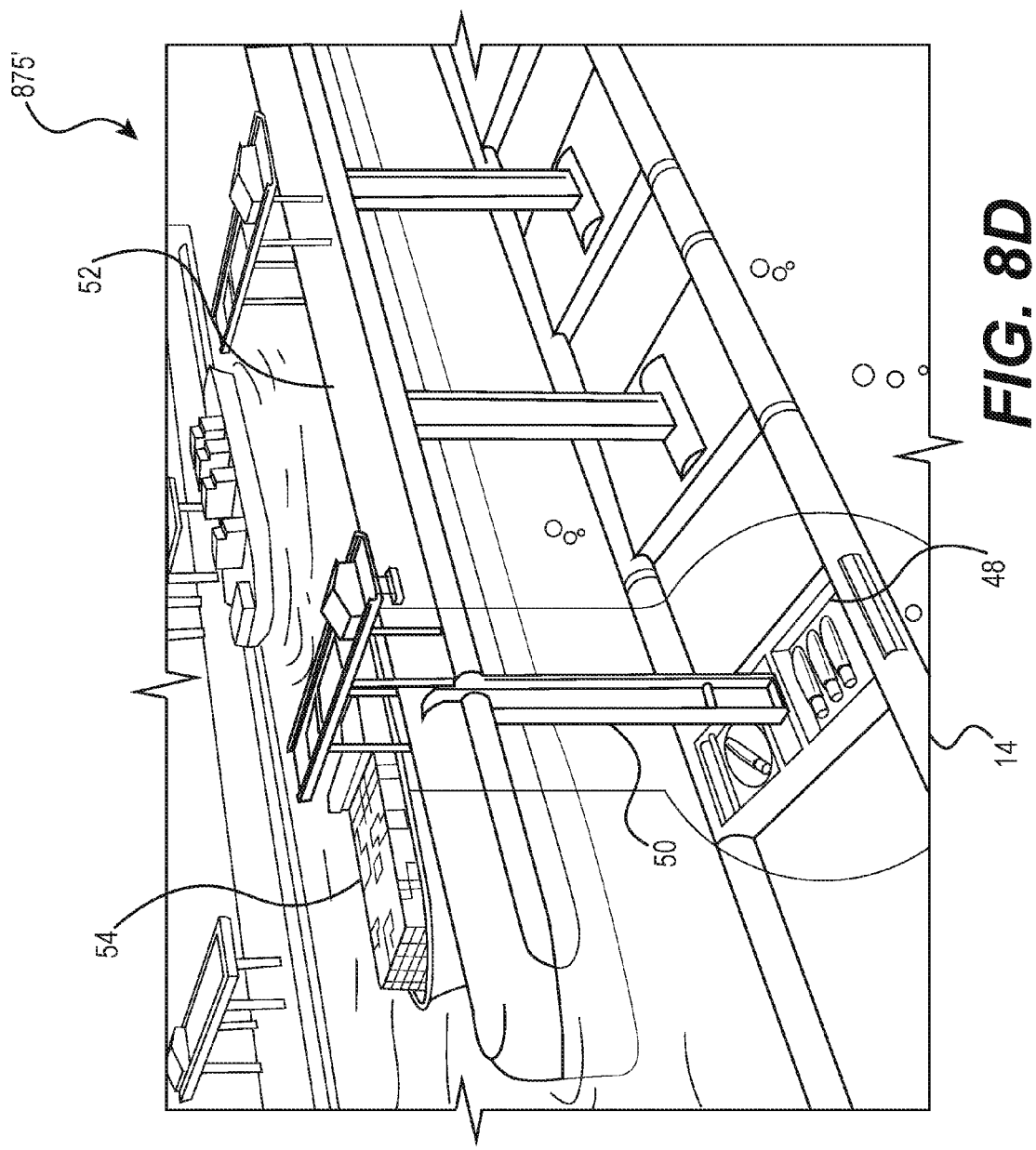

FIG. 8D shows an exemplary arrangement 875' including a docking platform 52 structured and arranged for allowing a boat 54 or other non-water transport vehicle (e.g., helicopter) to have access to the underwater station 48. As shown in FIG. 8D, with this arrangement 875', the platform 52 is floating on the surface of the water. An access channel 50 (e.g., including one or more freight elevators, stairs, escalators) connects station 48 and platform 52. Platform 52 could alternatively be positioned on land. The arrangement 875' may include manned, autonomous, and/or semi-autonomous equipment (e.g., cranes, elevators, loaders, and rotary skids) configured to move the cargo from the ships to the station 48, and into the capsules at the station 48, and move the capsule into the tubes 14.

Figure 8E:
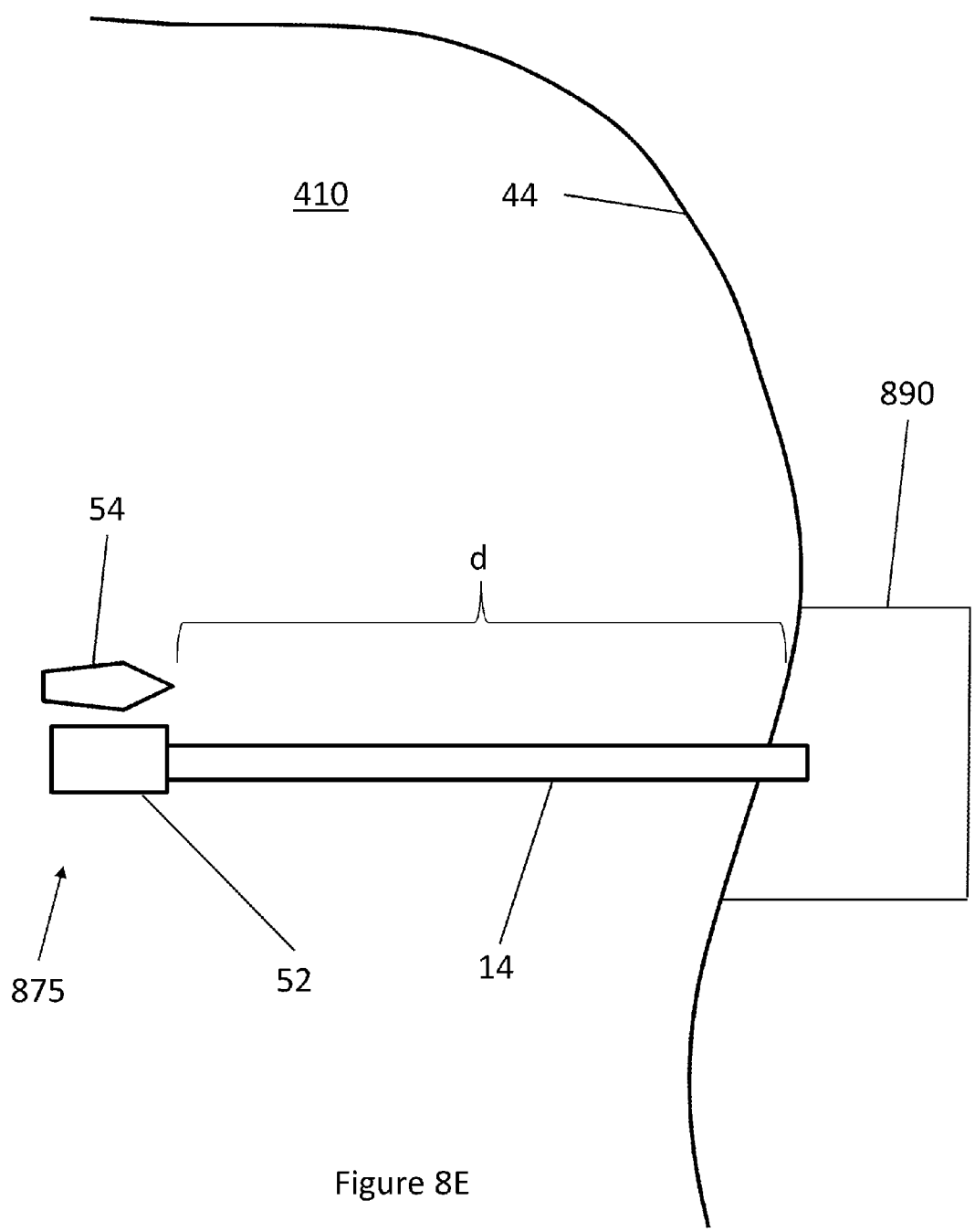

FIG. 8E shows an exemplary top view of the arrangement 875 in accordance with aspects of the disclosure, wherein the platform 52 is arranged on the sea 410 at a distance d from a port 890 with a transportation tube 14 connecting the platform 52 with the port 890. As shown in FIG. 8E, a ship 58 is docked at the platform for unloading (and/or loading) cargo. Once unloaded, the cargo (not shown) is then transported via a capsule (not shown) traveling within the tube 14 (which may be above-water and/or below water) to the port 890.

Conventionally, ships sailing into port will line up in a queue extending well offshore and await their turn to unload (and/or load) their cargo. This results in a seemingly perpetual queue of cargo ships extending from the port out into the sea, which creates an eyesore and pollution close to shore. By implementing the aspects of the present disclosure, however, the offloading of cargo may be conducted at a distance d from the port. In embodiments, the distance d may be, for example, fifteen miles. In accordance with aspects of the disclosure, by locating the platform 52 away from shore, the queue of cargo ships will not be viewable from shore (or may be less viewable), thus reducing the eyesore of cargo ships, and reducing pollution closer to shore. In accordance with further aspects of the disclosure, by locating the platform 52 away from shore, efficiencies for cargo transfer can be increased.

Figure 8F:
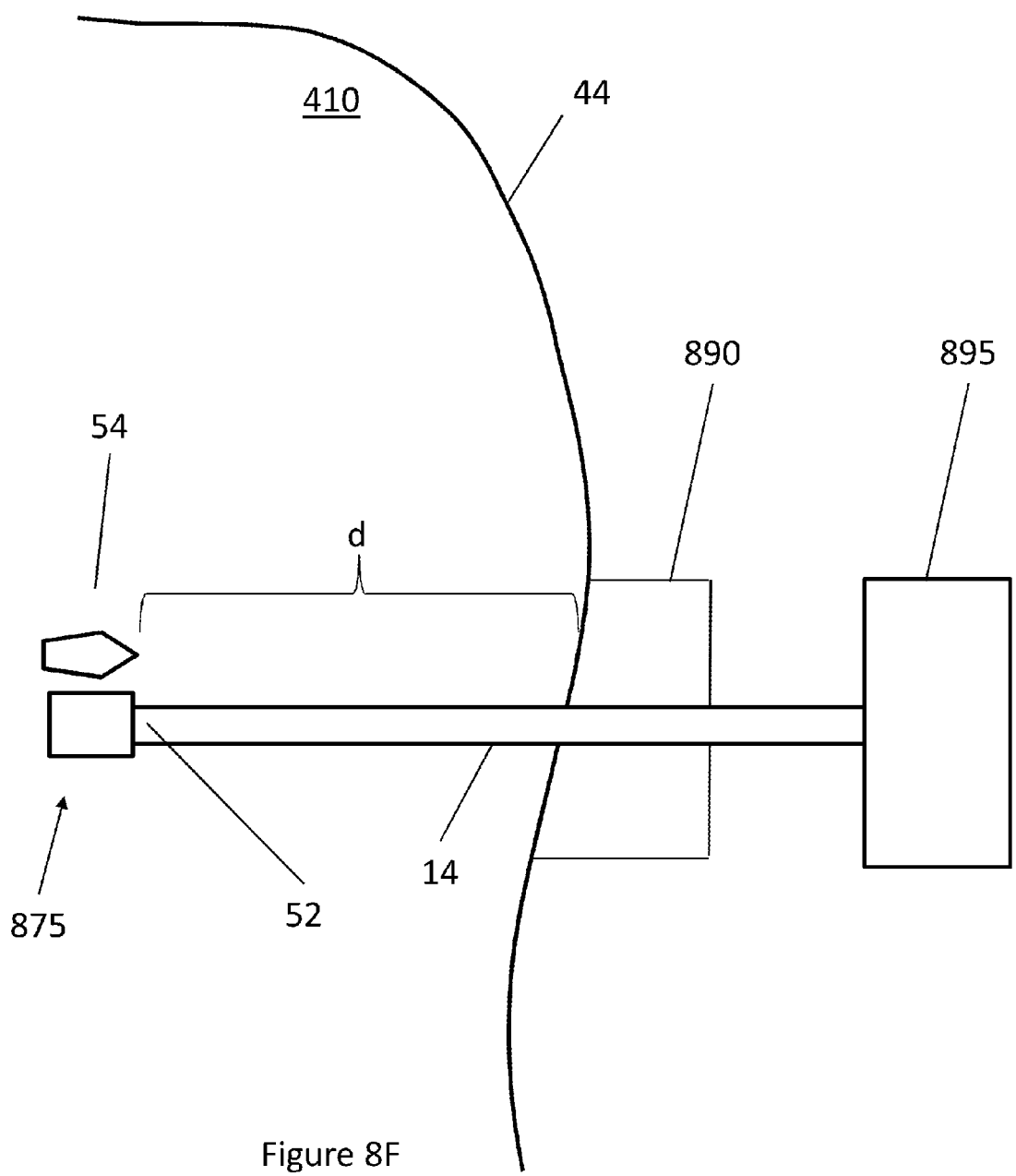

FIG. 8F shows an exemplary top view of the arrangement 875 in accordance with aspects of the disclosure, wherein the platform 52 is arranged on the sea 410 at a distance d from a port 890 with the tube 14 connecting the platform 52 with an inland cargo offloading/on-loading location 895 (while bypassing the port area 890). As should be understood, the port area 890 may utilize a large amount of coastline property that is highly valuable. For example, the ports of Los Angeles and Long Beach (which are located adjacent one another) occupy approximately 10,700 acres of land and water along 68 miles of waterfront.

As discussed above, with embodiments of the present disclosure, the cargo ships no longer need to travel all the way into the port area 890 to offload or on-load cargo. With this in mind, by utilizing aspects of the present disclosure, the location of the "port" itself (e.g., the location of the off/on loading equipment (e.g., manned and/or autonomous or semi-autonomous equipment), such as cranes, the cargo container storage areas, and the on/off loading equipment to load the removed cargo onto other types of vehicles (e.g., trucks and/or trains) for downstream distribution) may be moved to a location remote from the coastline. That is, as the cargo ships no longer have a need to travel all the way to the shoreline, there is an opportunity to relocate the infrastructure of the "ports" to an inland location, thus freeing up the coastline areas previously utilized as the shoreline port, for other development opportunities (e.g., residential or commercial real estate). Thus, as shown in FIG. 8F, in accordance with aspects of the disclosure, the cargo offloading/on-loading location 895 is located inland and remote from the port area 890, which frees up the port area 890 for other land use opportunities.

Figure 8G:
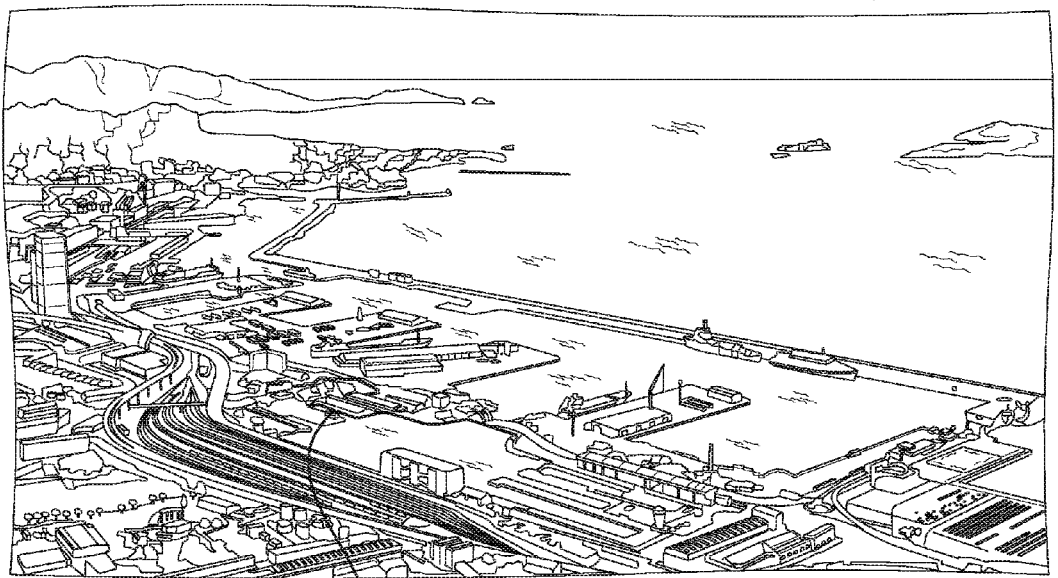
Figure 8G:
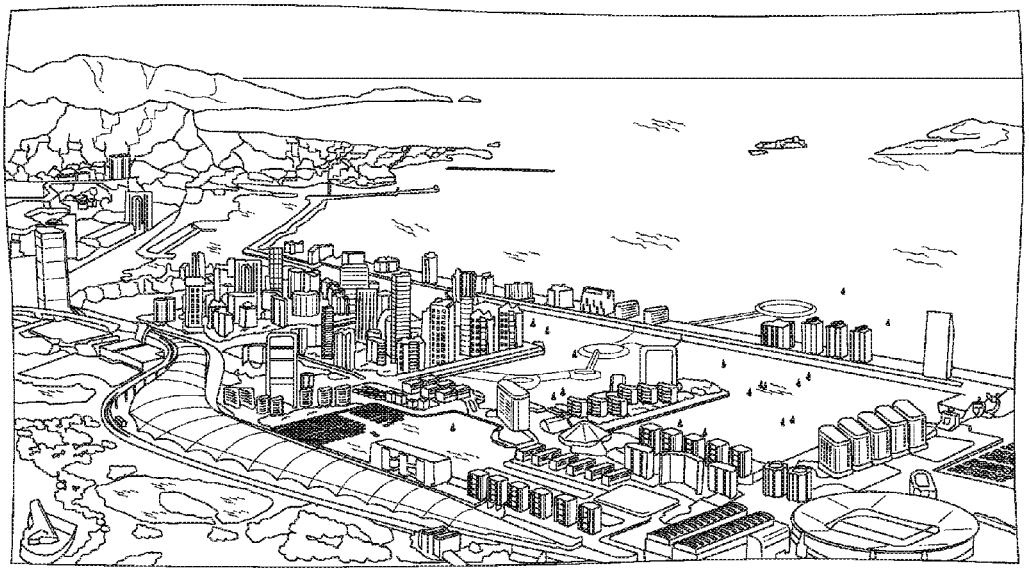

FIG. 8G shows an exemplary current view (top) of the Port of Marseilles 897 having a port area 890, and a representation of the same area 899 (bottom), after locating the port remotely (not shown), in accordance with aspects of the present disclosure, and redeveloping the water-front property. As shown in the views of FIG. 8G, by moving the port area 890 and infrastructure away from the coast line, this highly valuable real estate can be repurposed, for example, for residential and/or commercial real estate.

Further contemplated embodiments of the tube transportation may utilize the high-speed tube transportation system to move cargo beyond the port infrastructure area (e.g., situated on the coastline or at a remote location) to one or more downstream destinations (e.g., a final destination, an airport, or some other transportation hub). In such embodiments, cargo may be off-loaded from a cargo ship at an off-shore docking area, and placed in capsules for transport for a high-speed transportation system. In contrast to the above described embodiment, the transport of the capsules containing the cargo from the off-shore docking area to the port infrastructure area may be through lower speed transportation tubes, e.g., using a different propulsion system and/or an un-evacuated transportation tube. Upon arrival at the port infrastructure area, the capsules may be moved (or otherwise directed) from the lower-speed transportation tube to a high-speed transportation tube. By utilizing these aspects of the disclosure, the off-loading (and on-loading of cargo) and the movement of the cargo containers to vehicles for transport to a downstream (e.g., final) destination can be accelerated by utilizing a common transport vehicle (i.e., the capsule) to move the cargo through multiple phases (e.g., off the ship and out of the port area) of the cargo-transit route. In further contemplated embodiments, a high-speed transportation system may originate at a port infrastructure area itself (e.g., without utilizing an off-shore docking area or connection thereto). Such a high-speed transportation system may provide tube transportation paths to one or more downstream destinations (e.g., a transportation hub, a factory, a final destination).

In-Situ Manufacturing

Referring back to FIG. 3, the tubes 14 of transportation system 10 are structured and arranged to receive and support the high speed travel of the capsule there through. As such, it is contemplated that the tubes 14 may be created using one or more distinct manufacturing processes with a variety of materials, which may depend on the technical and environmental requirements, and location of the tubes 14 of the transportation system, amongst other considerations. In one embodiment of the present disclosure, the tubes 14 may be formed from reinforced uniform thickness steel or a metal composite material and welded together in a side-by-side configuration to allow the capsules to travel both directions (i.e., one tube for each direction). It is contemplated that the specified tube wall thickness may be necessary to provide sufficient strength for the load cases considered, such as, for example, pressure differential, bending and buckling between pillars, loading due to the capsule weight and acceleration, as well as seismic considerations.

In embodiments of the present disclosure, the tube may be manufactured in-situ, wherein, for example, raw material(s) are fed-in and composite tube structure is built on location. With one exemplary and non-limiting embodiment, an in-situ manufacturing system may produce up to 1 km of 2-way tube per day, per machine, with other production rates contemplated by the disclosure.

Figure 9A:
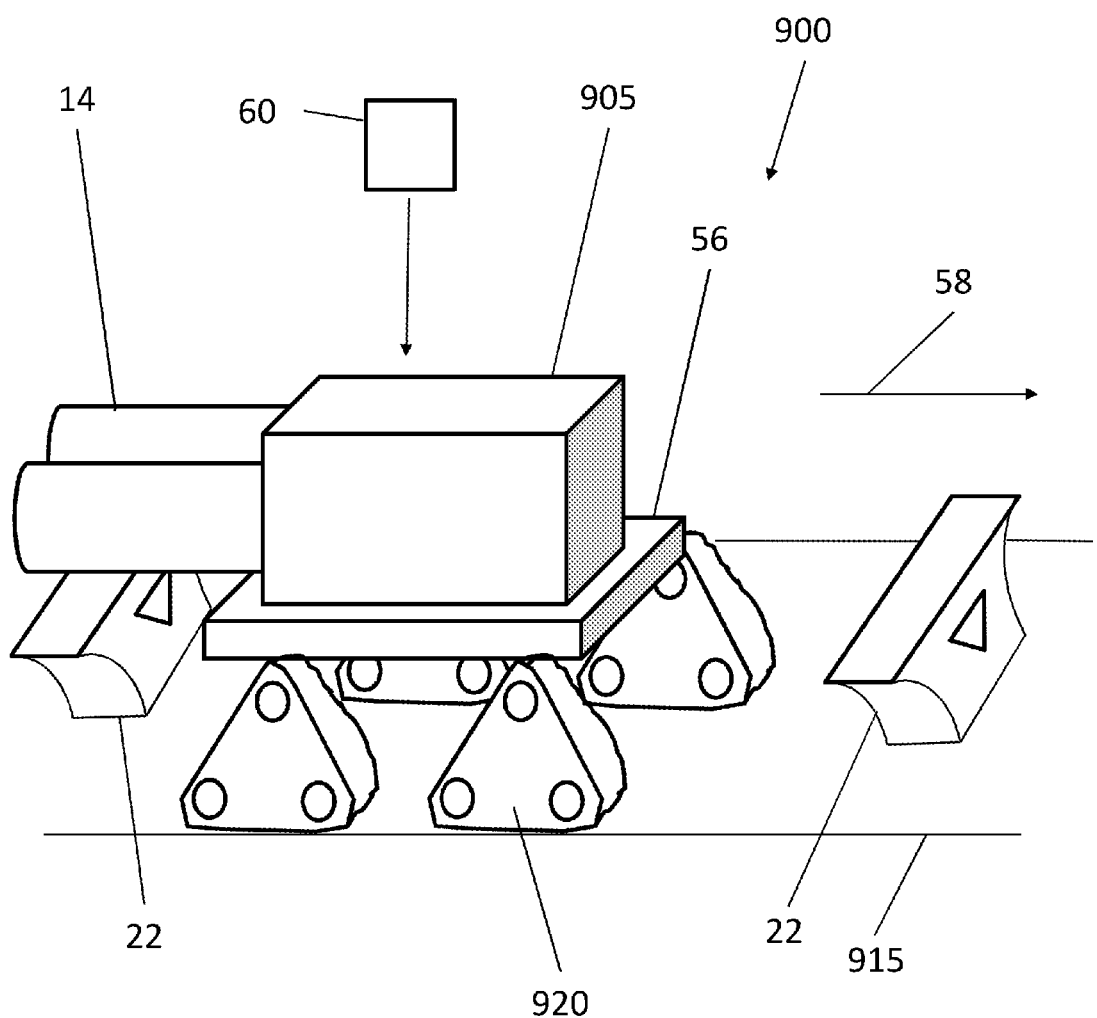
FIGS. 9A-9C are exemplary depictions of tube manufacturing processes and apparatuses for use with the transportation system in accordance with embodiments of the present disclosure.
Figure 9B:
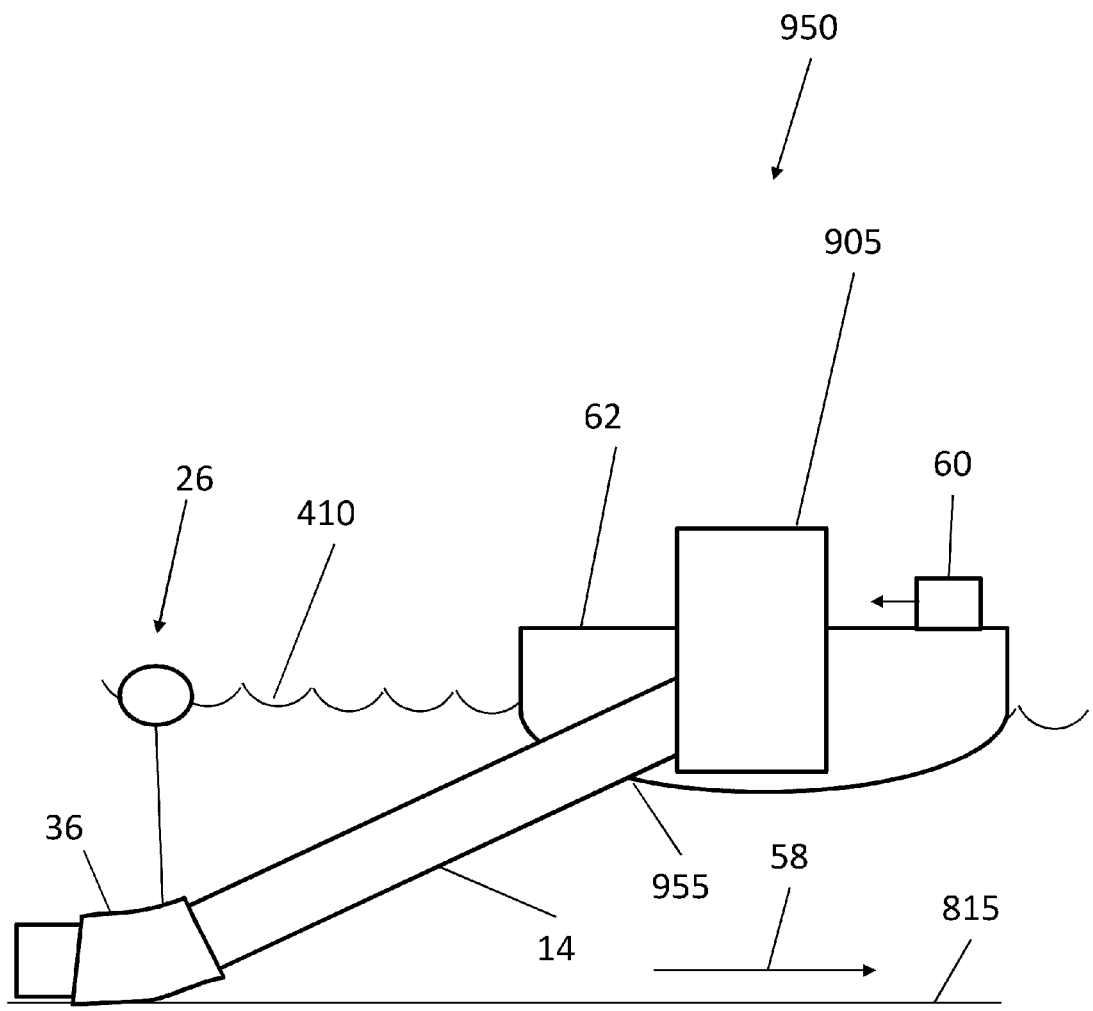

FIGS. 9A and 9B schematically depict exemplary and non-limiting embodiments of the present disclosure for manufacturing the tubes 14 of the transportation system. For example, FIG. 9A schematically illustrates the use of in-situ manufacturing system 900 to manufacture and assemble tubes 14 on land (or on pillars 22 arranged on land). In this embodiment, a movable tube fabrication machine 56 is operable to move on land, and is directed along construction route 58. Raw materials 60 are fed to a schematically illustrated suitable tube manufacturing system 905, which is operable to output tube sections 14. As should be understood, the suitable tube manufacturing system 905 may be configured based upon the type of tube construction and types of raw materials, amongst other considerations. The finished tube sections 14 are placed in position on pillars 22 and attached (e.g., directly or indirectly via struts and other known supports) to the pillars 22. In certain embodiments the movable tube fabrication machine 56 and/or the pillars 22 are sized such that the movable tube fabrication machine 56 can pass over downstream pillars 22, which may be placed along the construction route 58 prior to the passing of the movable tube fabrication machine 56 (or be placed at the same time as the tube). As shown in FIG. 9A, the moveable tube fabrication machine 900 comprises a motor (not shown) configured to propel the moveable tube fabrication machine 900, and wheels or treads 920 driven by the motor, and operable to support the moveable tube fabrication machine 900 riding along the approximate path 58 of the transportation system.

FIG. 9B schematically illustrates the use of in-situ manufacturing system 950 for use on a body of water 410 to manufacture and assemble tubes 14 for use under water (e.g., arranged on a sea floor 815). In this embodiment, a floating movable tube fabrication machine 62 (e.g., a ship, boat, barge, or sea vessel) is directed along construction route 58. Raw materials 60 are fed (e.g., via a conveyor) to a schematically illustrated suitable tube manufacturing system 905, which is operable to construct and output tube sections 14, for example, out through a suitably configured port 955 from the floating movable tube fabrication machine 62. While the exemplary depicted embodiment illustrates the tube sections 14 being deployed via the port 955, in other contemplated embodiments, the tube sections 14 may be deployed from a side (or sides) of the floating movable tube fabrication machine 62. Alternatively, the floating movable tube fabrication machine 62 may deploy tube sections 14 from a rear, topside of the floating movable tube fabrication machine 62. Additionally, while not depicted in the exemplary schematic illustration, the floating movable tube fabrication machine 62 may also include, e.g., cranes to move the tube sections off of the floating movable tube fabrication machine 62, and to place the tube sections 14 on the sea floor 815. Also, as shown in FIG. 9B, as the tube sections are deployed, the floating movable tube fabrication machine 62 may also be configured to deploy joints 36 and buoys 26 into the water, as well as support members (not shown), as the floating movable tube fabrication machine 62 traverses the construction route 58.

In a further exemplary and non-limiting embodiment, as depicted at 900' in FIG. 9C, a moveable in-situ manufacturing system 56' may be located at a single location to make a number of tube sections (e.g., fifty tube sections), and then subsequently moved to a new location. That is, in contrast to the above discussed embodiment, wherein the in-situ manufacturing system 900 is moving forwardly along the transportation path with each tube section it forms, with this embodiment 900', the in-situ manufacturing system 56' is located at a site for manufacture of a number of tube sections, after which the in-situ manufacturing system 56' may be moved to a new location (e.g., downstream along the planed transportation path) to produce the next batch of tube sections.

Figure 9C:
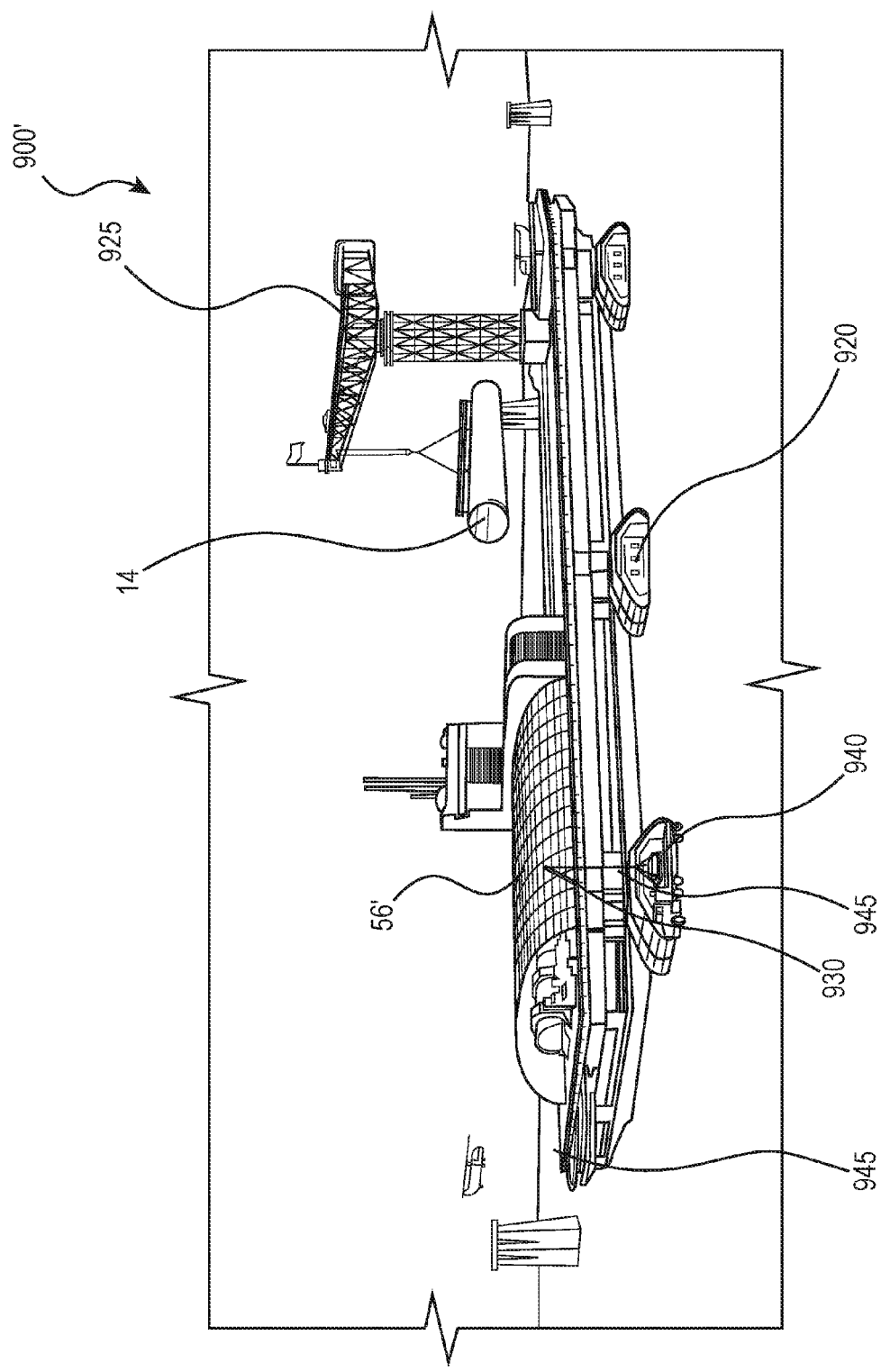

As shown in FIG. 9C, the moveable in-situ manufacturing system 56' includes one or more tube cranes 925 arranged thereon operable to move the one or more tubes 14 from the moveable tube fabrication machine into position on the transportation path. In certain embodiments, the moveable in-situ manufacturing system 56' also includes one or more cranes 930 arranged thereon operable to move construction supplies and/or materials 935 from support vehicles 940 onto the tube fabrication system 56'. The tube fabrication system 56' may also include a landing pad 945 configured to receive a helicopter. As shown in FIG. 9C, the tube fabrication system 56' may also include one or more storage areas configured for storing tube construction materials and/or tubes under construction and/or one or more storage areas configured for storing pillar construction materials and/or pillars under construction. In certain embodiments, the moveable tube fabrication is additionally configured to manufacture one or more supports, pylons, and/or tube inserts (e.g., tracks, cabling, sensors, etc.) for the transportation system.

In an exemplary and non-limiting embodiment, the apparatus includes a material bender configured to bend a tube wall material into a cylinder shape, and a welder configured to weld a seam between ends of the tube wall material to form the tube. The apparatus may additionally include one or more of: a foundry configured for manufacturing wall material; and a roller configured for rolling the tube wall material to achieve a uniform wall thickness for the tube wall material.

In certain embodiments, the manufacturing the one or more transportation tubes includes forming tube sections of the transportation tube, installing one or more tracks in the tube sections; attaching the tube sections to support structures; and connecting adjacent tube sections to one another to form the transportation tube.

Figure 10:
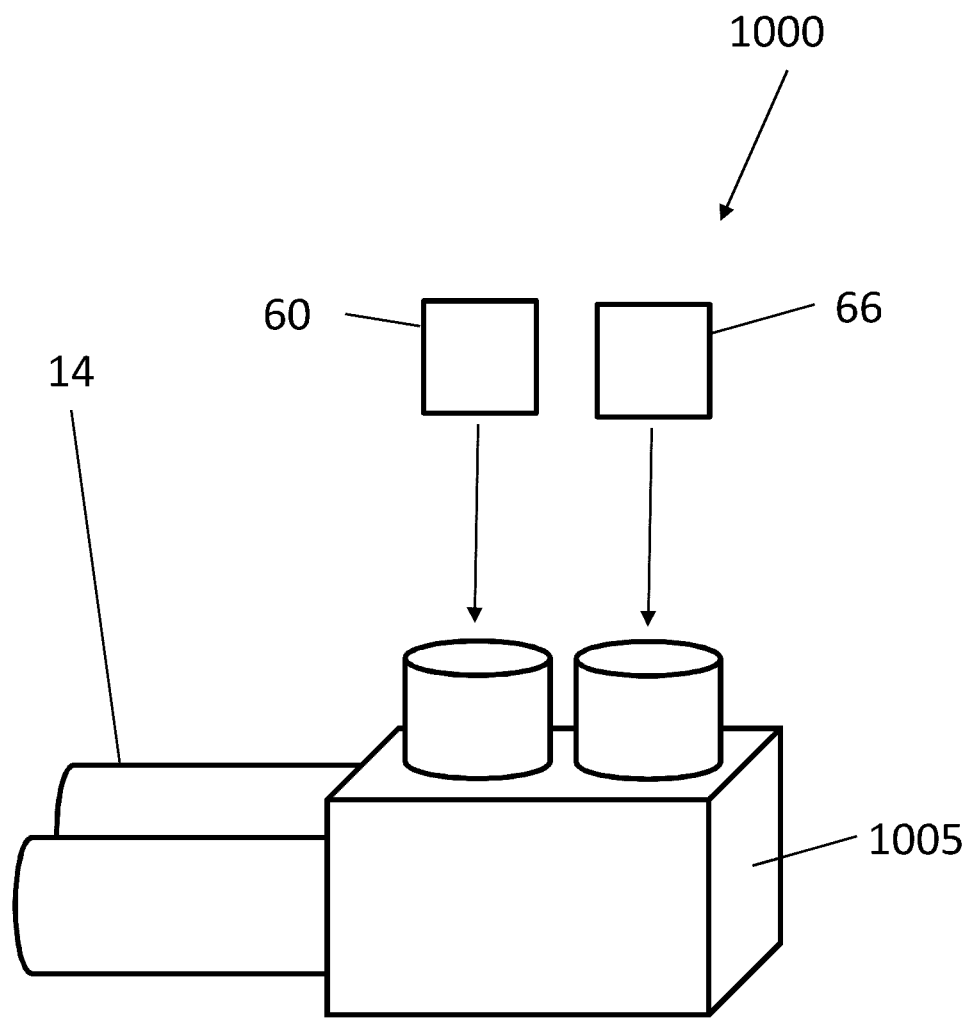
FIG. 10 is a diagram of yet another tube manufacturing process and system for use with the transportation system in accordance with embodiments of the present disclosure.

FIG. 10 schematically illustrates an additive tube manufacturing system 1000 in accordance with another embodiment of the present disclosure. As shown in FIG. 10, raw materials 60 (e.g., iron and carbon and other elements, so as to produce steel or a steel composite) are combined and processed with one or more additives 66 (e.g., corrosion resistance materials, protective outer layers) in a tube fabrication system 1005 to improve the physical characteristics of the manufactured tube 14. As should be understood, the tube manufacturing system 1005 may be configured based upon the type of tube construction and types of raw materials 60 (e.g., to produce stainless steel titanium) and additive materials 66, amongst other considerations. Moreover, the additive materials 66 may be selected based upon the type of tube construction and types of raw materials 60. In embodiments, other additive materials 66 include, for example, coatings applied to the tubes.

Figure 11A:
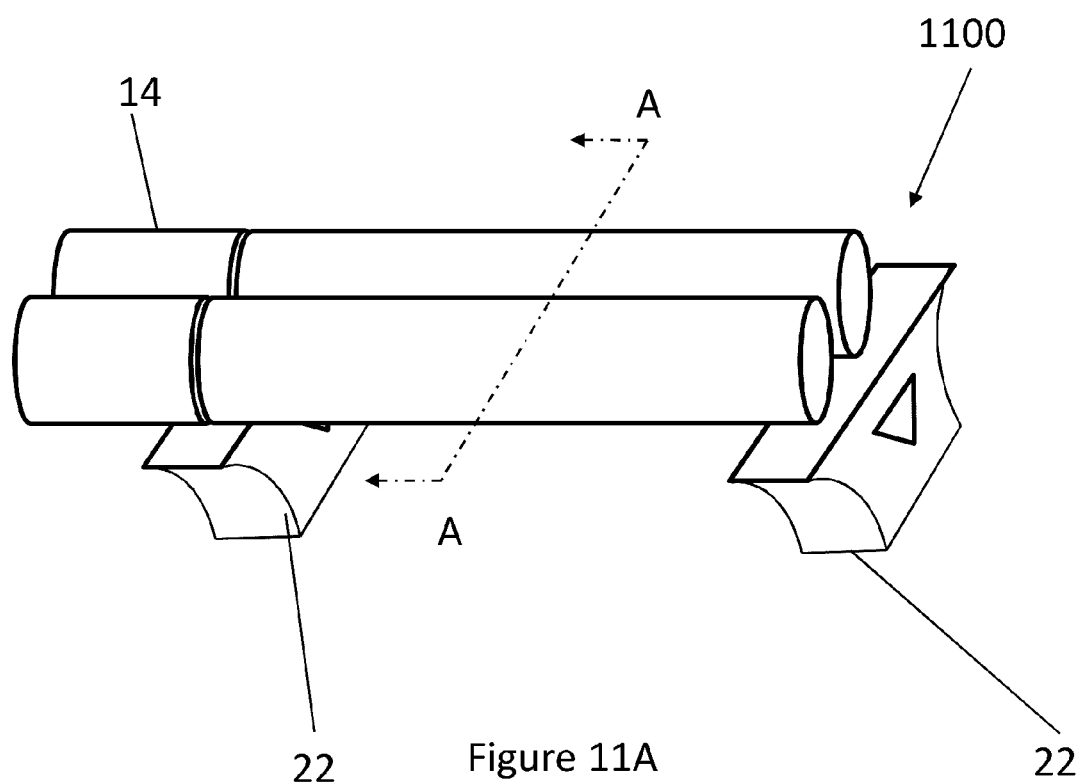
FIGS. 11A-11D are exemplary schematic depictions of tube structures for use with the transportation system in accordance with embodiments of the present disclosure.
Figure 11B:
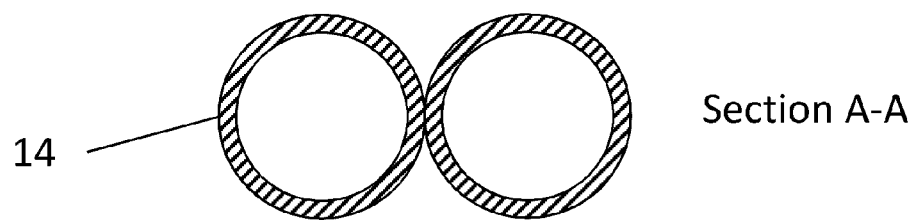

FIGS. 11A-11D schematically illustrate additional tube and support structures in accordance with aspects of the present disclosure. As shown with arrangement 1100 of FIG. 11A, tube sections 14 may be prefabricated or in-situ manufactured and assembled in a side-by-side configuration on pillars 22. FIG. 11B illustrates a sectional view A-A of the tube sections 14 in a side-by-side configuration. The tubes 14 may be connected to the pillars 22 (e.g., indirectly) through a vibration dampening system.

It is also contemplated that pillars 22 may be either prefabricated or in-situ manufactured and incorporate additives and/or support elements, such as dampers, reinforcement members and the like, for example, as discussed herein, to improve the physical characteristics of the pillars 22. In the exemplary embodiment shown in FIGS. 11A and 11B, the tubes 14 extend between the structural pillars 22 and are self-supporting structures. In other words, the strength of the tubes 14 and the distance between the pillars 22 are configured, structured and arranged such that the tube 14 alone is sufficient to support the weight of tube 14 (and the forces exerted on the tube 14 from a capsule passing there through) between the respective pillars 22 so as to prevent any significant deflection of the tube 14.

Figure 11C:
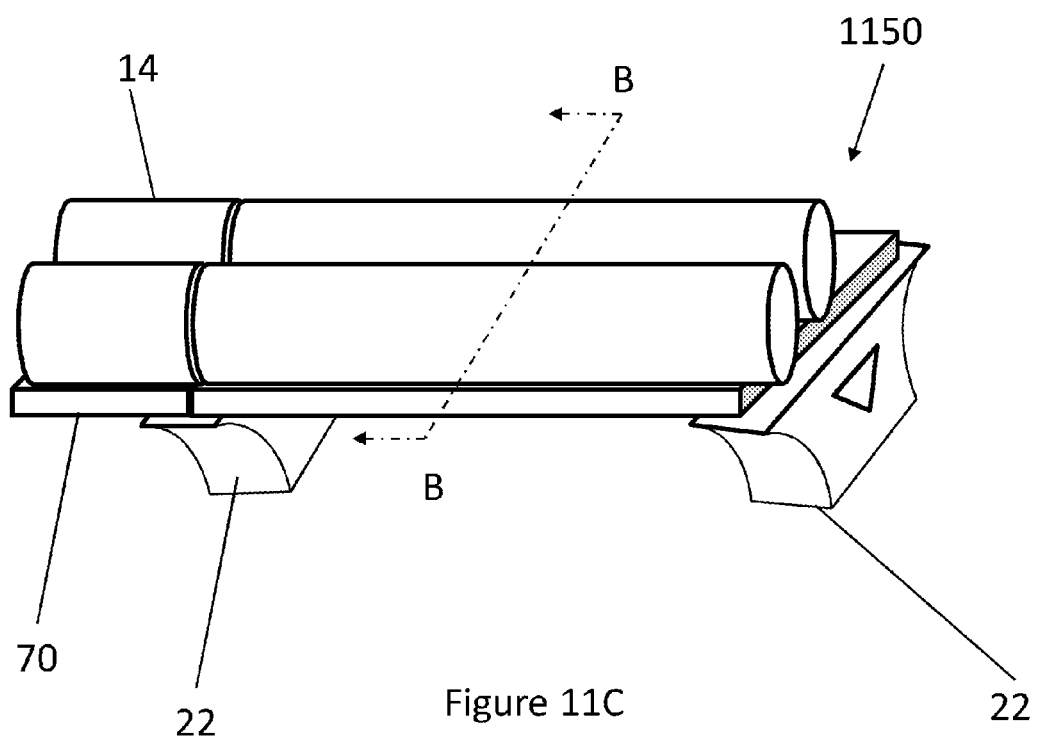

As shown in FIG. 11C, tube sections 14 may be prefabricated or in-situ manufactured and assembled in a side-by-side configuration on one or more support structures 70, which extend between and are secured to pillars 22. In accordance with aspects of the disclosure, support structure 70 is configured to receive, support and secure tube sections 14 of the transportation system.

Figure 11D:
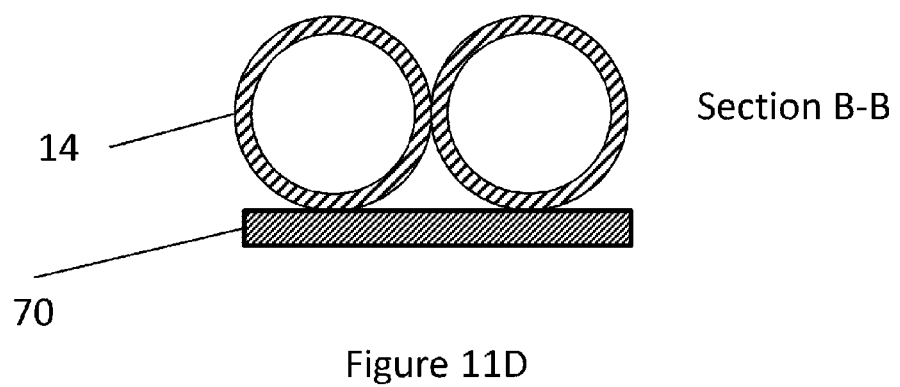

FIG. 11D illustrates a section view B-B of the tube sections 14 in a side-by-side configuration. Additionally, it is also contemplated that pillars 22 may be either prefabricated or in-situ manufactured and incorporate additives and/or support elements such as dampers, reinforcement members and the like to improve the physical characteristics of the pillars 22.

In the exemplary embodiment shown in FIGS. 11C and 11D, support structures 70 extending between the structural pillars 22 are self-supporting structures, and the tubes may not be self-supporting structures (in contrast to the exemplary embodiment of FIGS. 11A and 11B). In other words, the strength of the tube 14 together with the support structures 70 and the distance between the pillars 22 are selected, configured, structured and/or arranged such that the tube 14 and the support structures 70 are sufficient to support the weight of tube 14 and support structures 70 between the respective pillars 22 so as to prevent any significant deflection of the tube 14.

It is possible that optimization of the thickness of the tube 14 to withstand the forces expected within tube 14 (e.g., caused by the capsule as it traverses the tube 14) is not sufficient to prevent undesirable downward deflection forces on tube 14, due to the weight of the tube 14 between pillars 22. Thus, by utilizing a support structure 70, the tube 14 itself can be optimized for the forces expected within the tube (e.g., caused by the capsule as it traverses the tube 14), while the thickness of the support structure 70 is optimized to prevent any significant deflection of the tube 14.

Tube Structures and Manufacturing

The operation of the capsule within the tubes of the transportation system benefits from the inner layer of the tube being configured in order to obtain maximum performance and efficiency. One or more embodiments of the present disclosure discussed below provide solutions to this challenge not only for purposes of the transportation system, but also for other industry applications, including, for example, the oil and gas pipeline industry and the like. Additionally, while the tube structures are configured for transporting the capsules, the tubes may also be configured for accommodating, for example, third party cable and/or wiring systems. In accordance with aspects of the disclosure, by additionally utilizing the tubes for third party cable and/or wiring systems, the costs for constructing and/or maintaining the tube transportation system can be defrayed or shared. In other words, the right of way (ROW) of the transportation path may be monetized for placement of, for example, electricity, communications wiring, and/or pipeline that can be installed in or on the tubes of the transportation system.

Figure 12A:
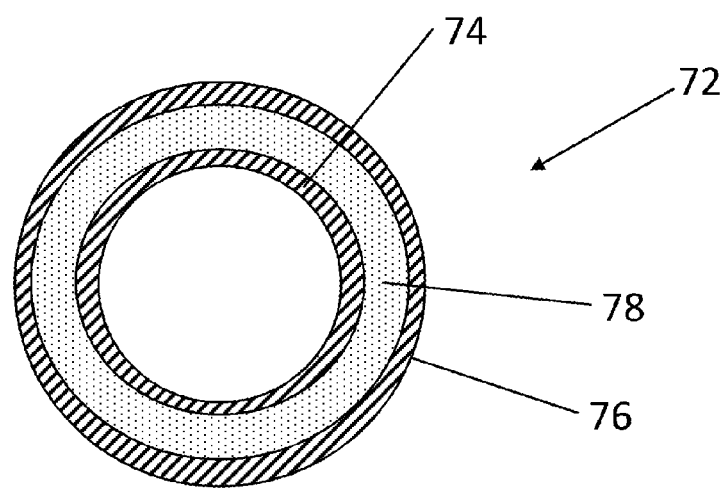
FIGS. 12A-12B are exemplary schematic depictions of a further tube manufacturing process and structures for use with the transportation system in accordance with embodiments of the present disclosure.
Figure 12B:
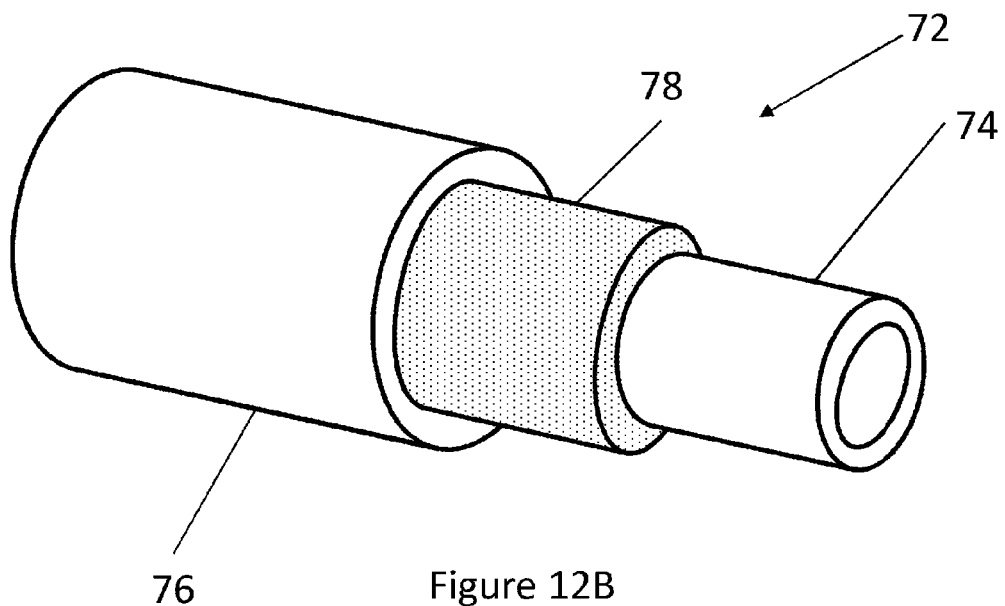

Referring now to FIGS. 12A and 12B, a further tube manufacturing process of the present invention is illustrated.

It is contemplated that tube 72 may include a first or inner layer 74 and one or more outer layers 76. Inner layer 74 and outer layers 76 may be manufactured from a variety of composites, plastics and/or metals to satisfy the design requirements of the transportation system and to maximize the efficiency of travel of the capsule within the inner layer and the structural and environmental requirements of the outer layer. For example, in embodiments, the outer layer 76 may be optimized for the ambient environmental conditions (e.g., to reduce wear from weather and/or corrosion). Additionally, in other embodiments, the outer layer 76 may be optimized to be resistant to puncture from, for example, gun shots. Furthermore, the inner layer 74 may be optimized for conditions in the low-pressure environment within the tube interior. Inner layer 74 and outer layer 76 may be secured in position adjacent each other through a variety of mechanical and/or chemical joining process, including, but not limited to, adhesive bonding, metal bonding, brazing, and the like.

As shown in FIGS. 12A and 12B, tube 72 further includes one or more fill layers 78 disposed between the inner layer 74 and outer layer 76. In embodiments of the present disclosure, the fill layer 78 may be formed of a foamed metal material or the like that maintains many of the physical properties of the base metal materials, while increasing strength, reducing thermal conductivity, and significantly reducing the weight of the fill layer 78 and the tube 72. It is also contemplated that other fiber, polymeric and composite materials may be used to create the fill layer 78. In accordance with aspects of the disclosure, by utilizing a fill layer 78, the wall thickness of the inner layer 74 and/or the outer layer 76 may be reduced.

The material of the fill layer 78 may be a foam material (e.g., very heavy foam, such as a metal foam, or some other suitably-stiff frame material, such as a honeycomb or pyramidal structure) which is utilized to provide stiffness (in contrast to, or in addition to, strength) to the tube construction. Furthermore, the foam material may be optimized to provide thermal and/or acoustic insulation. By forming the tube with a fill layer 78, the costs of tube manufacturing may be reduced, as the overall thickness of the steel layers is reduced (as compared to a uniform steel tube thickness of the same diameter). Moreover, by utilizing a fill layer 78 of lower weight (as compared to the other materials of the tube wall), such as a foam, the entire weight of the tube section may be reduced, while providing a tube having the same (or similar) strength and/or stiffness properties.

While the depicted exemplary embodiment illustrates three layers, in embodiments the tube construction may include more than three layers. For example, a tube may include more than one "inner" layer and/or more than one "outer" layer. Additionally, the tube may include an additional middle metal layer and an additional fill layer between the middle metal layer and either the inner wall or the outer wall, thus providing a metal-fill-metal-fill-metal laminate construction.

Figure 13:
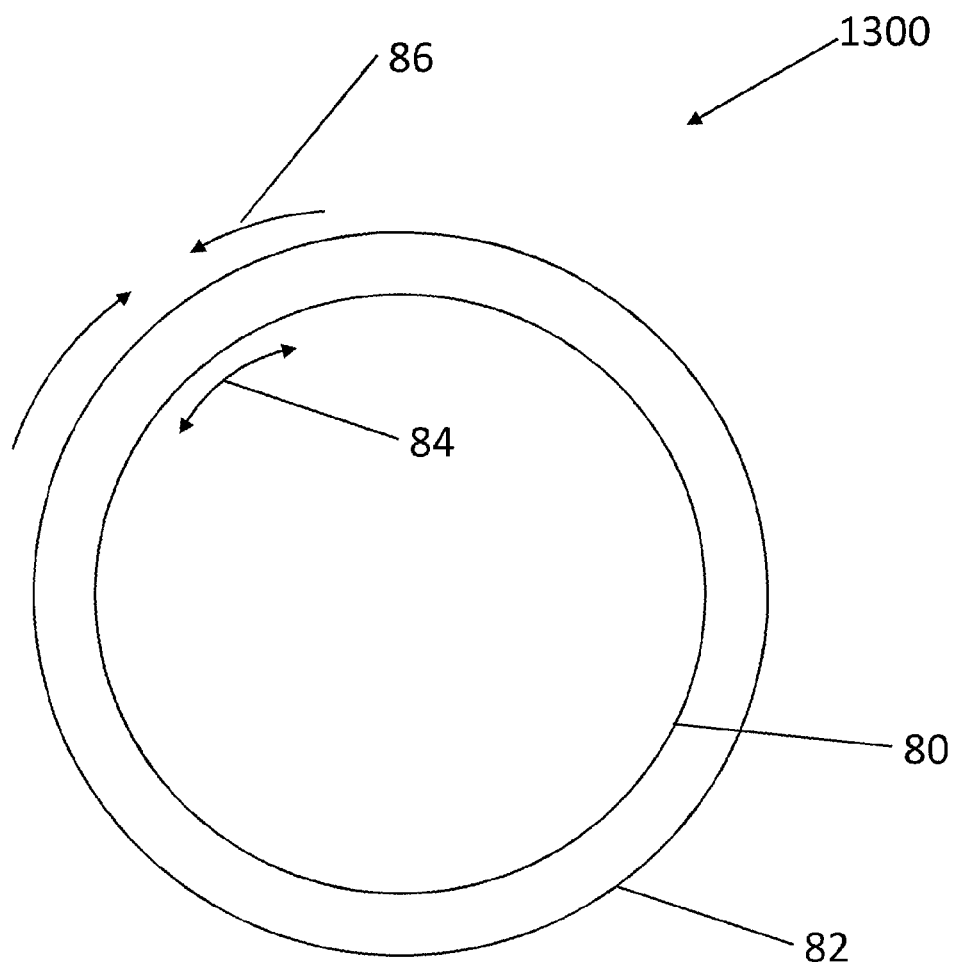
FIG. 13 is a diagram of another exemplary schematic depiction of a tube manufacturing process and structure for use with the transportation system in accordance with embodiments of the present disclosure.

FIG. 13 illustrates another exemplary and non-limiting tube configuration, in accordance with aspects of the present disclosure. A tube in a tensioned state is more effective in reacting to received loads than a tube in a compressive state. For example, a cylindrical tube is more likely to buckle when loaded in compression as compared to a tube loaded in tension. In accordance with this aspect of the disclosure, tube 1300 includes an inner wall 80 and an outer structure 82 at least partially surrounding the inner wall 80. The combination of inner wall 80 and outer structure 82 combine to provide a net tension tube (i.e., a tube in a tensioned state).

In one exemplary and non-limiting embodiment of the disclosure, the inner wall 80 is expanded through a loading process, such as, for example, internal pressure to create a tensile state 84 in the inner wall 80. Next, the outer structure 82 is secured to inner wall 80 as the loading process is ended, creating a net compression state 86 in the outer structure 82. In this state, the inner wall 80 remains in tension, and thus provides a stable support surface for the outer structure 82.

In another embodiment of the present disclosure, the inner wall 80 may be expanded through a heating process (instead of or in addition to the internal pressure), causing the inner wall to elongate. With an exemplary embodiment, temperatures up to or exceeding 200° F. may be used during this heating process. The combined inner wall 80 and outer structure 82 are cooled after the heating process is ended when the outer structure 82 is secured to the inner wall 80. This process provides similar results to the mechanical loading process described above, such that the inner wall 80 is in tension 84 while the outer structure 82 is in compression 86.

Figure 14:
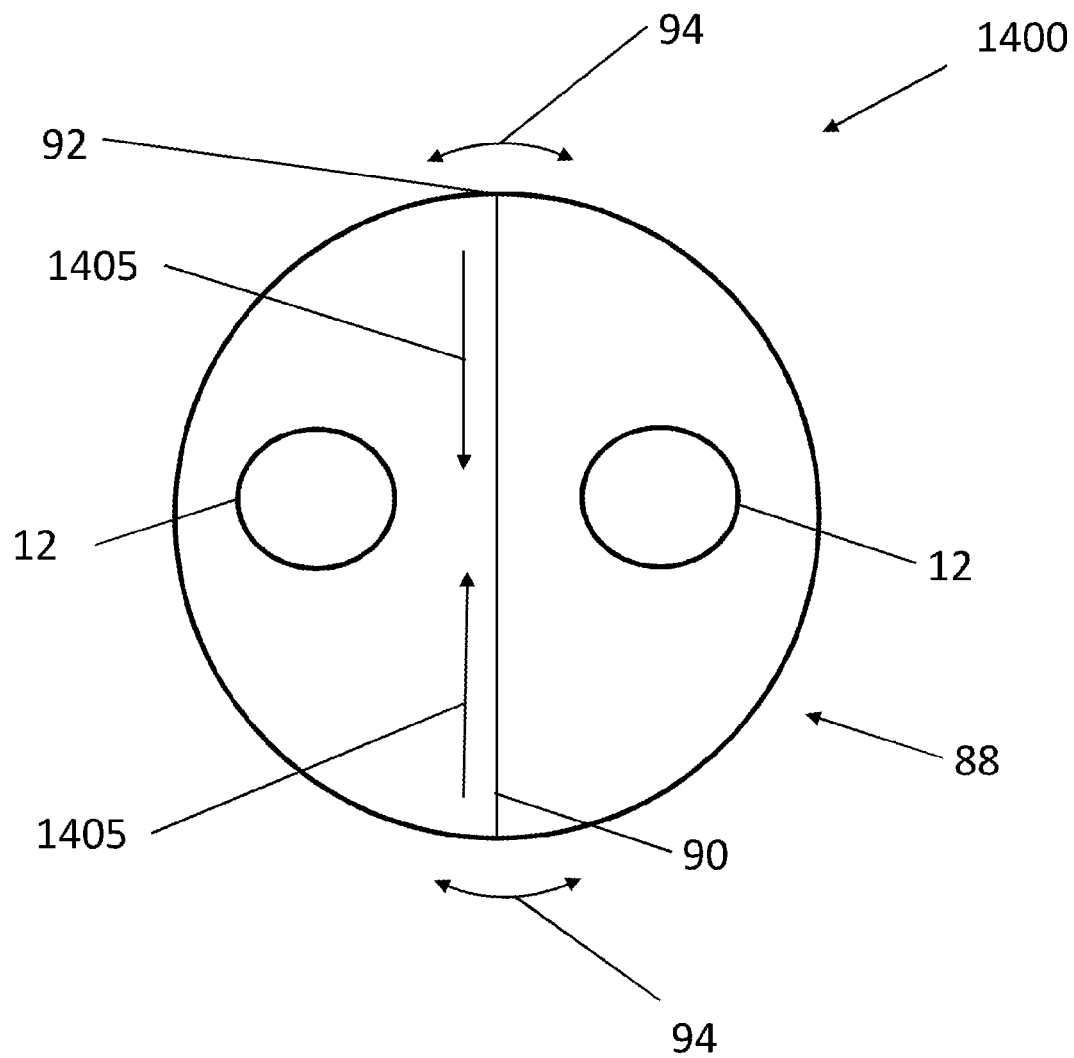
FIG. 14 is a diagram of another exemplary schematic depiction of a tube manufacturing process and structure for use with the transportation system in accordance with embodiments of the present disclosure.
Figure 15:
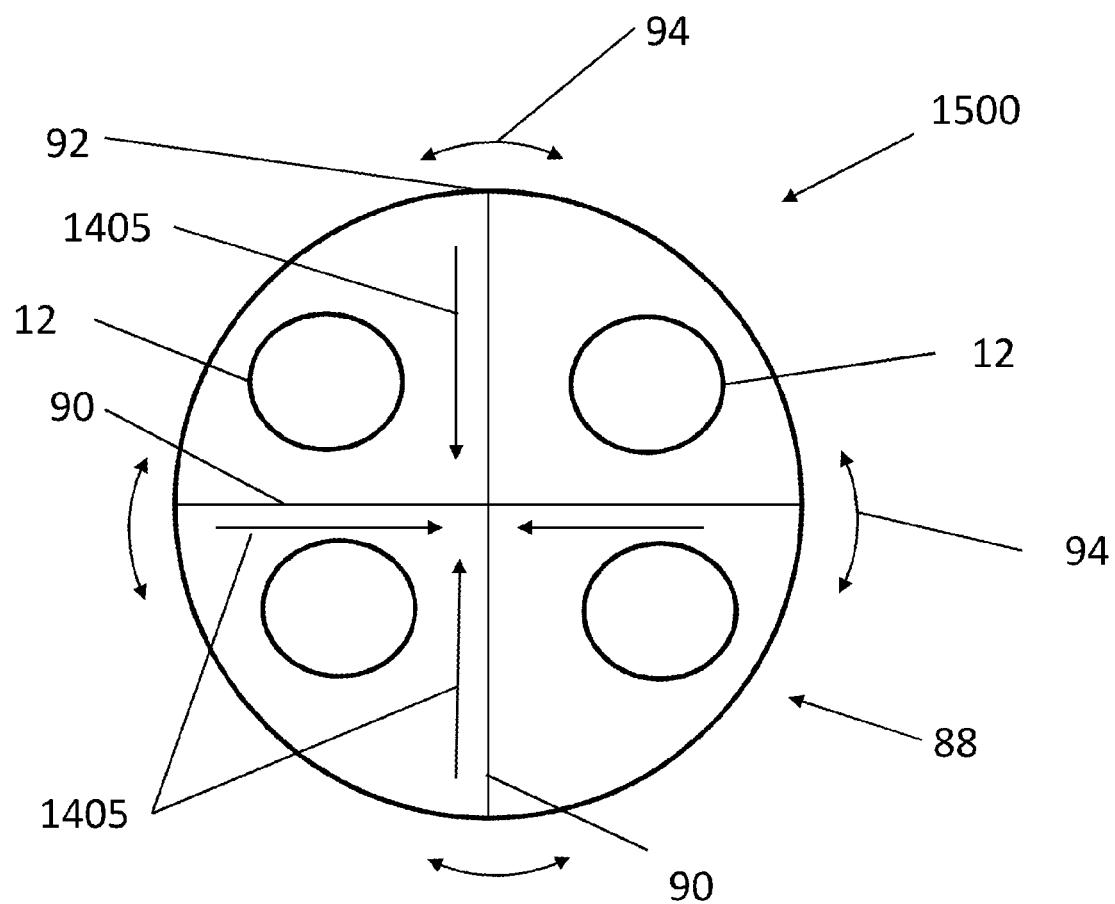
FIG. 15 is a diagram of another exemplary schematic depiction of a tube manufacturing process and structure for use with the transportation system in accordance with embodiments of the present disclosure.

FIGS. 14 and 15 show alternative tube configurations for use with the transportation system of the present disclosure. In each embodiment, a single tube 88 replaces the side by side pair of tubes described above. As shown in FIG. 14, with this exemplary and non-limiting configuration 1400, the tube 88 includes one or more compression members 90, e.g., extending between the inner peripheries of outer wall 92 of the tube 88. In accordance with aspects of the present disclosure, compression member 90 presents a restrained load 1405 that induces tension 94 in the outer wall. That is, with this structure of the tube, the tube 88 is in net tension.

In accordance with aspects of the disclosure, in this state, the induced tension load 94 causes the outer wall 92 of tube 88 to create an equivalent pressurized stabilized structure in a net tensile state. In embodiments, capsules (or pods) may 12 travel on each side of the compression member 90 within the tube 88. By implementing these aspects of the disclosure, the tube wall thickness may be decreased, thus requiring less material and resulting in reduced costs for tube construction. Additionally, by implementing a net tension tube, less expensive tube wall materials may be sufficient to provide the necessary strength and/or stiffness for the tube, thus requiring less material and resulting in reduced costs for tube construction.

In accordance with additional aspects of the disclosure, FIG. 15 illustrates another exemplary and non-limiting embodiment of the present disclosure, wherein a pair of compression members 90 induces tension on the outer wall 92 such that, for example, four paths of travel for pods 12 are created within the tube 88. In embodiments with such a four-path construction, two paths may be designated for cargo capsules, and the other two paths may be designated for human (or combined human/cargo) capsules. While the pods 12 are schematically illustrated as having the same diameter, it should be understood that the pods may be configured having different sizes. For example, the pods on tracks configured for cargo may be larger in diameter than the pods designated for human passengers.

Alternatively, tube configurations may be the same for both land and sea usage (e.g., over water or under water). That is, it is possible to use the same tube configuration as the tube path travels over land (or underground) and over water (or underwater). In further contemplated embodiments, a tube path may comprise multiple tube configurations at different regions of the tube path.

While many of the exemplary depicted embodiments of the tube configuration are circular in cross-section, other cross-sectional shapes (e.g., oval, rhombic, rectangular) may be used. For example, while a circular cross-sectional shape provides a tube that is in uniform compression (or, in embodiments, in tension), the tube configuration may also be based (for example, at least partially) on aesthetic considerations in addition to structural or design considerations.

Furthermore, while many of the depicted exemplary embodiments of the tube are uniform in wall thickness, it is possible that the tube wall may be variable in thickness. For example, in regions of the capsule travel path subjected to higher G-forces (e.g., in turns or bends in the path), the thickness of the tube may be increased. Alternatively, the tube wall can be thickened around the entire circumference of the tube, or the tube wall thickening may be located around only portions of the circumference of the tube (e.g., the wall portions towards which the vehicle will be driven to due centrifugal forces acting on the vehicle as it traverses past a curve in the transportation path). Conversely, in other embodiments, the thickness of the tube may be decreased in regions of the capsule travel path subjected to lower G-forces (e.g., in straighter portions in the path).

In accordance with additional aspects of the disclosure, the tube wall thickness may be optimized for the anticipated capsule speeds and/or to assist in controlling the capsule speeds. For example, in embodiments, a tube wall thickness may be increased so that the inner diameter of the tube 14 is reduced. As the inner diameter of the tube 14 is reduced, the flow passage for air around the capsule 12 is also reduced. In accordance with aspects of the disclosure, by reducing the air flow passage around the capsule 12, drag on the capsule 12 is increased, and the capsule 12 is slowed. Tube wall thickness can also be increased so that the inner diameter of the tube 14 is reduced in regions of the transportation system where slowing of the capsule is desired, e.g., approaching a station, or a significant curve or turn in the transportation path.

In further contemplated embodiments, portions of the tube may include windows (or at least partially translucent materials) and the capsule itself may include windows (or at least partially translucent materials). By providing such windows in the tube and capsule, a passenger will be able to "see" outside of the transportation system, which may, for example reduce feelings of claustrophobia, and provide passengers a similar experience to that of traveling on a train (e.g., of viewing the surrounding environment as the capsule traverses the tube path). Utilizing at least partially translucent materials will, for example, allow a passenger to at least view incoming light from outside the tube. Such clear or partially translucent materials may include, for example, graphene and//or carbon reinforced materials (e.g., similar to sailboat sails). Additional alternative structures for low-pressure environments, which can be used in lieu of the tubes, are discussed in commonly-assigned U.S. application Ser. No. 15/008,017, entitled "Low-Pressure Environment Structures," filed in the USPTO on even date herewith, the content of which is expressly incorporated by reference herein in its entirety. Any of such low-pressure environment structures could be used instead of and/or with the tubes, and include (but are not limited to) materials which can withstand a tensile load.

In other contemplated embodiments, the capsule may include viewing screens (e.g., LCD or LED screens) which provide a view of the outside environment as the capsule traverses the tube transportation path. In embodiments, cameras may be utilized to acquire images (e.g., in real time) of the outside environment, which are then projected on the viewing screens in the capsule. In other contemplated embodiments, the viewing images can be predetermined (e.g., pre-recorded), so as to project a standard depiction of the outside environment (e.g., not a real time display) as the capsule traverses the tube transportation path.

Levitation Systems and Method

FIGS. 16-24B schematically depict various systems and methods for levitating a capsule 12 above a track surface 100 (which in embodiments, may be a static and/or a dynamic environment) in accordance with aspects of the present disclosure. The capsule 12 may be levitated using a fluid bearing (e.g., a liquid or air bearing), or by magnetic levitation (e.g., using a Halbach array). Additionally, in certain embodiments, the capsule 12 may also utilize wheels that ride on one or more tracks alone or in conjunction with the levitation systems.

Figure 16:
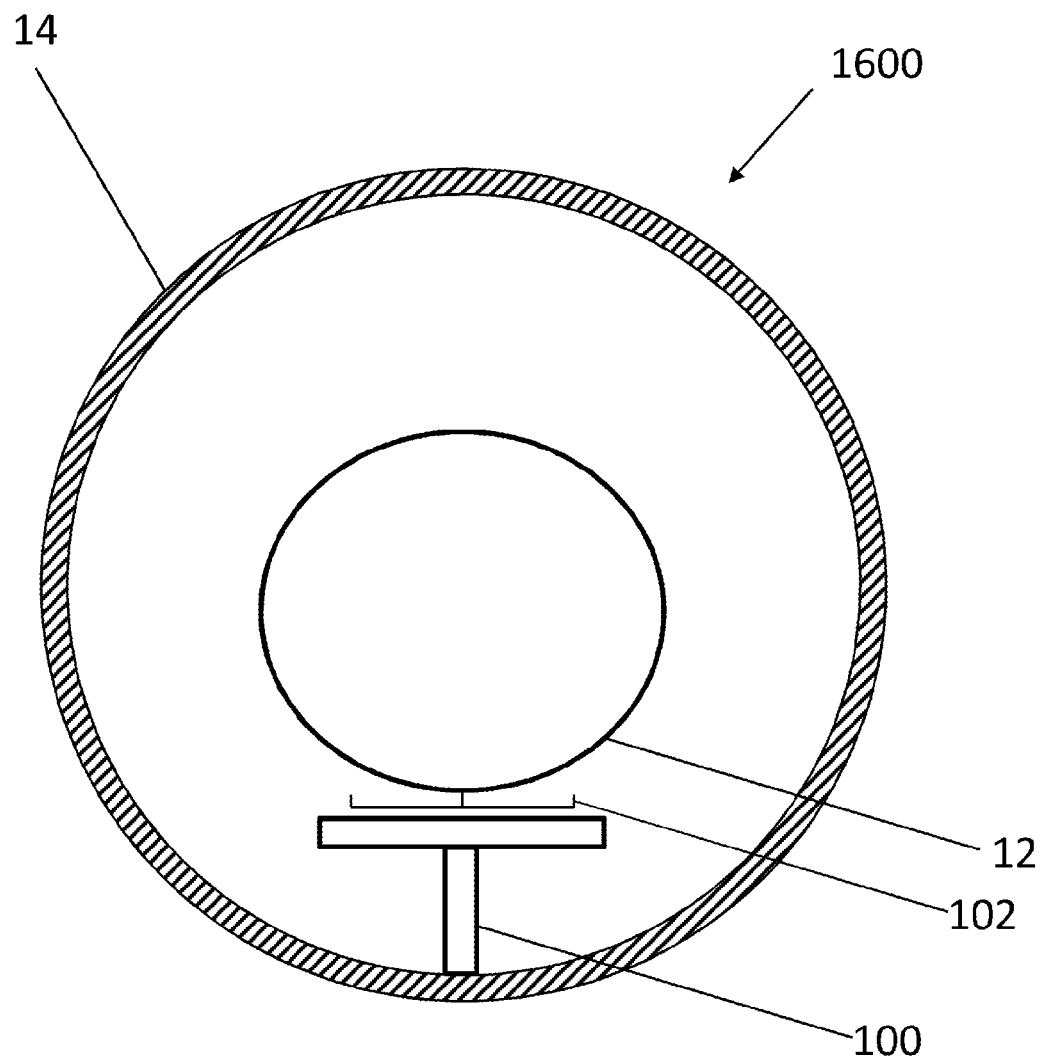
FIG. 16 is a diagram of an exemplary and non-limiting track and bearing configuration for use in the transportation system in accordance with embodiments of the present disclosure.
Figure 23A:
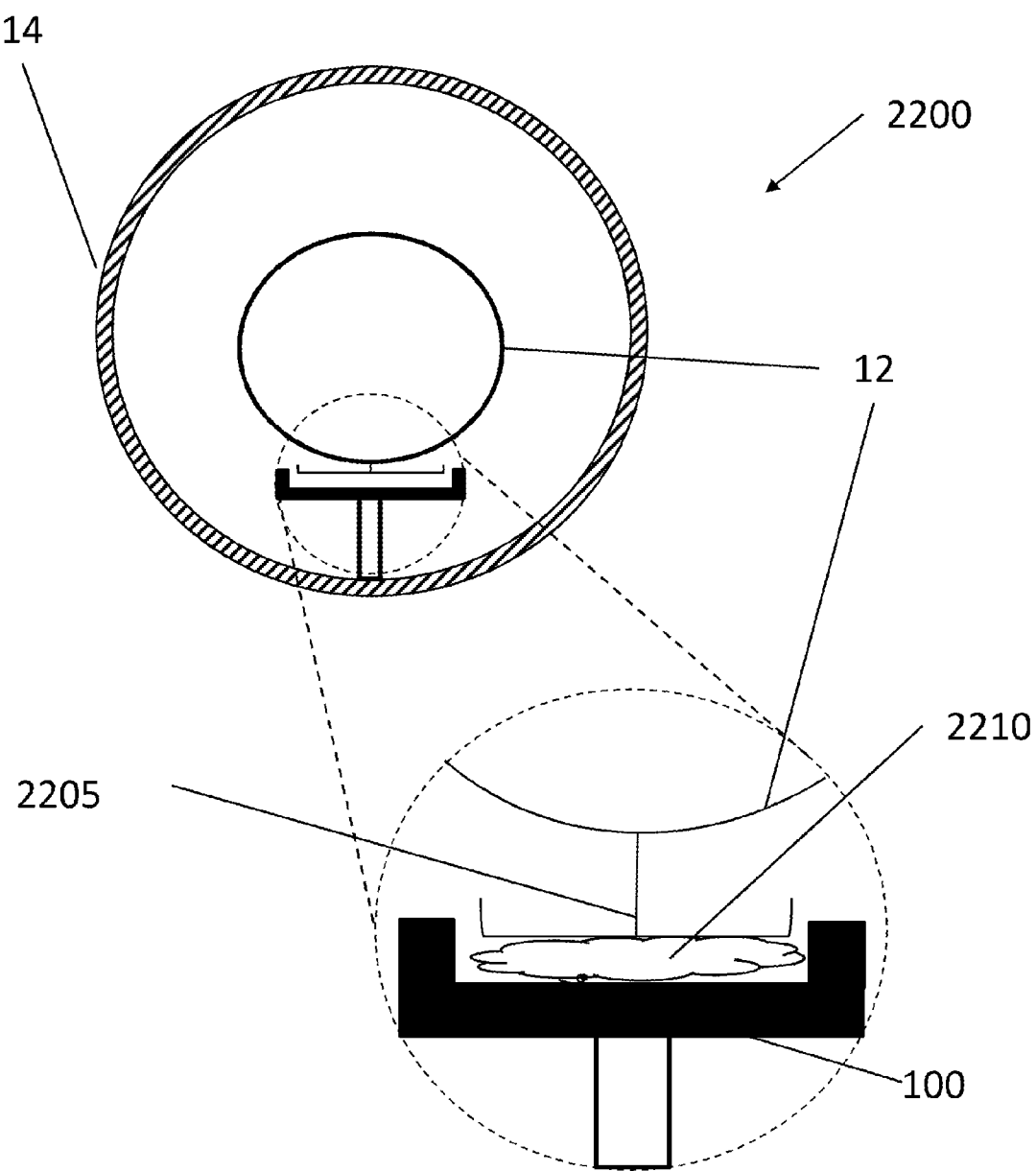
FIGS. 23A-23B illustrate aspects of an additional exemplary track and fluid bearing configuration and bearing fluid recycling system for use in the transportation system in accordance with embodiments of the present disclosure.
Figure 23B:
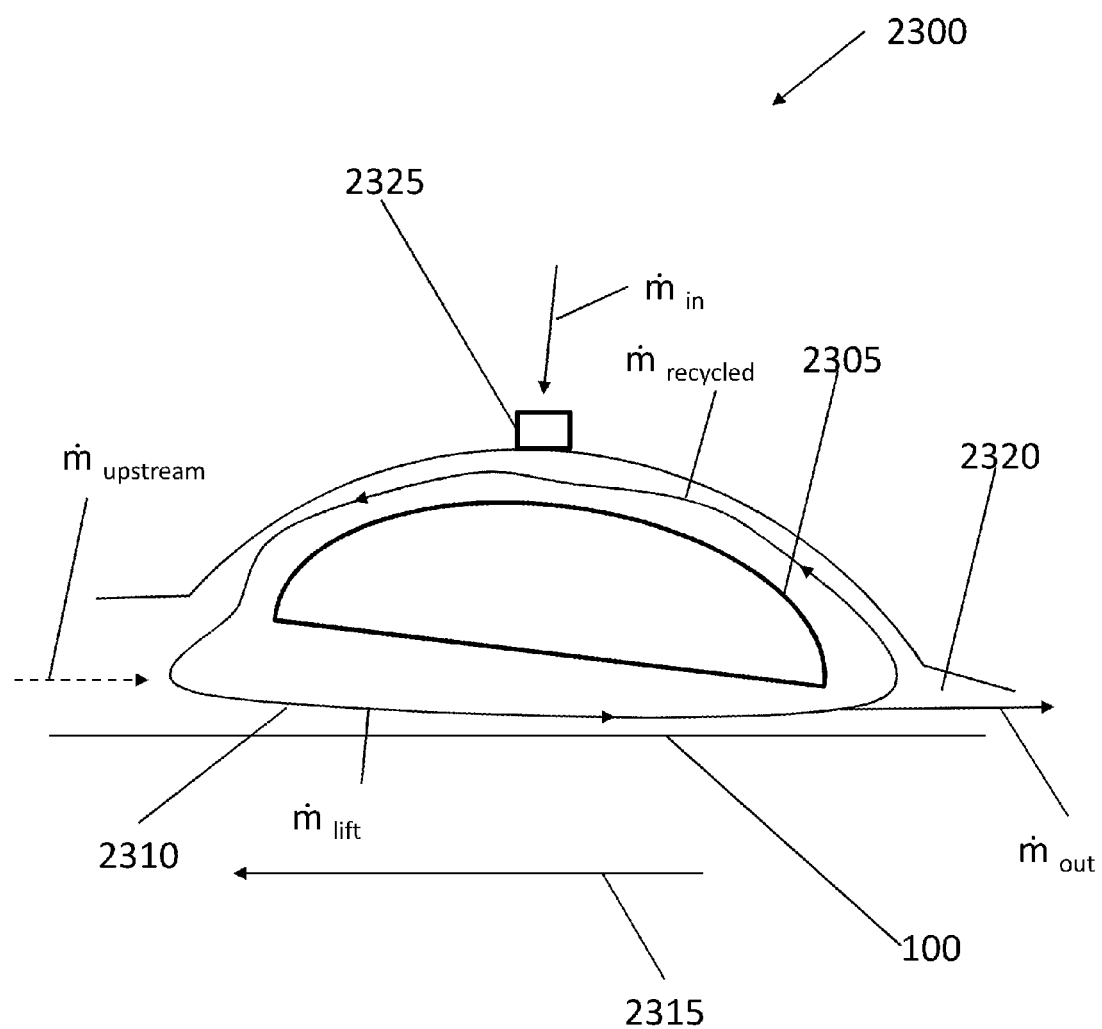

For example, as shown in FIG. 16, one or more tracks 100 are disposed within tube 14 that cooperate with one or more bearings 102 on capsule or pod 12. In certain embodiments, the bearing 102 uses a thin film of pressurized fluid (e.g., air or a liquid) flowing through the bearing 102 to provide a contact-free, low friction load-bearing interface between the bearing surface 102 and the track 100, such that the pressure between the faces of the bearing 102 and the track 100 is sufficient to support the capsule 12. It is contemplated that alternative levitating processes and/or structures may be used, such as hydrodynamic bearings and the like, as is shown in FIGS. 23A and 23B (discussed herein), in place of the one or more air bearings to accomplish the same aims.

Figure 17:
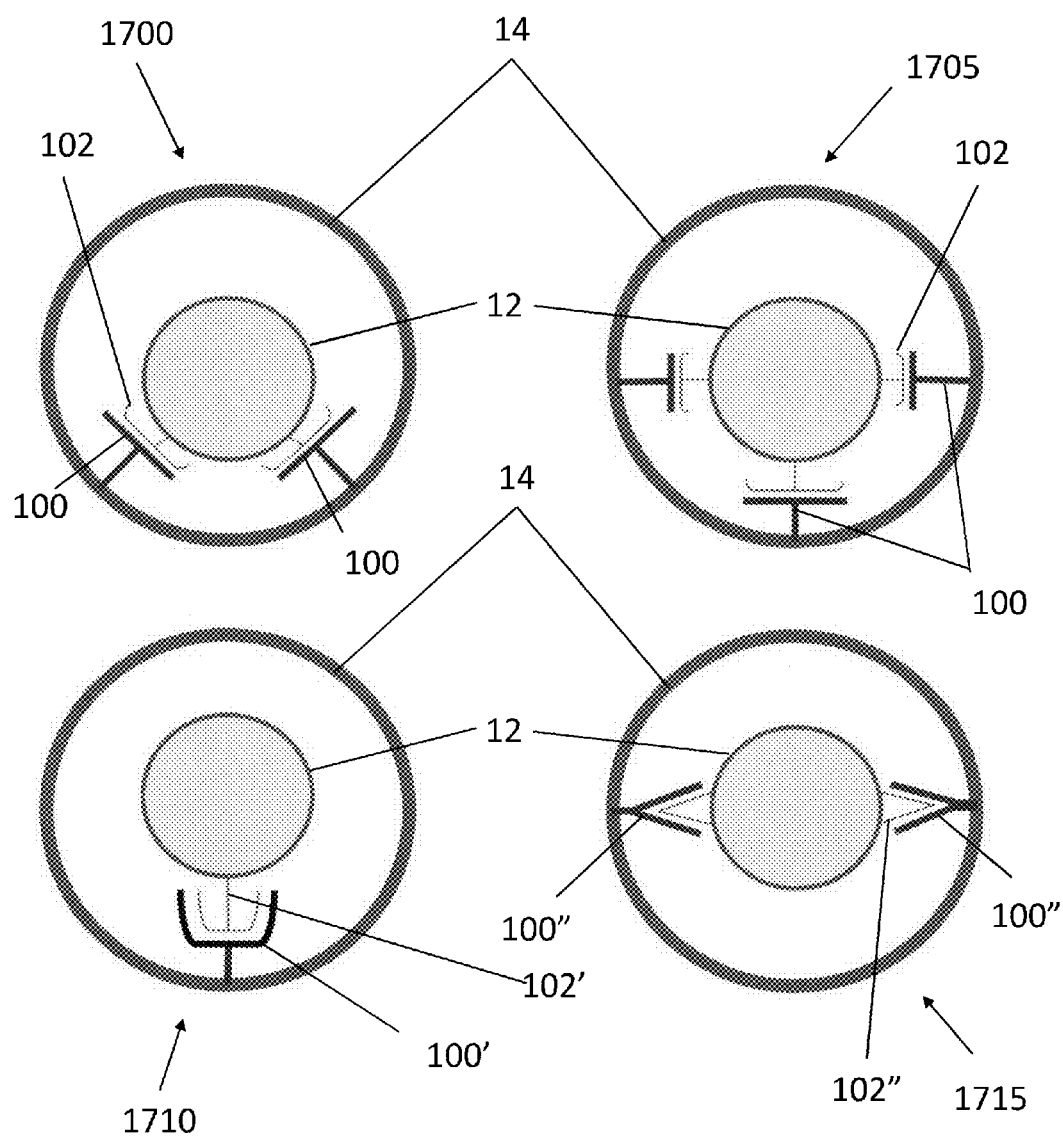
FIG. 17 illustrates additional exemplary track and bearing configurations for use in the transportation system in accordance with embodiments of the present disclosure.

As shown in FIGS. 17-21, the present disclosure contemplates that a variety of track configurations may be implemented in connection with embodiments of the present disclosure. For example, FIG. 17 shows schematic depictions of four different track configurations that may be implemented in connection with embodiments of the present disclosure. In accordance with aspects of the disclosure, the tracks may be laid in the tube 14 with corresponding air bearing(s) 102 provided on the capsule 12. It should be understood that while these embodiments are depicted as utilizing air bearings, in embodiments other bearings may be utilized, for example magnetic levitation bearings or other fluid bearings (e.g. liquid bearings). It is also understood that secondary guidance tools (not shown) may also be incorporated to ensure the lateral (and/or vertical) stability of the capsule 12.

With exemplary track configuration 1700, two tracks 100 are provided extending from the tube 14 at approximately 45° angles relative to vertical, respectively. In embodiments, the tracks 100 may be welded and/or fastened to the inner wall of the tube 14. The capsule 12 has corresponding air (or other) bearings 102 structured and arranged to interact with the two tracks 100. In accordance with aspects of the disclosure, by utilizing track configuration 1700, the two tracks 100 provide additional horizontal stability by providing balancing horizontal force vectors.

With track configuration 1705, three tracks 100 are provided extending from the tube 14, with one track 100 extending from beneath the capsule (as with the embodiment of FIG. 16) and a track 100 on each side of the capsule 12 angularly offset (e.g., approximately 90°) from the track 100 arranged beneath the capsule 12. The capsule 12 has three corresponding bearings 102 structured and arranged to interact with the three tracks 100. In accordance with aspects of the disclosure, by utilizing track configuration 1705, the two side tracks 100 provide additional horizontal stability for the capsule 12 by providing balancing horizontal force vectors.

With track configuration 1710, a single track 100' is provided extending from the tube beneath the capsule (as with the embodiment of FIG. 16). In contrast to the embodiment of FIG. 16, however, with configuration 1710, the single track 100' has an approximately "U"-shaped profile. The capsule 12 has a corresponding "U"-shaped air bearing 102' structured and arranged to interact with the track 100' having the approximately "U"-shaped profile. With this embodiment, the "U"-shaped air bearings 102" provide a cushion of air in a downward direction, and also in rightward and leftward directions, with each cushion of air interacting with the respective sides of the "U"-shaped track 100'. In this exemplary embodiment, the walls of the "U"-shaped profile of the track 100' additionally serve to reduce side-to-side movement so as to more effectively constrain the capsule 12 on the track 100'. In other words, track configuration 1710 reduces horizontal movement of the capsule 12 orthogonal to the travel direction of the capsule 12 (or provides horizontal stability).

With track configuration 1715, two tracks 100" are provided extending from the tube 14 at approximately 90° angles relative to vertical. As shown in FIG. 17, with track configuration 1715, the two tracks 100" have "V"-shaped profiles. The capsule 12 has corresponding "V"-shaped air bearings 102" structured and arranged to interact with the two tracks 100". With this embodiment, each of the "V"-shaped air bearings 102" provide a cushion of air both upwardly and downwardly, with each cushion of air interacting with the respective sides of the "V"-shaped track 100". In this embodiment, the walls of the "V"-shaped profile of the track 100" additionally serve to reduce up-and-down movement so as to more effectively constrain the capsule 12 on the track 100". In other words, this track configuration 1715 reduces vertical movement (i.e., provides increased vertical stability) of the capsule 12 within the tube 14 by providing balancing vertical force vectors, and provides additional horizontal stability by providing balancing horizontal force vectors.

Figure 18:
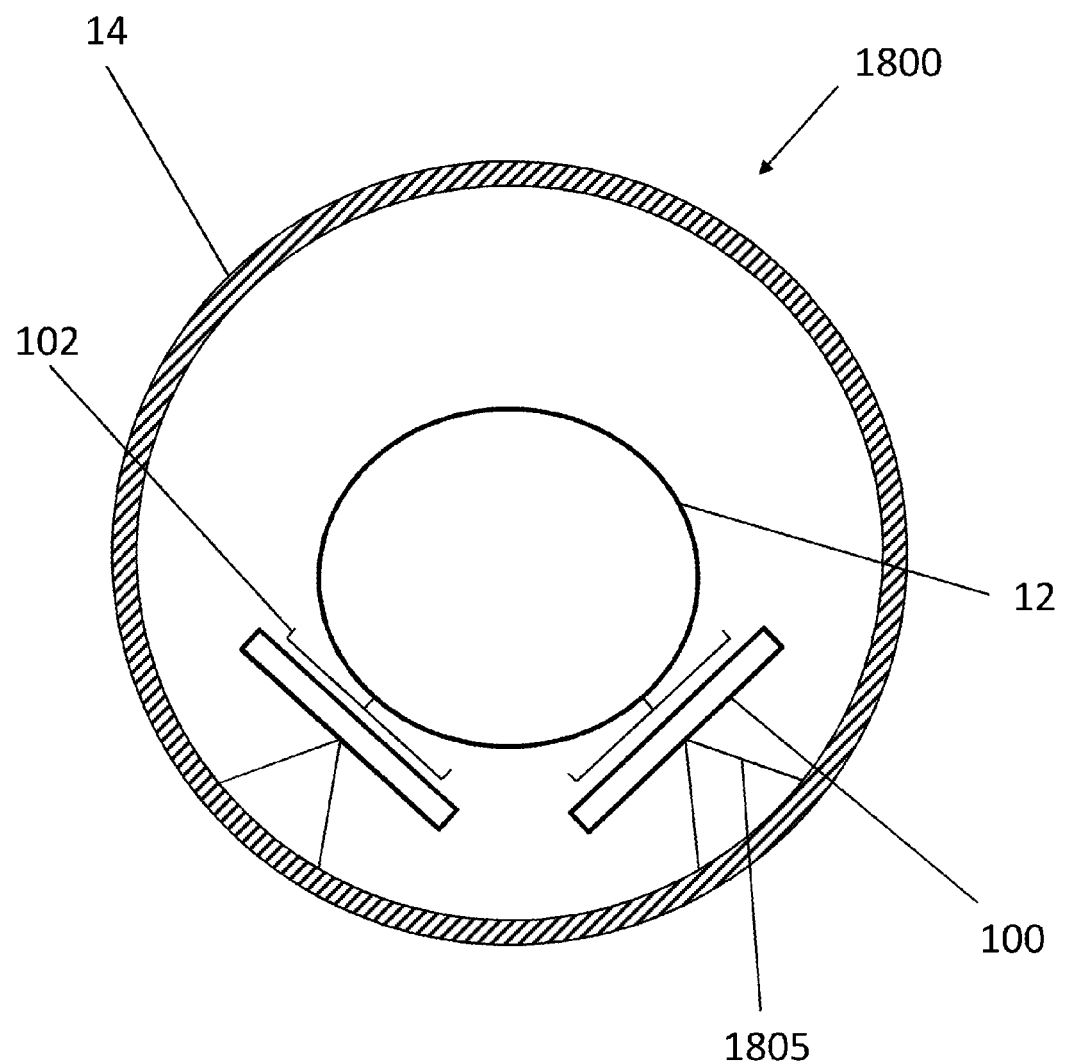
FIG. 18 is a diagram of yet another exemplary track and bearing configuration for use in the transportation system in accordance with embodiments of the present disclosure.

As shown in FIG. 18, with exemplary track configuration 1800, two tracks 100 are provided extending from the tube 14 at approximately 45° angles relative to vertical, respectively, similar to the track configuration 1700 of FIG. 17. The capsule 12 has corresponding air bearings 102 structured and arranged to interact with the two tracks 100. In contrast to configuration 1700, with configuration 1800, the two tracks 100 are supported by an A-frame support 1805. In accordance with aspects of the disclosure, by an A-frame support 1805, the two tracks 100 are provided with additional stability, for example, as compared to the track configuration 1700 of FIG. 17.

Figure 19:
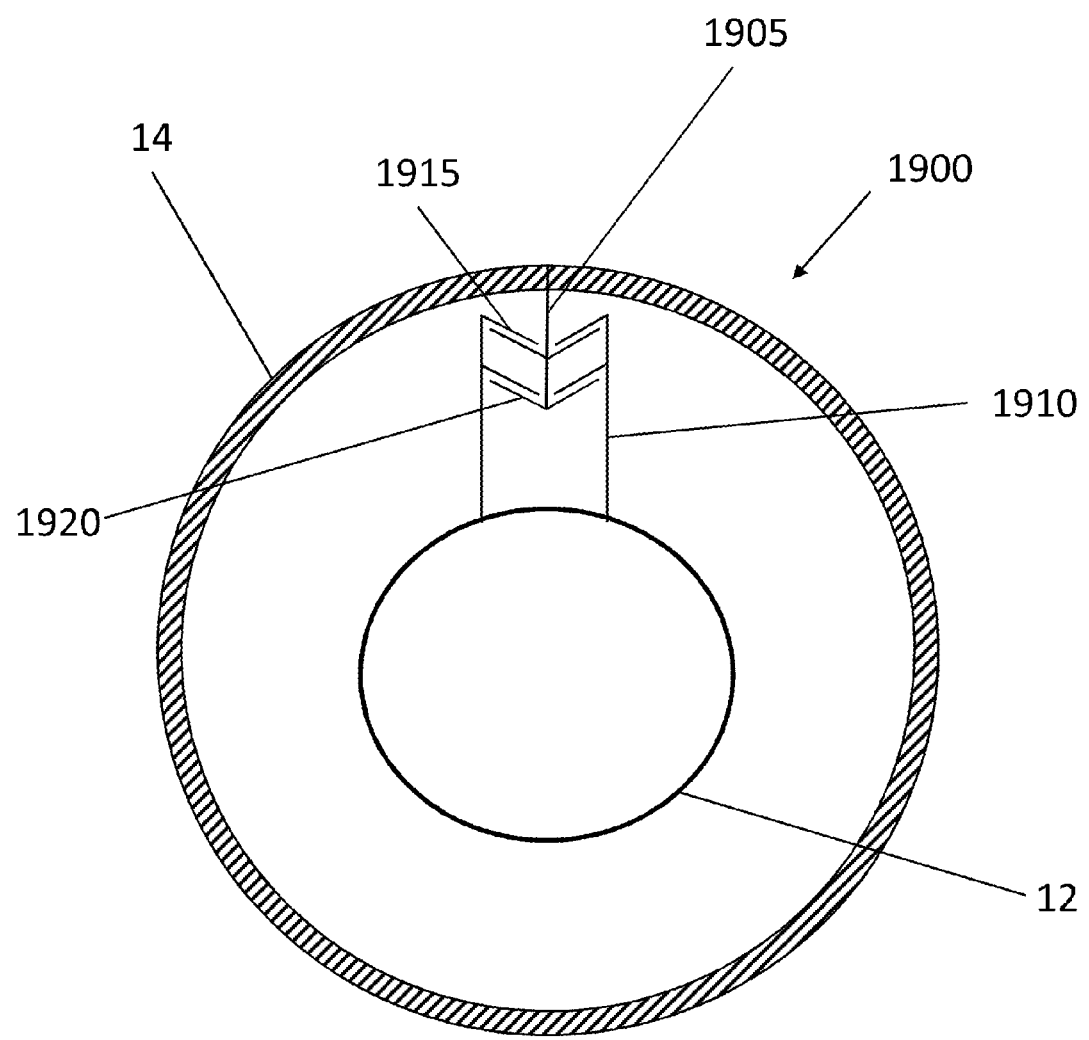
FIG. 19 is a diagram of an additional exemplary track and bearing configuration for use in the transportation system in accordance with embodiments of the present disclosure.
Figure 20:
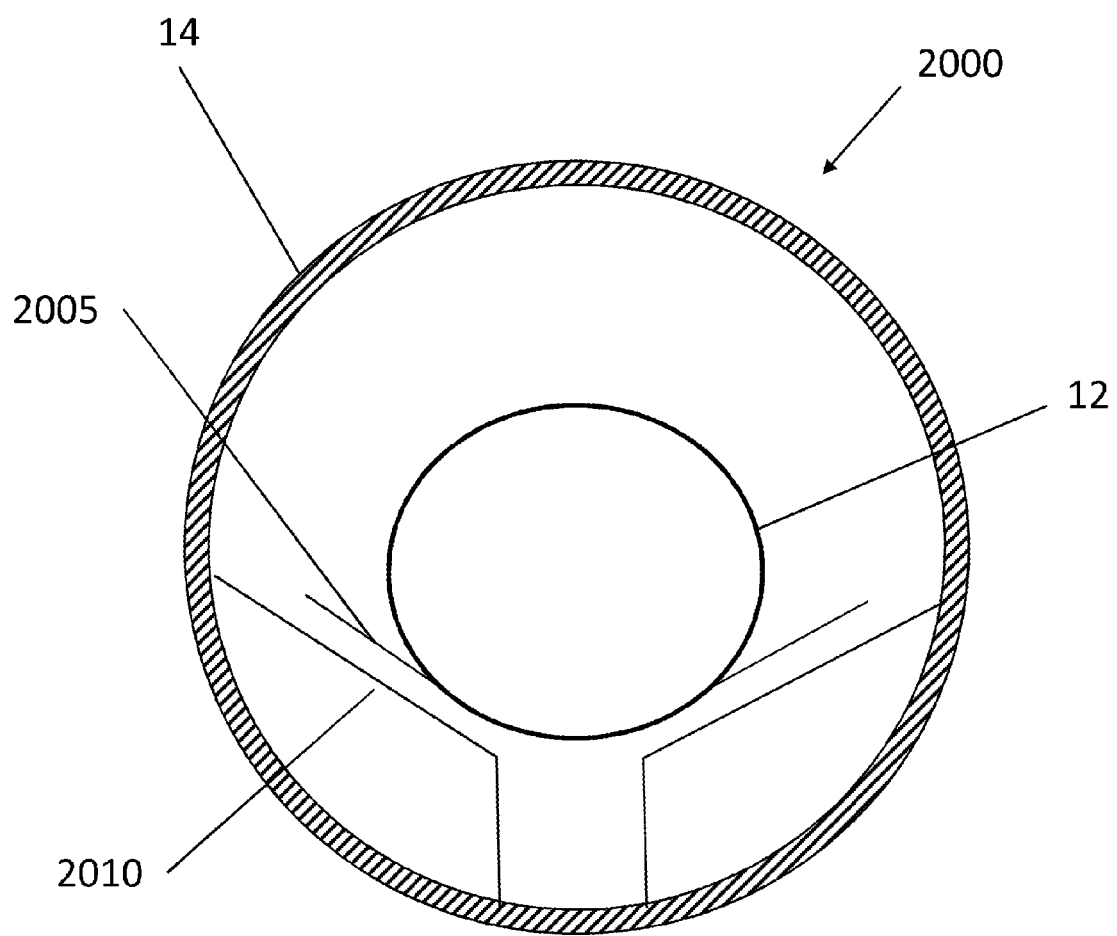
FIG. 20 illustrates an additional exemplary track and bearing configuration for use in the transportation system in accordance with embodiments of the present disclosure.

FIGS. 19-21 illustrate other exemplary and non-limiting track configurations of the present disclosure. FIG. 19 shows a track configuration 1900 wherein the track 1905 is arranged on an upper surface of the tube 14, such that the capsule 12 extends (or "hangs") below the track 1905. As depicted in FIG. 19, the capsule 12 includes a bearing 1910 (e.g., a fluid or magnetic bearing) having projections 1915 that are structured and arranged to interact with corresponding projections 1920 on the track 1905. As should be understood the bearing projections 1915 output a force (e.g., fluid flow or magnetic force) that acts against the corresponding projections 1920 so as to levitate the capsule.

FIG. 20 shows an exemplary and non-limiting track configuration 2000. As shown in FIG. 20, a capsule 12 has a pair of fins 2005 (e.g., dihedral fins) extending from the capsule 12 that cooperate with corresponding inclined track surfaces 2010 to improve lateral stability of the capsule 12 by providing balancing horizontal force vectors.

Figure 21A:
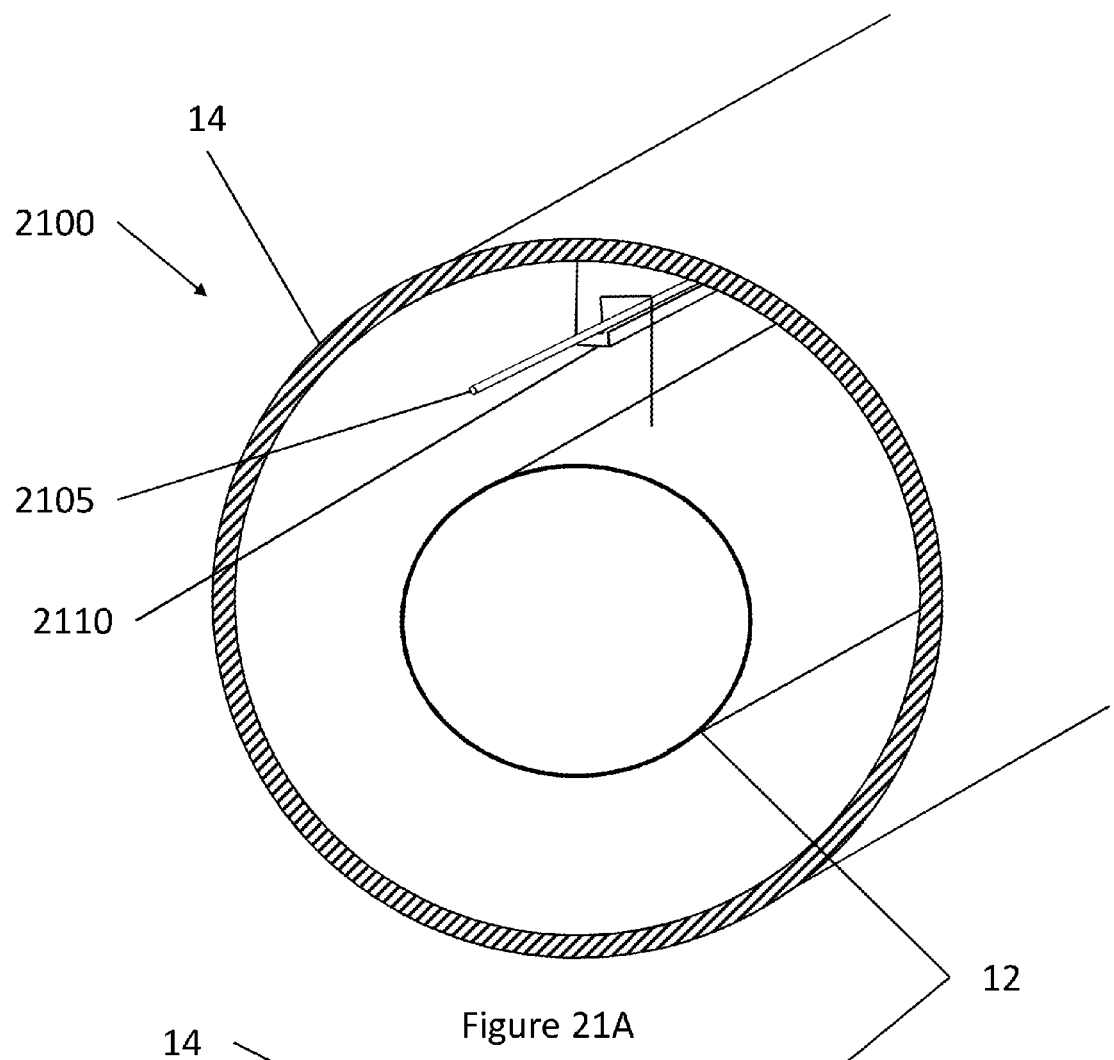
FIGS. 21A-21B illustrate views of an additional exemplary track and bearing configuration for use in the transportation system in accordance with embodiments of the present disclosure.
Figure 21B:
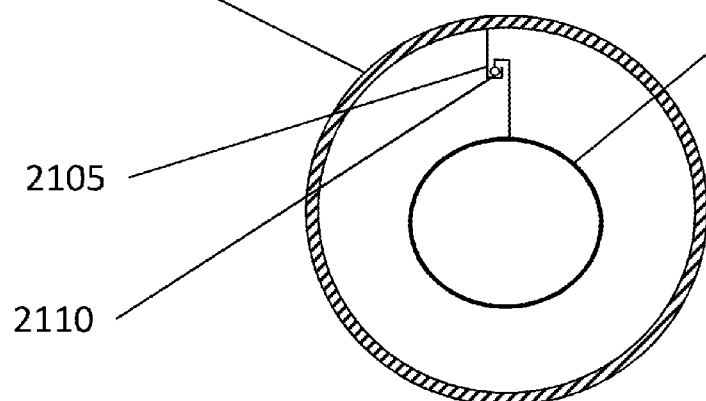

FIGS. 21A and 21B illustrate an exemplary track configuration 2100 wherein the schematically depicted capsule 12 is suspended from a moving cable 2105 or the like. In embodiments, the cable may be pulled by motors at the end of the capsule. Alternatively, a magnetic drive with magnets placed periodically through the tow cable 2105 may be used to propel the capsule 12. Additionally, in accordance with further aspects of the disclosure, a flat section 2110 in the tube attachment point hook may include hydrodynamic bearings to be utilized along the entire surface.

Track Switching

While the exemplary embodiments have been described as traveling, for example, from point A to point B, the disclosure contemplates that having single tubes between destinations will rapidly increase system cost and create bottle necks at major transportation hubs. Additionally, it may be difficult to change routes using air bearings that utilize a circular hull to ride on. Thus, there is a need for an effective technique to switch between different routes within the transportation system.

Figure 22A:
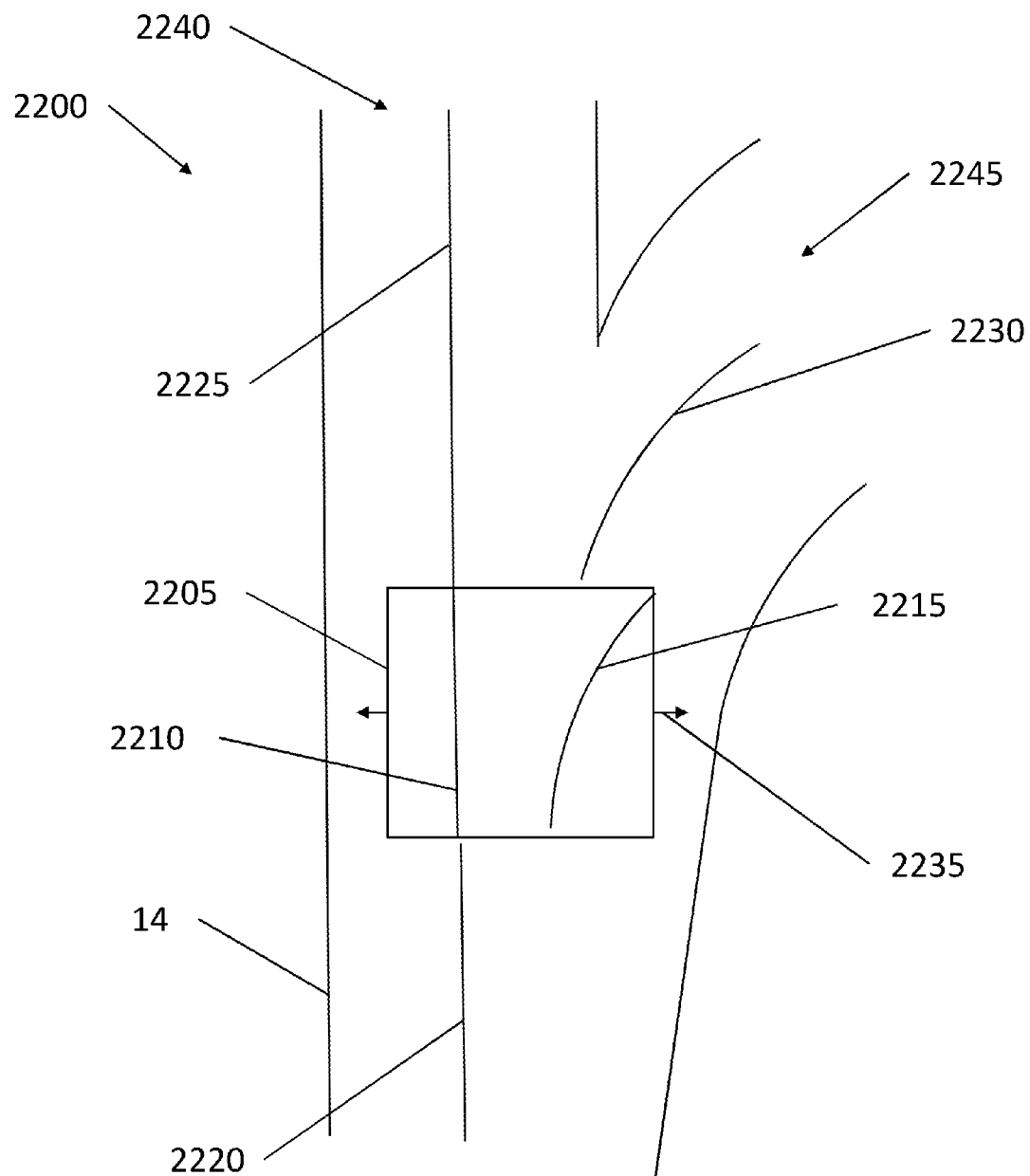
FIGS. 22A-22C illustrate exemplary track switching systems for use in the transportation system in accordance with embodiments of the present disclosure.
Figure 22B:
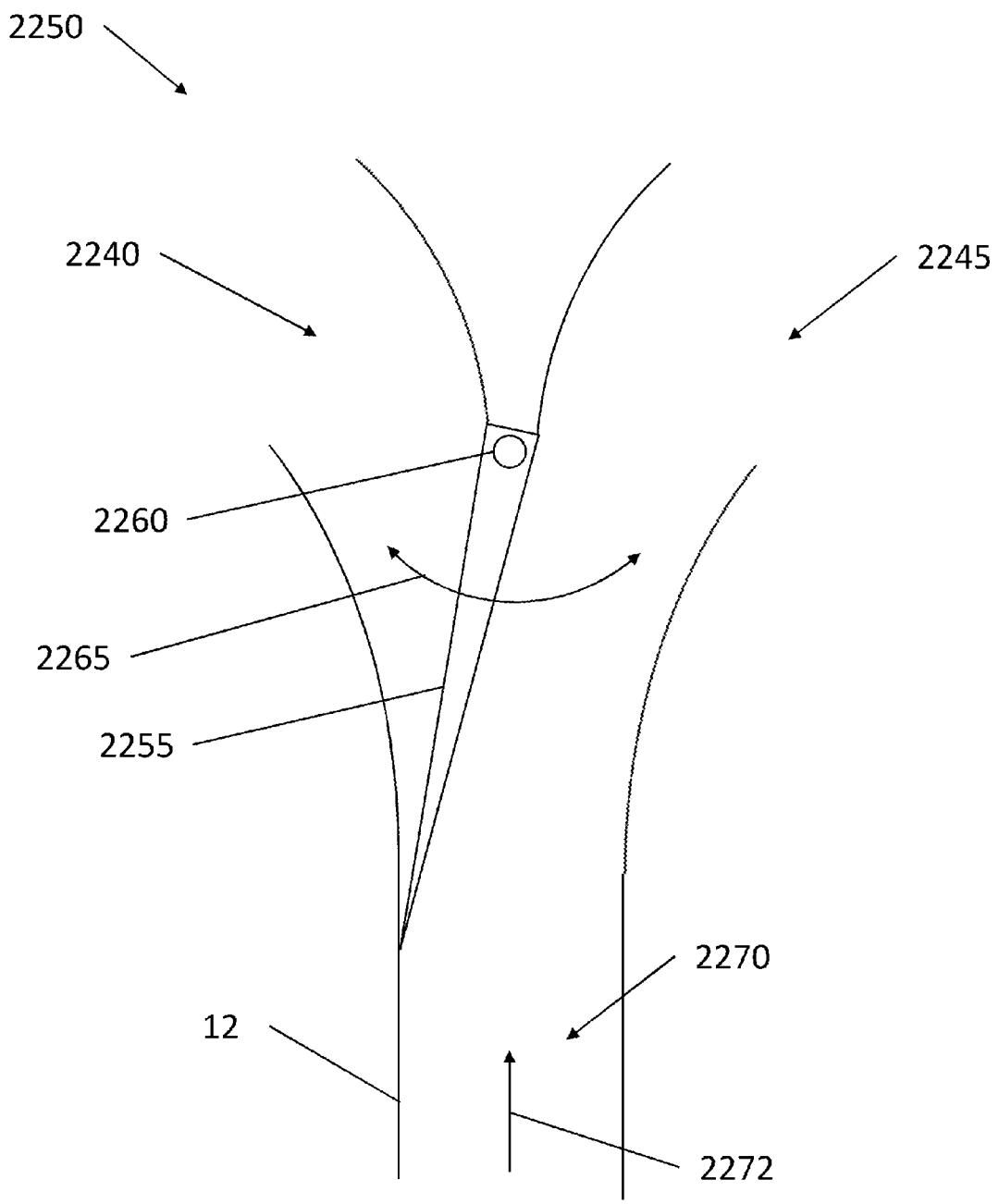
Figure 22C:
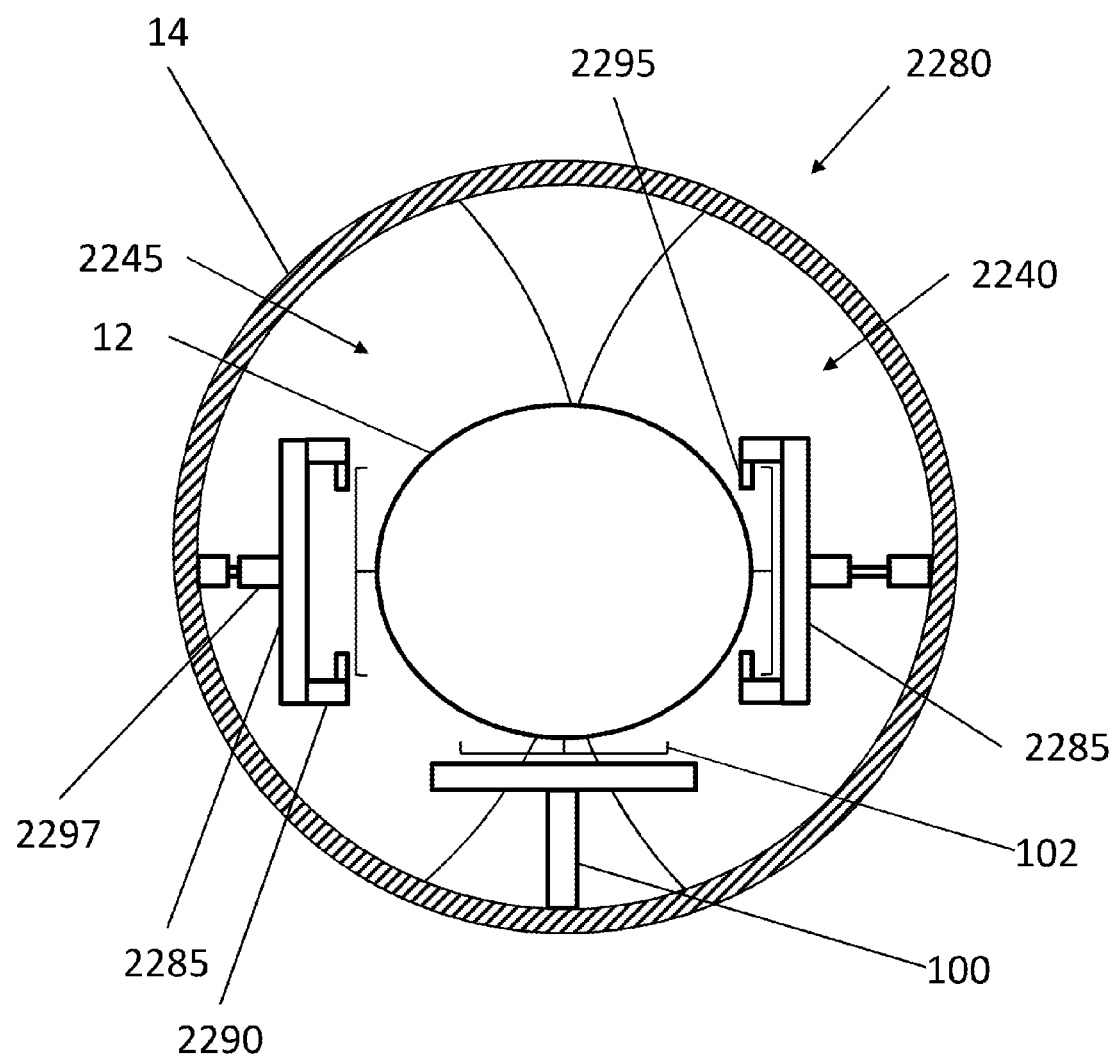

With embodiments of the present disclosure, as shown in exemplary FIGS. 22A-22C, route switching capabilities mid-route will greatly increase travel times, decrease "layovers" and add to increase system level efficiency. In embodiments, the pod may ride on two rails simultaneously, wherein each rail eventually veers away from the other in the turn. In accordance with aspects of the disclosure, the correct (e.g., desired path) rail stays in place, while the alternative route rail is evacuated from use by actuation (e.g., lowered from the travel path) so as not to impact the vehicle travel, such that only the correct rail (i.e., directing the capsule down the desired path) remains. While not illustrated in the schematic depictions of FIGS. 22A-22C, it should be understood that appropriate controllers (e.g., located in the tube and in communication with a central command and/or individual capsules) may be utilized to actuate the track switching systems as the respective capsules traverse the tube transportation system. Additionally, while not depicted in FIGS. 22A-22C, one or more sensors (e.g., optical or positional sensors) may be utilized to detect a current position of the path switching structures and provide feedback to the control systems (e.g., comprising one or more computer processors) so as to assist in properly positioning the path switching structures for the desired downstream path.

In embodiments, the presently disclosed track switching systems may be designed for optimal loading scenarios on the capsule. In accordance with aspects of the disclosure, by designing the track switching systems for optimal loading scenarios on the capsule, the switching time can be greatly decreased.

In further embodiments, for example as schematically depicted in FIG. 22A, a path switching configuration 2200 includes a skid 2205 having two rail sections 2210, 2215 for directing the capsule (not shown) down one of two alternative paths 2240, 2245, respectively. In accordance with aspects of the disclosure, the skid 2205 is actuatable (e.g., hydraulically, pneumatically, or using a servo motor) back and forth in direction 2235 to move the desired rail section (i.e., either rail section 2210 or rail section 2215) to align with the upstream track 2220, so as to direct the capsule down the desired path. For example, as depicted in FIG. 22A, the skid 2205 is currently positioned to align upstream track section 2220 with downstream track section 2225 to send a capsule down path 2240. In accordance with aspects of the disclosure, through actuation of the skid 2205 to the left, the upstream track section 2220 may be aligned with downstream track section 2230 to send a capsule down path 2245.

Additionally, as shown in the exemplary depiction of a switching system of FIG. 22B, with path switching configuration 2250, a large wall or a flapper door 2255, which is structured and arranged to match the contour of the tube 14, can be pivoted (e.g., using a motor and controller) in either direction 2265 around pivot 2260 so as to direct the capsule (not shown) to the correct (e.g., desired) tube path direction (i.e., 2240 or 2245). For example, as depicted in FIG. 22B, the flapper door 2255 is currently positioned to connect upstream tube section 2265 with downstream tube path 2245 so as to send a capsule (not shown) down path 2245. In accordance with aspects of the disclosure, through actuation of the flapper door 2255 in a counterclockwise rotation, the upstream tube section 2270 may be connected with downstream tube path 2240 so as to send a capsule (not shown) down path 2240.

In accordance with aspects of the disclosure, utilizing these moveable walls allows for the use of air bearings and maintains the integrity of the inner hull of the tube for the pod to ride on. Moreover, should the flapper door fail to properly actuate, the capsule can still travel down the incorrect path (e.g., the non-desired path). In embodiments, should the flapper door 2255 fail to actuate properly, such that the flapper door 2255 is in a position preventing passage down either path, one or more sensors (not shown) may detect the improper position, and halt (or slow) an approaching capsule until the flapper door 2255 is properly positioned.

While FIG. 22B is described with the capsule traveling in direction 2272 towards the diverging paths, it should be understood that the path switching configuration 2250 may be used for a capsule traveling in a direction opposite to direction 2272. That is, in addition to utilizing path switching configuration 2250 at diverging passages, the disclosure contemplates using such structures along points in the transportation path where two passages converge into a single passage.

FIG. 22C schematically illustrates a further exemplary and non-limiting embodiment in which the capsule 12 is levitated by fluid (e.g., air) bearings. In accordance with aspects of the disclosure, the directional path of the capsule 14 may be controlled by "pulling" the capsule 14 towards the desired downstream path, wherein one of the side tracks may be actuated out of the path of the capsule, so as to not impact the path of the capsule, while the opposite side track and the bottom track "steer" the capsule towards the desired downstream path.

For example, the capsule may utilize three air bearings 102 and corresponding tracks 100, for example, as depicted in configuration 1705 of FIG. 17. As a divergent path is approached, as shown in the exemplary depiction of FIG. 22C, the two side tracks may transition to actuatable tracks 2285. The actuatable tracks 2285 can be moveable in a horizontal direction to selectively position one of the tracks 2285 beyond an interaction range of the corresponding air bearing 102, depending on which alternative direction (e.g., path 2240 or path 2245) is desired. As an example, as shown in FIG. 22C, the left-side actuatable track 2285 has been moved leftward so that it is beyond an interaction range of the corresponding left-side air bearing 102. The capsule 12, while continuing to be levitated by track 100, is then "pulled" by the right-side actuatable track 2285 to direct the capsule down path 2240 (and away from path 2245). Upon traversing the path switching region, and continuing travel down path 2240, the right-side actuatable track 2285 transitions back to a right-side track 100 (i.e., a non-actuatable track) and the right side air bearing 102 interacts with the right-side track 100. Additionally, the left-side air bearing 102 interacts with a left side track (not shown) of the tube of path 2240.

As shown in the embodiment/schematic depiction of FIG. 22C, the actuatable tracks 2285 include side portions 2290 and overhang portions 2295. The side portions 2290 and overhang portions 2295 are structured and arranged to assist in "pulling" the capsule 12 towards the selected path (e.g., 2240 or 2245). In certain embodiments, the side air bearings 102 may be operable to eject an air bearing fluid out from the side portions and the top portions of the air bearing 102 (i.e. towards the capsule 12) so as to interact with the side portions 2290 and overhang portions 2295 of the actuatable track 2285 as the actuatable track 2285 "pulls" the capsule 12 down the selected downstream path 2240. Additionally, in certain embodiments, the left-side air bearing may interact with the overhang portions 2295 at least for a portion of the travel through the switching region to help "push" the capsule towards selected downstream path 2240. In embodiments, the air bearing 102 that is not being used during the path switching transition (e.g., the left-side bearing with the path selection as depicted in FIG. 22C) may be configured to turn off (or reduce) fluid flow during the path switching transition.

As should be understood, should it be desired to send the capsule 12 along downstream path 2245, the right-side actuatable track 2285 would be moved beyond an interaction region of the right-side bearing 102, and the left-side actuatable track 2285 would be moved into an interaction region of the left-side bearing 102. As shown in FIG. 22C, the actuatable tracks 2285 may be moveable into and out of the path of the air bearings 102 of the capsule 12, for example, via a pneumatic or a hydraulic actuator 2297.

In accordance with further aspects of the disclosure, a track configuration may change along a path of travel, for example, for "turning" the capsule when a track diverges into two separate paths. For example, in embodiments, the tubes may include one or more tracks having different functions, such as moving the capsule to different routes by the combination of a top and bottom track. In one exemplary and non-limiting embodiment, if a top track is used as a primary mode of capsule movement, when a switching region (or switching station) is encountered, a bottom track may be provided for a portion of the capsule movement, which supports the weight of the capsule while the top track is switched to the appropriate track to follow. In further embodiments, it is also contemplated that rotary bearings (e.g., wheels) may be used (with or without air injection) to provide lift or support for the capsule to accomplish the same aims.

FIG. 23A schematically illustrates an exemplary track configuration 2200 utilizing a fluid (e.g., liquid) bearing 2205 in accordance with further aspects of the present disclosure. In contrast to the air bearings described herein, the fluid bearing 2205 is operable to inject a layer of fluid (e.g., liquid) so as to levitate the capsule. As shown in FIG. 23A, the fluid bearing 2205 is operable to eject (e.g., through one or more nozzles) a layer of fluid 2210 (e.g., viscous, highly incompressible fluid or less compressible liquid) into a region between the fluid bearing 2205 and the track 100. In accordance with aspects of the disclosure, the layer of fluid 2210 is operable to support the weight of the fluid bearing 2205 and the capsule 12 thereon so as to reduce friction between the track 100 and the capsule 12 moving along the track 100.

FIG. 23B illustrates another exemplary fluid (e.g., liquid) bearing configuration 2300 for use with the transportation system in accordance with aspects of the present disclosure. As schematically illustrated in FIG. 23B, a dynamic fluid bearing 2305 acts to provide lift from the surface of the track 100 as the fluid network 2310 is created by the motion of the capsule in the travel direction 2315. In accordance with aspects of the disclosure, the angled nature of the bearing 2305 (as schematically depicted) causes a rise in pressure from viscous force transformation. After leaving the end of the bearing 2305, the fluid $\dot{m}_{lift}$ can either vent out of the back 2320 of the bearing ($\dot{m}_{out}$) or be recirculated back through the bearing ($\dot{m}_{recycle}$), each with its own respective pressure losses. Introducing a high flow restriction (e.g., a tapered fluid path) at the back 2320 of the bearing reduces the fluid lost (e.g., $\dot{m}_{out}$). Additionally, as shown in FIG. 23B, additional bearing fluid ($\dot{m}_{in}$) may be input into the bearing fluid flow 2310 through fluid input 2325 (e.g., pumped from a bearing fluid storage) to compensate for bearing fluid lost ($\dot{m}_{out}$) out the back side of the fluid bearing 2305. In accordance with further aspects of the disclosure, fluid lost by an upstream bearing can be picked up by similar bearings downstream as $\dot{m}_{upstream}$ (which is shown in dashed line, as this flow is not present for the front-most bearing), allowing the capsule to move down the track depositing fluid while collecting its own previously used fluid with downstream bearings. This reuptake of bearing fluid by downstream bearings may be utilized, for example, when the high flow restriction configuration is used in a series of fluid bearings.

Figures 24A, 24B:
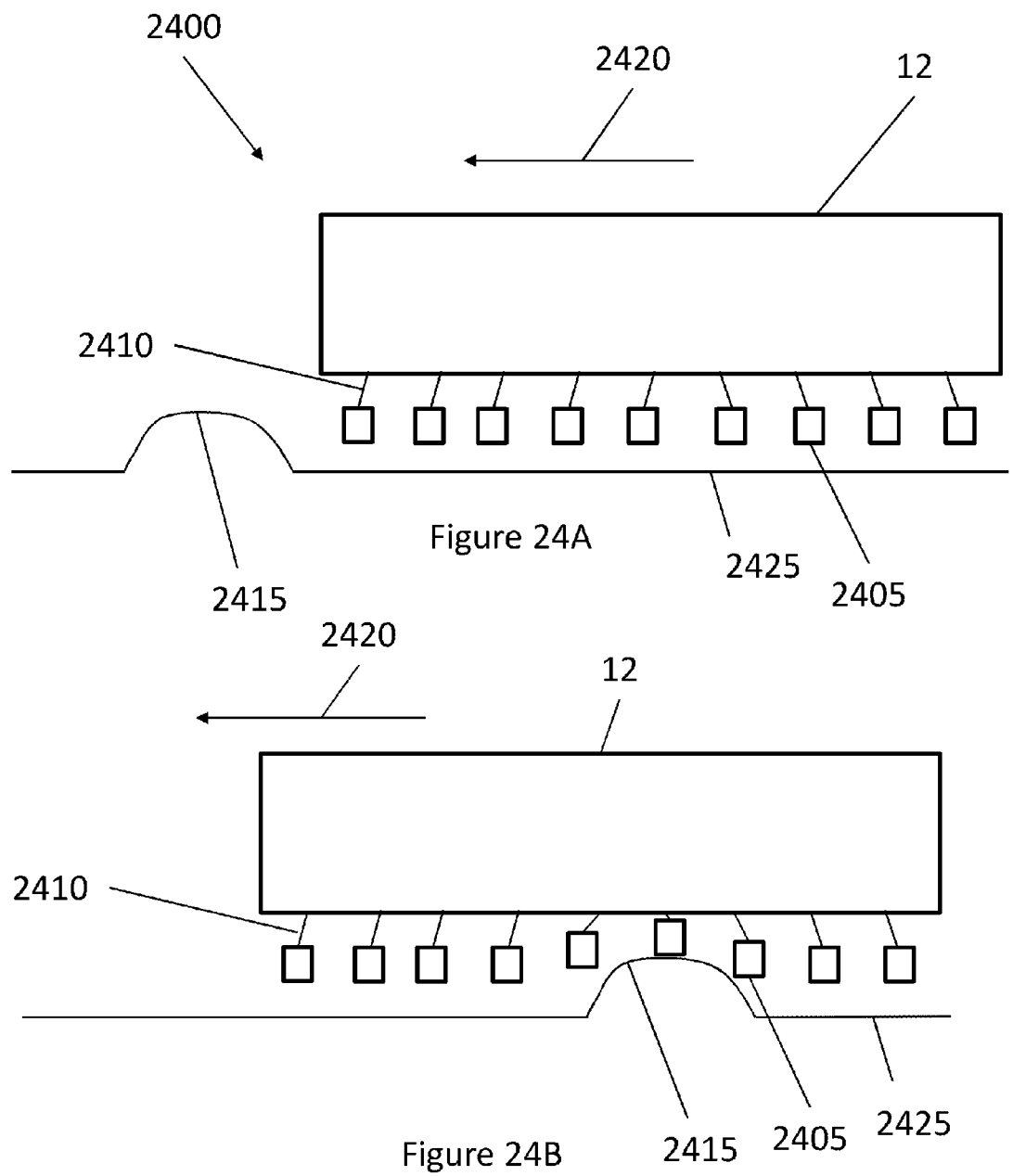
FIGS. 24A-24B illustrate views of an exemplary track and bearing configuration for use in the transportation system in accordance with embodiments of the present disclosure.

FIGS. 24A and 24B illustrate further aspects of embodiments of the transportation system of the present disclosure. In system 2400, the capsule 12 includes a number of support bearings 2405 on the outer (e.g., lower) surface of the capsule 12. In accordance with embodiments of the disclosure, each of the support bearings 2405 includes an independent suspension 2410 (e.g., comprising shocks, springs, hydraulic and/or pneumatic cylinders) that can adjust to protuberances 2415 in the tube or track 2425 during travel while maintaining a steady travel speed. As should be understood, the size of the protuberance 2415 is exaggerated so as to illustrate aspects of the disclosure.

In accordance with aspects of the disclosure, as the capsule 12 continues moving in the travel direction 2420, as schematically depicted in FIG. 24B, the capsule encounters the protuberance 2415. As shown in FIG. 24B, the independent suspensions 2410 of each of the support bearings 2405 is operable to move (e.g., upwardly and downwardly) via the independent suspensions 2410, so as to adjust the height of the respective bearings 2405 to smoothly travel past the protuberance 2415.

Figure 25A:
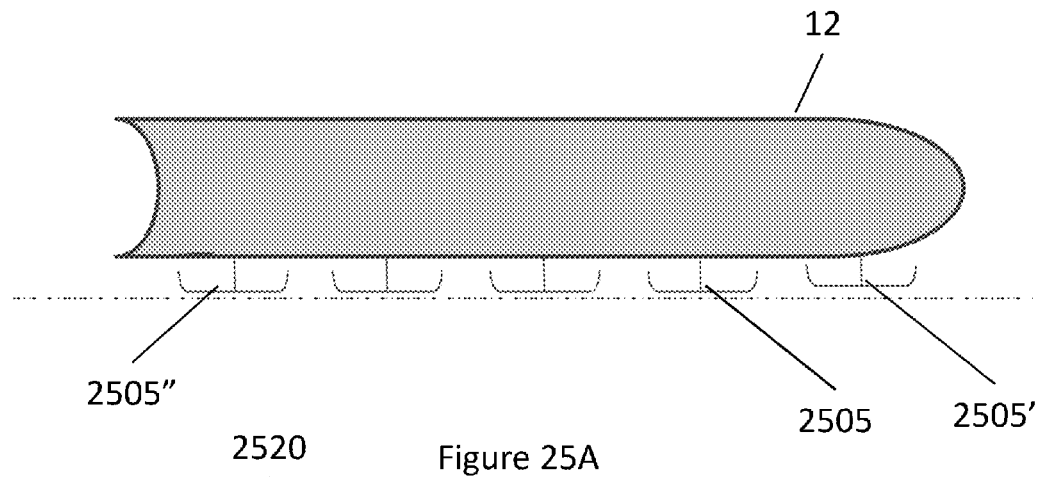
FIGS. 25A-25B illustrate an exemplary fluid bearing configuration and a feed forward system for controlling (or adjusting) the operation fluid bearing configuration for use in the transportation system in accordance with embodiments of the present disclosure.
Figure 25B:
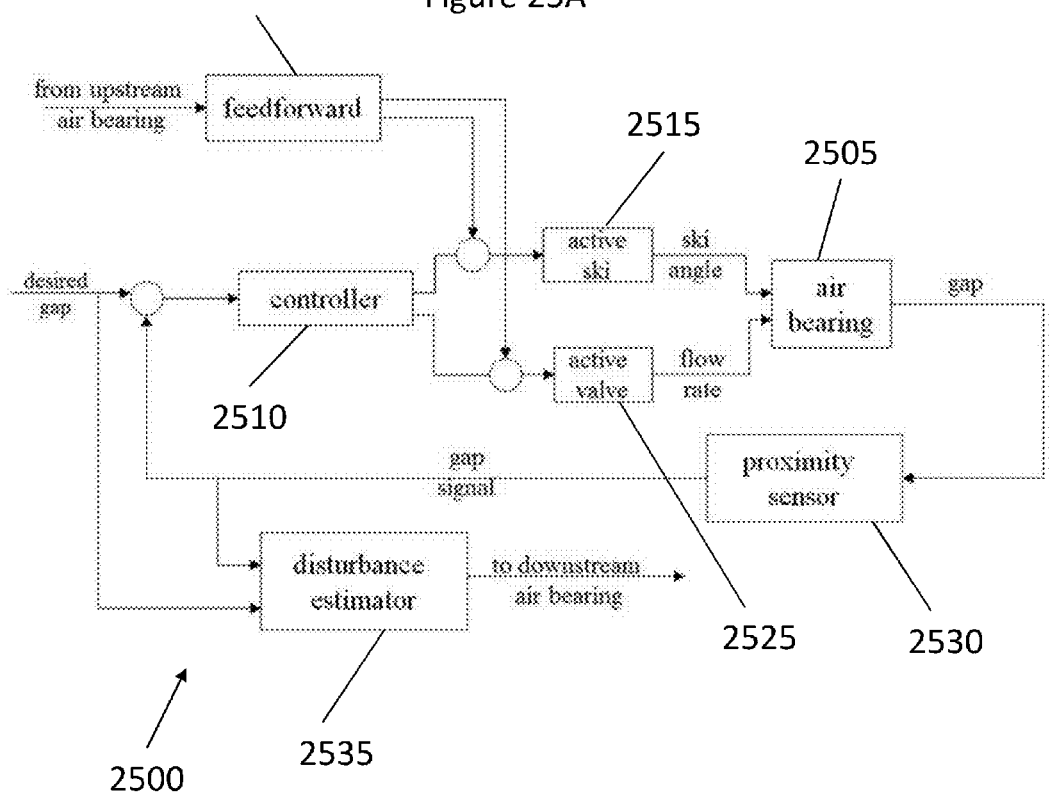

FIG. 25A schematically illustrates an exemplary and non-limiting capsule 12 having a plurality of bearings 2505 in accordance with aspects of the disclosure. The bearings 2505 and independent suspensions 2410 may be attached to the capsule 12 via welding and/or with fasteners. FIG. 25B illustrates an exemplary and non-limiting control system 2500 for subsequently increasing or decreasing respective flow rates and bearing angle (or ski angle) to the surrounding bearings to adjust the capsule travel path, for example, in light of an encountered protuberance.

As shown in FIG. 25B, a controller 2510 is operable to receive a desired gap signal (e.g., indicating a desired gap between the bearing and the track) and send a control signal for controlling a ski angle of the bearing to an active ski angle control 2515. The active ski angle control 2515 also receives a ski angle feedforward signal from an upstream bearing via a feedforward control 2520. The active ski angle control 2515 is operable to utilize the control signal for controlling a ski angle and the ski angle feedforward signal from an upstream bearing to determine a ski angle control signal for the controlled air bearing, which is sent to the air bearing 2505. In a similar manner, the controller 2510 is operable to send a control signal for controlling a flow rate to an active valve control 2525. The active valve control 2525 also receives a flow rate feedforward signal from an upstream bearing via the feedforward control 2520. The active valve control 2525 is operable to utilize the control signal for controlling flow rate and the flow rate feedforward signal from the upstream bearing to determine a flow rate control signal for the controlled air bearing, which is sent to the air bearing 2505.

As shown in FIG. 25B, a gap between the bearing and the track is detected by a proximity sensor 2530, e.g., in real time, and a gap signal is fed back to the controller 2510 so as to assist in controlling the actual gap, e.g., in real time. In accordance with further aspects of the disclosure, the gap signal and the desired gap signal are also sent to a disturbance estimator 2535, which is operable to utilize the actual measured gap and desired gap of the currently controlled bearing (e.g., how a protuberance impacted the currently controlled bearing) so as to determine an estimated disturbance to a downstream bearing of the capsule 12 (e.g., the immediately downstream bearing).

As shown in FIG. 25B, the disturbance estimator 2535 is operable to send a feedforward signal to a downstream bearing. As should be understood, this feedforward signal to a downstream bearing then is used as the inputted feedforward signal for a control system 2500 for a downstream bearing. Additionally, as should be understood, the controller for the most forward bearing 2505' for the capsule may not include a feedforward signal, as there is no upstream bearing relative to the most forward bearing 2505' from which to receive a feedforward signal. Likewise, the controller for the most rearward bearing 2505" may not be configured to send a signal to a downstream bearing, as there is no downstream bearing relative to the most rearward bearing 2505" of the capsule 12.

By implementing these aspects of the disclosure, for example, an upstream bearing is operable to react to a tube protuberance (e.g., a bump, a drop or a gap in the track or tube), and the control loop is operable to signal to other downstream bearings to increase or decrease fluid flow rate (and, in embodiments, a bearing (or ski) angle), accordingly, so as to provide a smoother ride over the protuberance.

In embodiments of the present disclosure, it is contemplated that levitation is accomplished utilizing a phase change of a fluid in the gap between the fixed surface of the track or tube and a surface of the capsule. In accordance with aspects of the disclosure, the act of phase change causes pressure to build between the surfaces of the track and bearing, causing lift. For example, in certain embodiments, a subcooled liquid can be placed into the surface gap, such that the surrounding energy causes vaporization of the subcooled liquid. In certain embodiments, the fixed surface (or track) and/or the vehicle surface (or bearing) can be heated to cause phase change.

Figure 26:
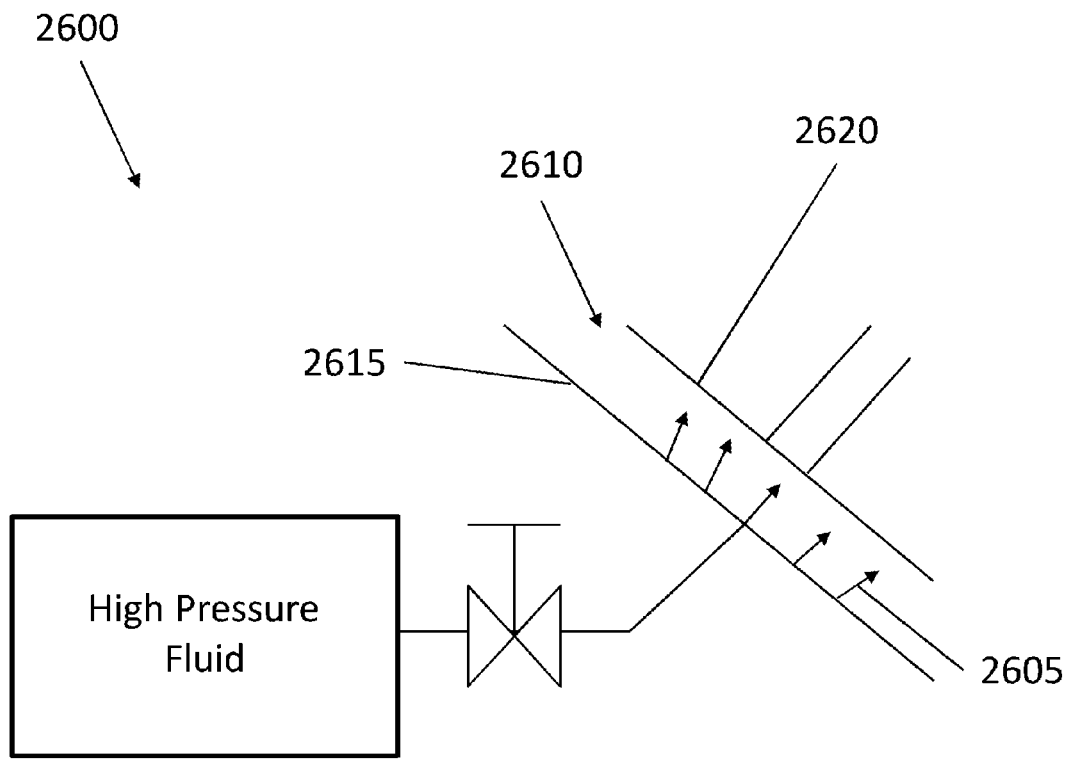
FIG. 26 is a schematic exemplary depiction of another fluid bearing configuration for use in the transportation system in accordance with embodiments of the present disclosure.

FIG. 26 schematically depicts another bearing configuration 2600 in accordance with aspects of the present disclosure. In this embodiment, fluid or air 2605 under high pressure is burped or allowed to flow into an area 2610 (e.g., using one or more nozzles) between the fixed surface 2615 of the track or tube and an adjacent surface 2620 of the capsule. In accordance with aspects of the disclosure, this high pressure release will fill the space 2610 between the two surfaces, causing the capsule to levitate. It is also understood that, if the tube environment is evacuated (e.g., to create a low-pressure environment), ambient pressure could be released between the surfaces 2615, 2620 to accomplish the same aim, as the ambient pressure is relatively high compared to the low-pressure environment.

Figure 27:
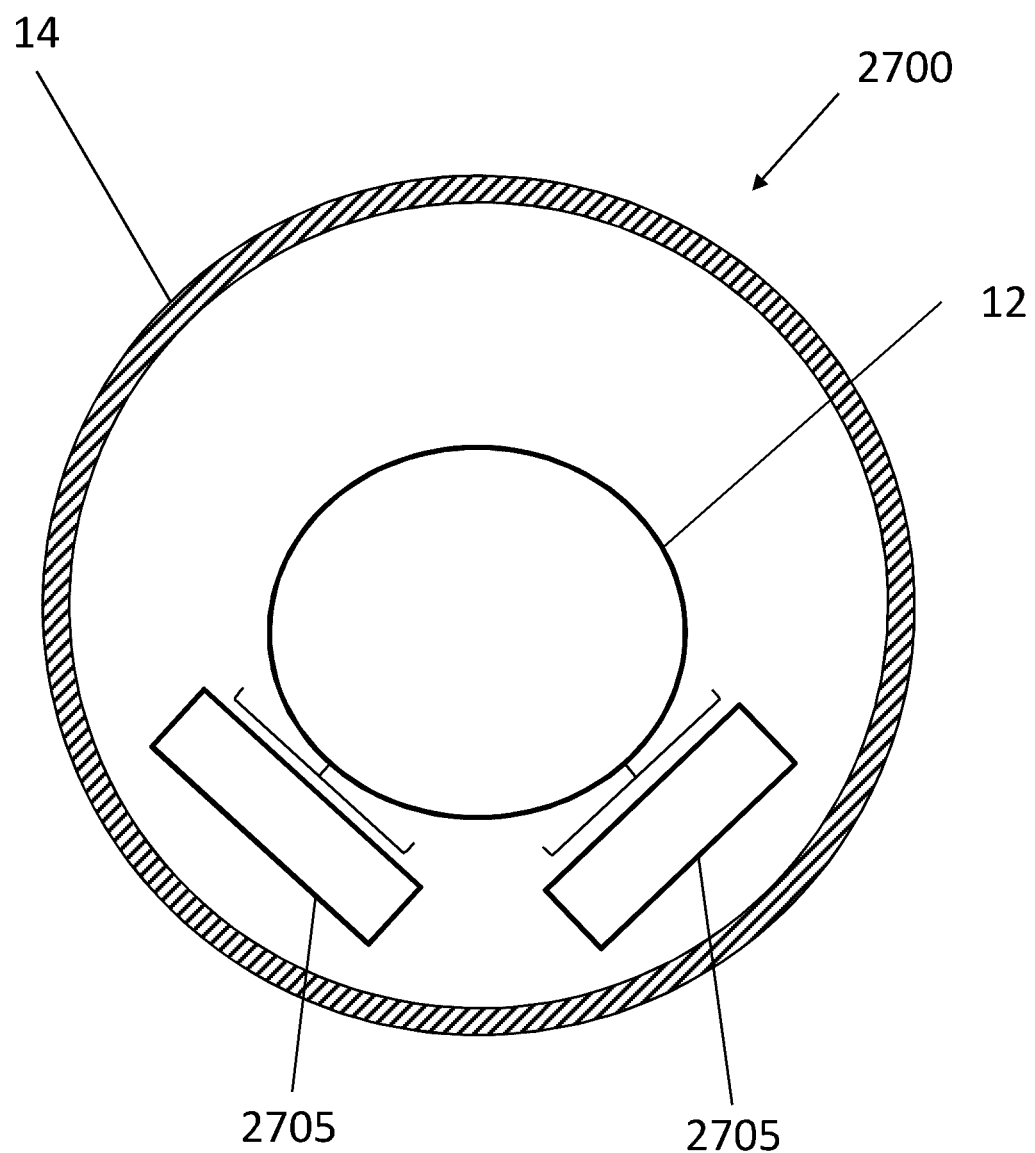
FIG. 27 is a schematic exemplary depiction of another track and bearing configuration for use in the transportation system in accordance with embodiments of the present disclosure.

FIG. 27 schematically depicts an exemplary and non-limiting embodiment of a track configuration 2700 in accordance with additional aspects of the disclosure. As shown in FIG. 27, with this track configuration, the pair of tracks 2705 is supported within the tube 14 but is connected to the inner periphery of the tube 14 only at discrete locations (not shown) with supports that may be welded and/or fastened to the inner periphery of the tube 14. Thus, as depicted in FIG. 27, which schematically illustrates a cross-sectional view of the tube at a section where the tracks are not discretely supported, the pair of tracks 2705 is depicted at a distance from the tube 14.

In accordance with aspects of the disclosure, the capsule may be propelled (e.g., accelerated and/or decelerated) using linear motors (e.g., LSMs and/or LIMs), having, for example, stator segments arranged along discrete portions of the tube path, that interact with a rotor (or rotors) arranged on the capsule. In embodiments, both the rotor and the stators are arranged within the low pressure environment of the tube. In other contemplated embodiments, the stators or the rotor may be arranged outside of the low-pressure environment.

Figure 28A:
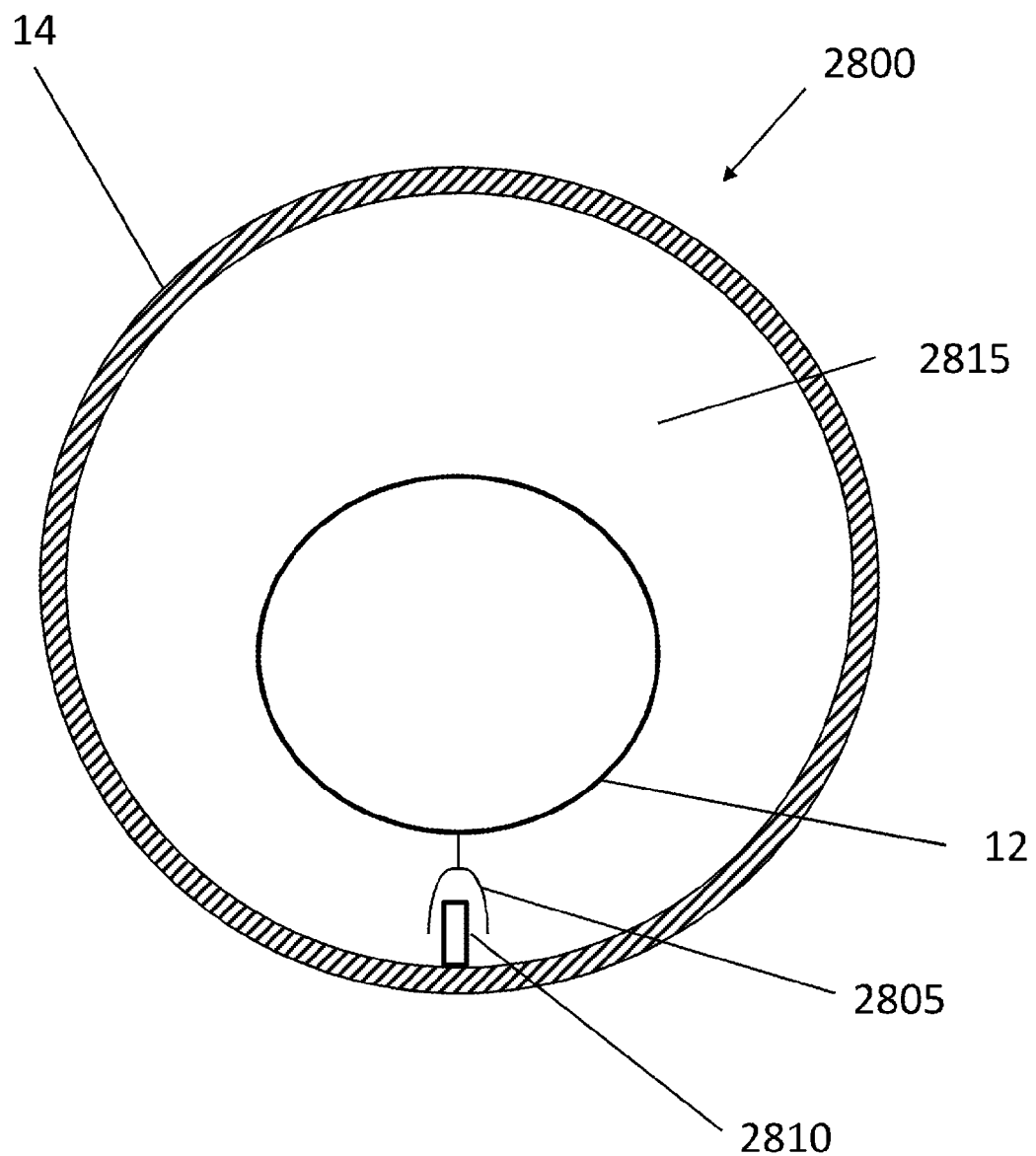
FIGS. 28A-28C are schematic exemplary views of track and capsule propulsion elements for use in the transportation system in accordance with embodiments of the present disclosure.

FIG. 28A illustrates an exemplary and non-limiting embodiment of a linear synchronous motor capsule propulsion system 2800, wherein the capsule 12 includes a rotor 2805 interacting with stators 2810 arranged within the low pressure environment 2815 of the tube 14.

Figure 28B:
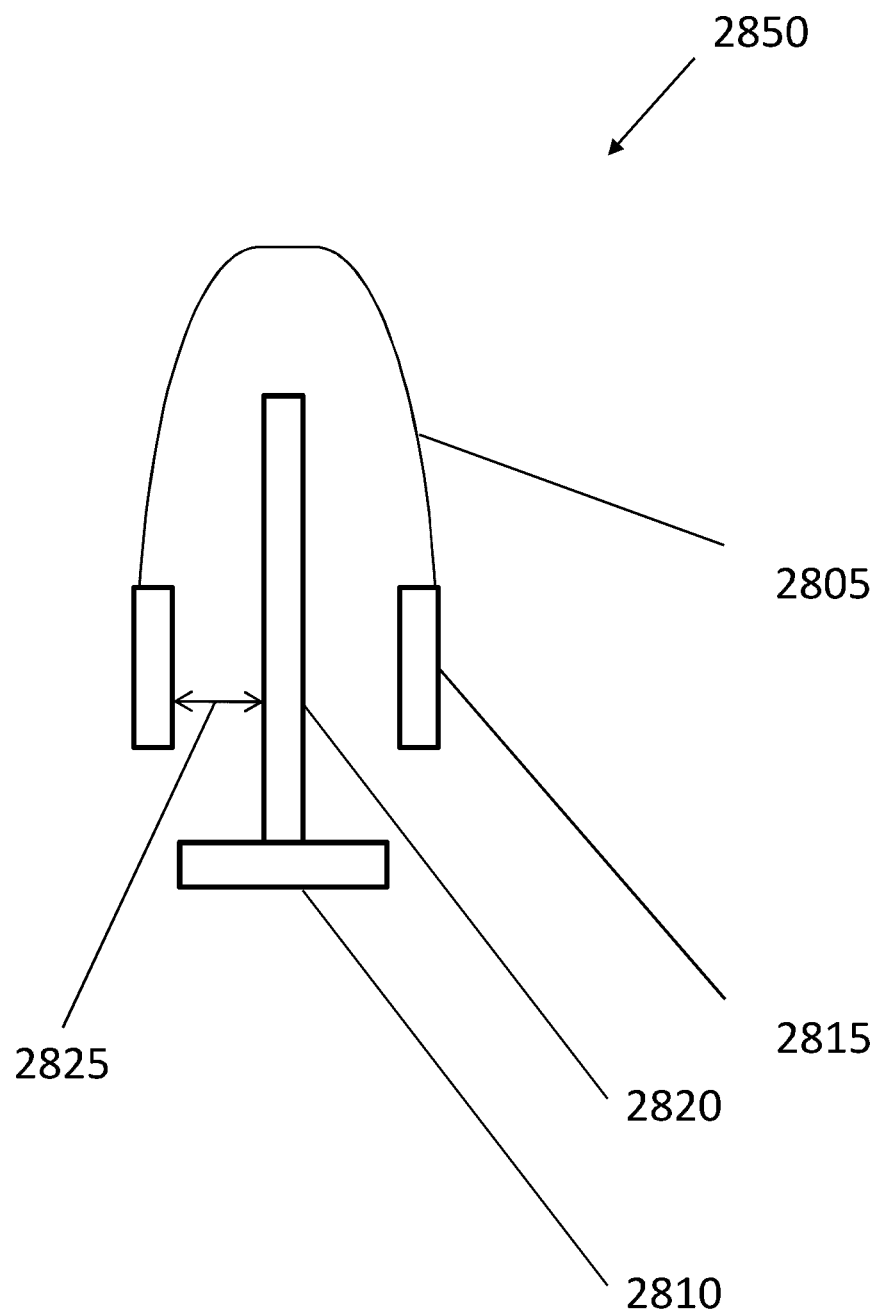

FIG. 28B illustrates an exemplary and non-limiting depiction 2850 of a rotor 2805 comprising magnets 2815 (e.g., permanent and/or electromagnets) interacting with the coils 2820 of a stator 2810 arranged within the low pressure environment of the tube. In one exemplary and non-limiting embodiment, spacing 2825 between the magnets 2815 and the coils 2820 may be approximately one inch. In further contemplated embodiments, the spacing 2825 may be less than one inch.

Figure 28C:
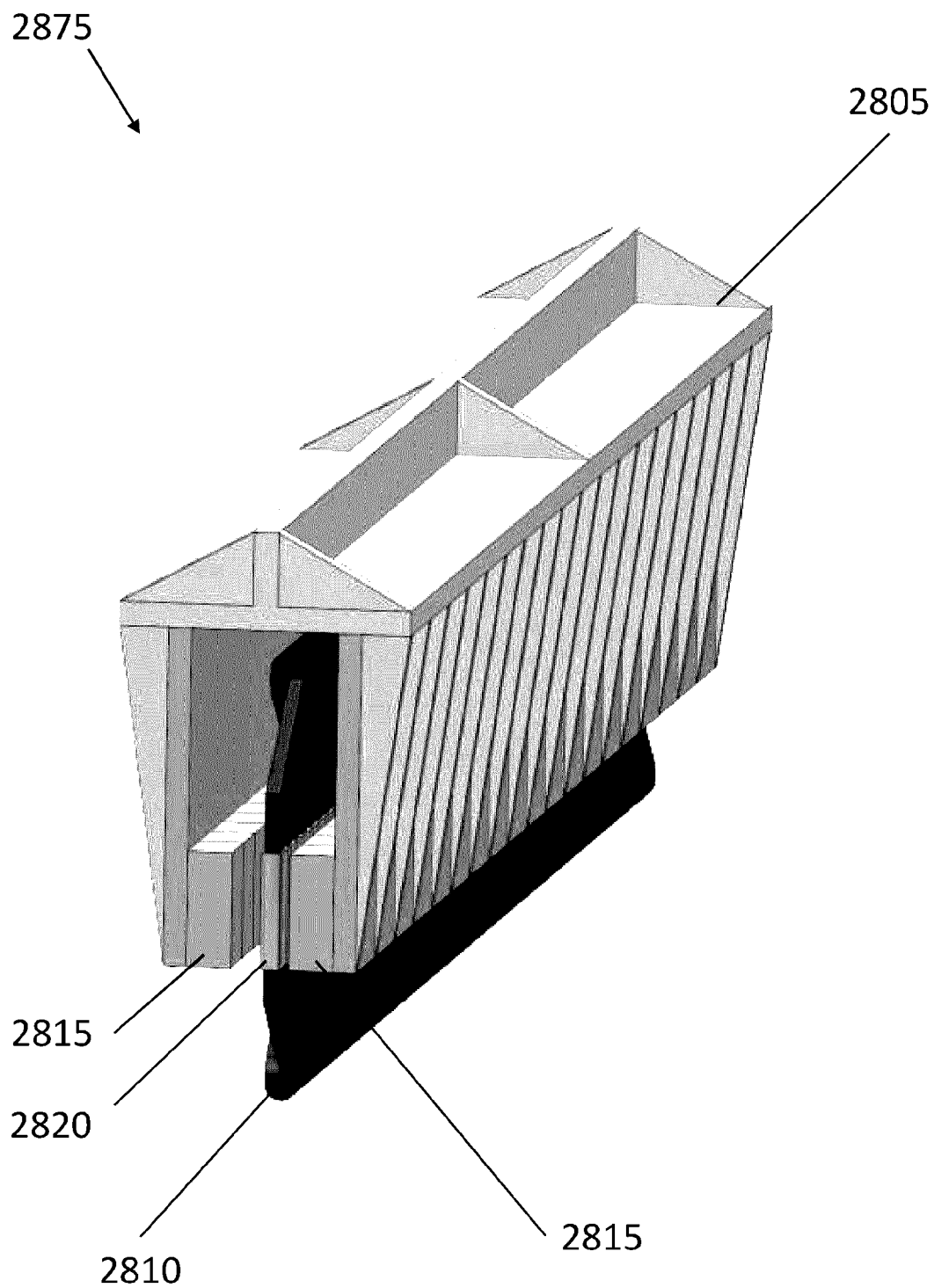

FIG. 28C illustrates an exemplary and non-limiting arrangement 2875 of a rotor 2805 comprising magnets 2815 (e.g., permanent and/or electromagnets) interacting with the coils 2820 of a stator 2810 arranged within the low pressure environment of the tube. As should be understood, the rotor 2805 is attached to a capsule (not shown). The stator 2810 is arranged for example, on or in a track (not shown) within the low pressure environment of the tube.

Figure 29:
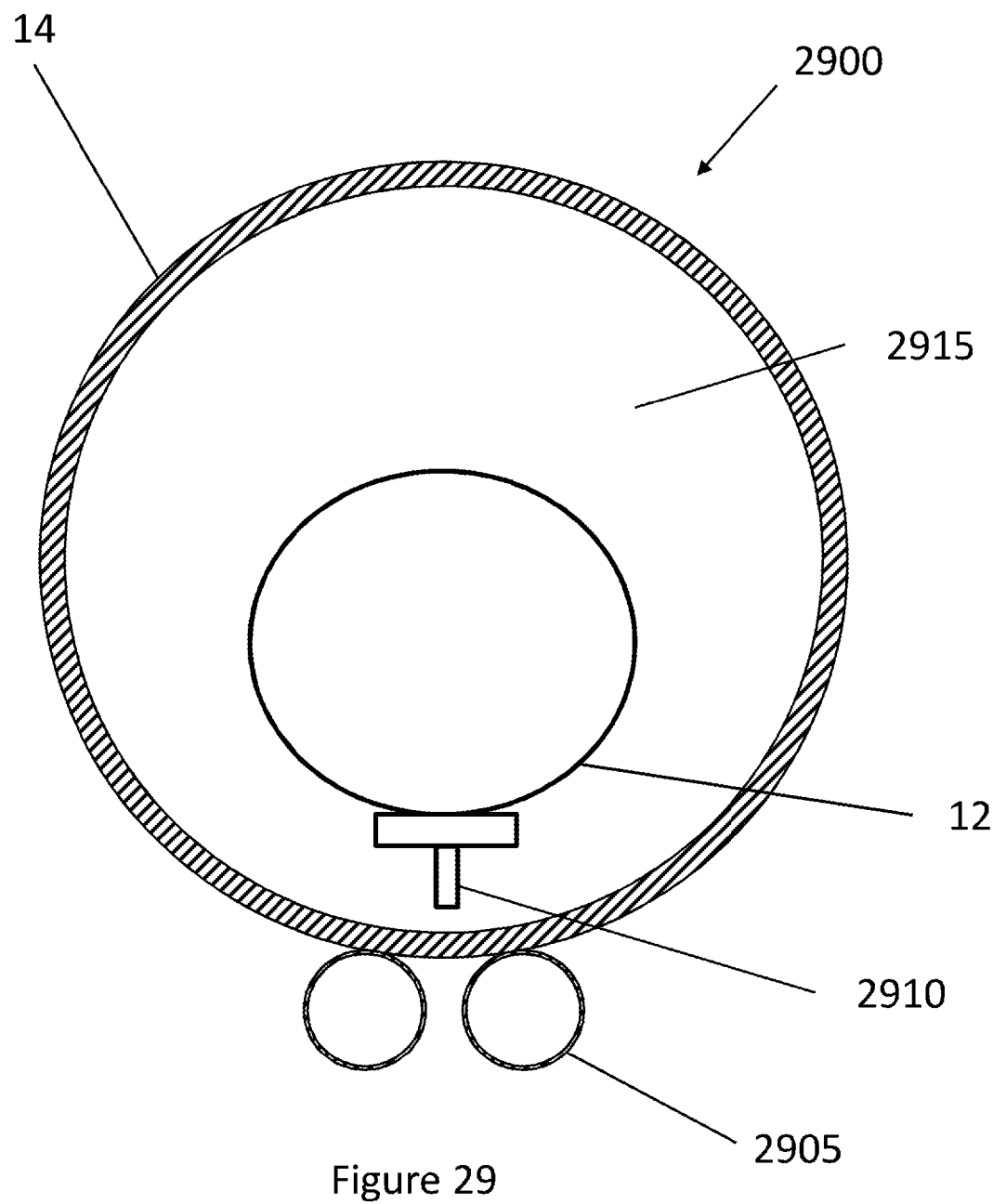
FIG. 29 is a schematic exemplary view of track and capsule propulsion elements for use in the transportation system in accordance with embodiments of the present disclosure.

FIG. 29 shows an exemplary and non-limiting embodiment of a track configuration 2900 in accordance with additional aspects of the disclosure. With this exemplary embodiment, tube-side electromagnetic elements 2905 (e.g., stator elements) are arranged outside the low-pressure tube environment 2915, and the electromagnetic motive force is applied through the tube wall. For example, as shown in FIG. 29, at least one propulsion element 2905 (e.g., stator element) is disposed adjacent to the outer surface of the tube 14. In the context of the present disclosure, a tube propulsion element should be understood as an element of the propulsion system located on or in the tube, and a pod propulsion element should be understood as an element of the propulsion system located on or in the capsule (or pod).

In the embodiment shown in FIG. 29, a pair of tube propulsion elements 2905 (e.g., stator elements) is provided on a bottom portion of the outer surface of tube 14. In embodiments, the tube propulsion elements 2905 may be fastened and/or welded to the outer surface of tube 14. A capsule (or pod) 12 is disposed within the low-pressure environment 2915 within the tube 14, and includes one or more pod propulsion elements 2910 (e.g., rotors). Pod propulsion elements 2910 are in electrical communication with tube propulsion elements 2805 such that electromagnetic force from the tube propulsion elements 2905 (e.g., stators) causes pod elements 2910 (e.g., rotors) to move the pod 12 through the tube 14 following the direction of the force.

By implementing these aspects of the disclosure, that is, by locating tube propulsion elements 2905 (e.g., stators) on an exterior of the tube 14, access to these elements may be much easier, thus improving serviceability of elements (e.g., power or propulsion systems) of the transportation system. Additionally, by implementing these aspects of the disclosure, construction of the tube and/or the tube propulsion elements may be simplified and costs may be reduced. Furthermore, in accordance with aspects of the disclosure, by locating tube propulsion elements on an exterior of tube 14, dissipation of thermal energy can be improved. The tube propulsion elements 2905 (e.g., stators) may generate large amounts of heat. In accordance with aspects of the disclosure, by locating tube propulsion elements 2905 (e.g., stators) on an exterior of the tube 14, for example, as shown in FIG. 29, the thermal energy is not released within the low-pressure environment of the tube 14, and the dissipation of the thermal energy can be improved.

In accordance with additional aspects of embodiments of the disclosure, by locating tube propulsion elements 2905 (e.g., stators) on an exterior of the tube 14, the location of the coils of the stators may be optimized (e.g., initially arranged and/or repositioned) after construction and/or placement of the tubes. For example, tube propulsion elements 2905 may be disconnected from a current position (e.g., by removing fasteners and/or welds) and repositioned in a new location. Repositioning of the tube propulsion elements 2905 may be undertaken, for example, if it is determined that a current location of the tube propulsion elements 2905 does not achieve the desired capsule velocity in a particular region of the tube. Additionally, by locating tube propulsion elements 2905 (e.g., stators) on an exterior of the tube 14, the placement of the stators may be adjusted or the numbers of stators supplemented to adjust for changing propulsion needs or conditions.

When the tube propulsion elements 2905 (e.g., stators) are located on an exterior of the tube 14, these tube propulsion elements 2905 are no longer within the low-pressure environment 2915 of the tube. As such, in accordance with additional aspects of the disclosure, by arranging at least some of the propulsion elements, e.g., the tube propulsion elements 2905, outside of the low-pressure environment 2915, while elements (e.g., pod elements 2910) within the low-pressure environment 2915 may need to be designed to properly function in the low-pressure environment, tube propulsion elements 2905 (e.g., stators) can be optimized for the ambient environment, which may reduce costs.

Figure 30A:
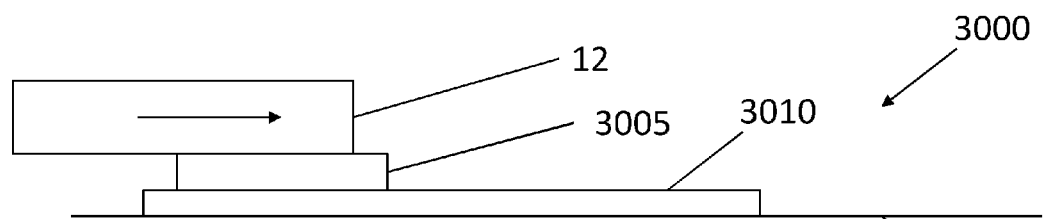
FIGS. 30A-30D are schematic exemplary views of propulsion elements for propelling the capsule for use in the transportation system in accordance with embodiments of the present disclosure.
Figure 30B:
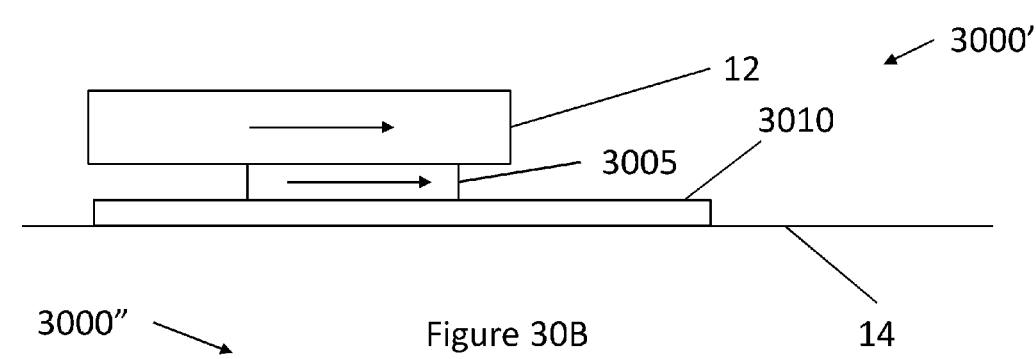
Figure 30C:
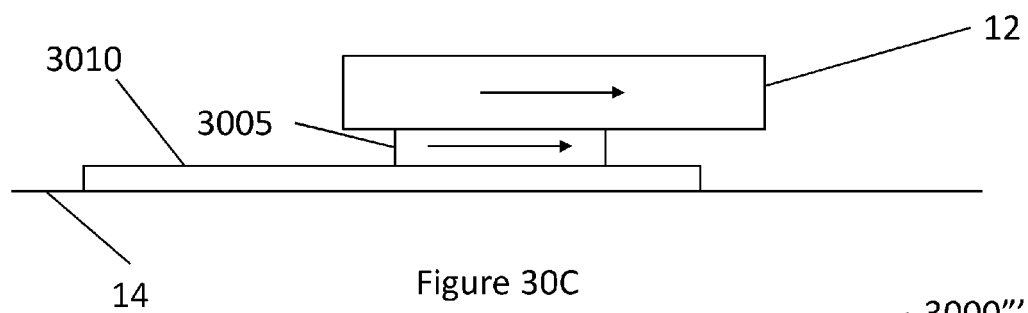
Figure 30D:
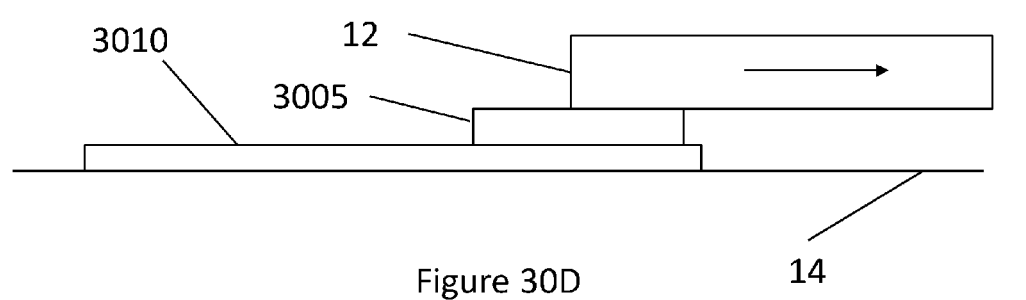

FIGS. 30A-30D schematically depict views of an embodiment of the present disclosure, in which the stator is arranged on the tube track on a stator track over which the stator can travel when providing a motive force to a passing capsule, in accordance with aspects of the disclosure. For example, as shown in FIG. 30A, in position 3000, a capsule 12 is traveling in a tube 14 in the indicated direction. A stator 3005 is arranged on a stator track 3010 attached to the tube 14. As the capsule 12 passes over the stator 3005, the rotor (not shown) of the capsule 12 interacts with the stator 3005 to propel the capsule 12. In accordance with aspects of the disclosure, as shown in FIG. 30B, as the capsule 12 continues to travel over the stator 3005 in position 3000', the stator 3005 is operable to move in (or on) the stator track 3010, e.g., using a motor, in the indicated direction, so as to travel with the capsule 12. As shown in FIG. 30C, as the capsule 12 continues to travel over the stator 3005 in position 3000", the stator 3005 continues to move in (or on) the stator track 3010 in the indicated direction, so as to continue to travel with (at least partially) the capsule 12. As shown in FIG. 30D, as the capsule 12 continues to travel over the stator 3005 in position 3000''', the stator 3005 moves in (or on) the stator track 3010 to a final position, after which the stator 3005 no longer travels with the capsule 12.

In accordance with aspects of the disclosure, by providing a moving stator, the distance-range over which a stator section is operable may be increased. For example, while it should be understood that the schematic depiction of FIGS. 30A-30D are not to scale, by arranging the stator 3005 to be movable on a stator track 3010, the effective range of the stator is increased from the length of the stator 3005 to approximately the length of the stator track 3010. After the position of FIG. 30D, the stator 3005 is operable to move back to its initial position in the stator track 3010 (for example, as shown in FIG. 30A).

Figure 31A:
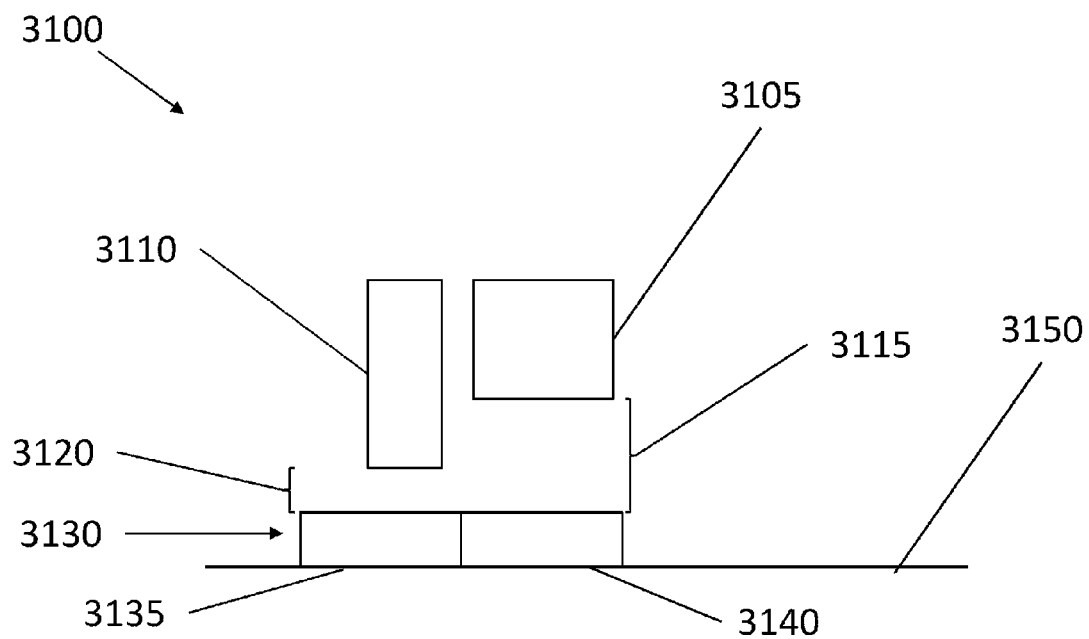
FIGS. 31A-31B are schematic exemplary views of levitation elements and wheel elements for supporting the capsule on (or above) the track for use in the transportation system in accordance with embodiments of the present disclosure.
Figure 31B:
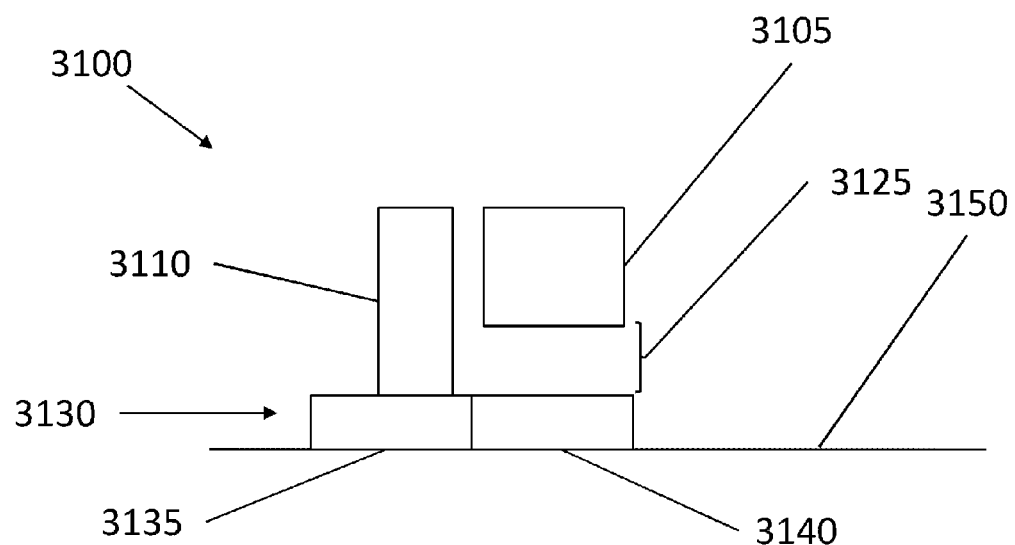

FIGS. 31A and 31B schematically depict views of an exemplary track engagement arrangement 3100 in accordance with embodiments of the present disclosure. As should be understood, the schematic illustrations of FIGS. 31A and 31B may only illustrate one side of the capsule, for example, if the capsule is configured to "ride" on two tracks. As shown in FIG. 31A, a levitation system 3105 (e.g., a Halbach array) is used to levitate the capsule (not shown) over the track 3130 arranged within a tube 3150. As shown in FIG. 31A, the track engagement arrangement 3100 also includes wheels 3110 structured and arranged for riding on the track 3135 when in the engagement position (as shown in FIG. 31B). In the position illustrated in FIG. 31A, the track engagement arrangement 3100 is suspended above the track 3130 utilizing the levitation system 3105 (e.g., a Halbach array). As shown in the position of FIG. 31A, the levitation system 3105 of the track engagement arrangement 3100 is suspended (or levitated) above the track 3130 by a distance 3115, which is sufficient large so as to provide a clearance 3120 between the wheels 3110 and the track, so that the wheels 3110 do not contact the track 3130.

As shown in the position of FIG. 31B, should the levitation system 3105 fail or be deactivated, for example, such that the levitation system 3105 does not levitate the capsule, the capsule will lower toward the track 3130, such that the wheels 3110 engage the track 3130, in accordance with aspects of the disclosure. As shown in FIG. 31B, when in the track engagement position, the wheels 3110 are structured and arranged to provide sufficient clearance 3125 for the levitation system 3105, so that the levitation system 3105 does not impact the track 3130. By utilizing the exemplary track engagement arrangement 3100, the capsule is provided with back-up or redundant capsule moving systems, should one fail to operate properly, for example. As shown in FIGS. 31A and 31B, the different sides of the track 3130 may be optimized for the particular capsule movement arrangement to be engaged with the track sections. For example, with the exemplary depiction of FIGS. 31A and 31B, section 3135 of the track 3130 may be optimized (e.g., made with a harder material or provided with a lubricant) for contact with the wheels 3110 of the capsule, whereas track section 3140 of the track 3130 may be optimized (e.g., made with a less expensive material) for interaction with the levitation system 3105 of the capsule.

As discussed above, embodiments of the present disclosure may utilize wheels on the capsule. In embodiments, the wheels may be structured and arranged in a "deployed" position, while being selectively spaceable (or distanced) from the track surface (e.g., due to operation of a levitation system). In additional contemplated embodiments, the wheels may be structured and arranged for occasional and/or temporary deployment, for example, from a recessed position.

Temperature Controlled Rail System

Additional aspects of the present disclosure are directed to a temperature controlled rail system. Rail systems for capsules traveling at the designed speeds may involve high thermal loads. Thus, aspects of the disclosure are directed to rail systems and train rail alignment methods, e.g., to a rail structured and arranged to accommodate for thermal expansion by using temperature controlled steel and/or thermoelectrics, for example, arranged within the track structure.

Figure 32:
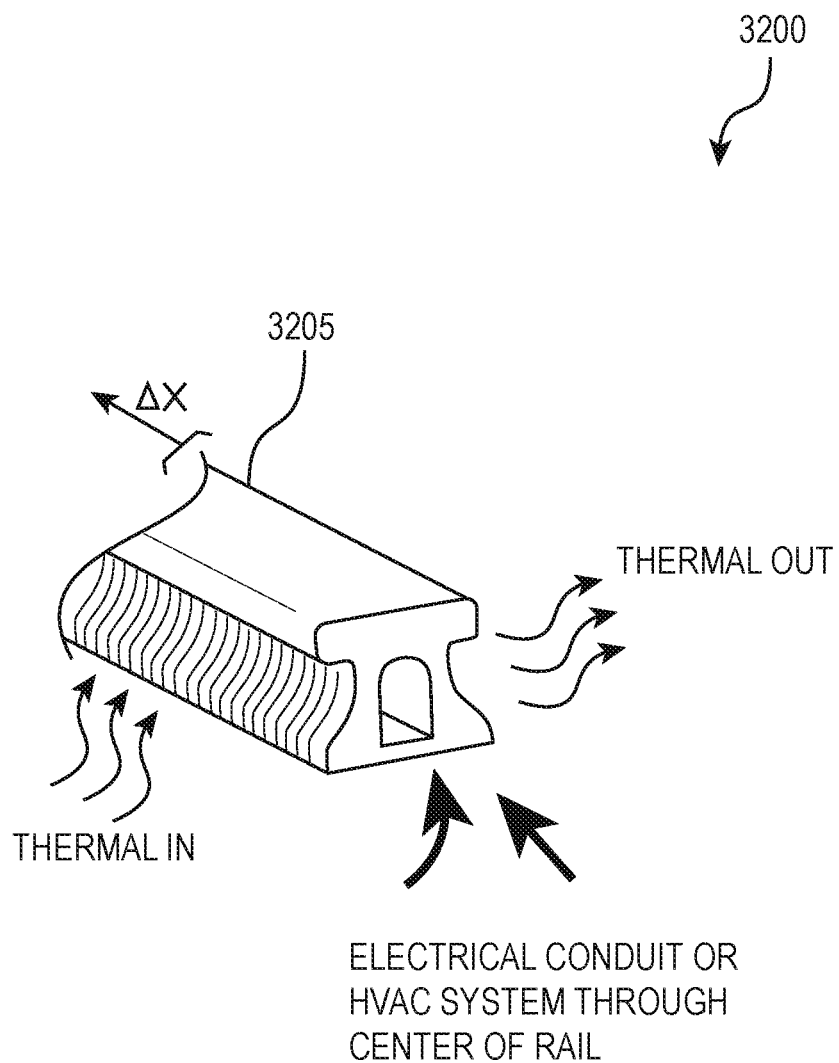
FIG. 32 is a schematic illustration of an exemplary track thermal control system for use in the transportation system in accordance with embodiments of the present disclosure.

In certain embodiments, as schematically depicted in FIG. 32, a temperature controlled rail system 3200 is operable to either cool or heat a track system 3205 located inside the tube structure. That is, the temperature controlled rail system 3200 may be operable to cool the track when cooling is necessary, and alternatively, heat the track when heating is necessary. In accordance with aspects of the disclosure, the system is structured and arranged to allow for thermal energy to be input or extracted from the track (e.g., stator track) into or from the safety rails (e.g., used in emergency situations involving wheels on the capsule) and/or laminate propulsion or levitation track structures. As depicted in FIG. 32, in embodiments, this may be accomplished, for example, by electrical input or by an HVAC type system arranged through a center of the rail.

In accordance with certain embodiments, it is important to ensure that each component inside the tube expands the same distance and magnitude to thus ensure alignment of all components. In an exemplary embodiment, the tube and track structure may be configured as a multi-layered tube having different components (e.g., steel tube, high precision track, concrete foundation, etc.), all of which may have their own intrinsic thermal expansion coefficient. As a result, different structural components may expand at varying degrees (with some structural components expanding drastically more than others). Expansion offsets can be extremely detrimental to the functionality of the transportation system, increasing the possibility of derailment and other critical failure events.

While railroads combat this issue by having gaps in the track to allow for thermal expansion, that solution does not suitably work in the present transportation system, as the gaps in the track may introduce a detrimental impulse/shock to the pod as it travels over such a gap. While buckling of a rail may not be a main issue, it is very important to take into account, as is dealing with problems resulting from the steel outer hull of the track being more than likely to expand much more drastically than the safety rails or a laminate propulsion or levitation structure.

Active Track Alignment System

Further aspects of the present disclosure are directed to an active track alignment system for the transportation system. Track misalignment, even on small scales, could be detrimental to the transportation system having capsules traveling at high speeds. For example, the effects of small deviations in the track would potentially be amplified by pods (or capsule) when encountered at high speeds.

In accordance with aspects of the disclosure, a track position detection system is configured to measure the deflection and/or deviation of the track, and a track adjustment system is operable to make deflection and/or deviation adjustments to the track in real-time. The track position detection system is configured to measure the deviations from true alignment, which can be caused by various reasons. In accordance with aspects of the disclosure, measurement readings could be taken, manipulated and processed using a control circuit and/or computer processor configured to calculate (e.g., quantify) how far the rails would have to be moved back into place.

The track adjustment system can comprise servo-mechanical systems structured and arranged to move the track back to alignment in accordance with the acquired data (e.g., in real time). In certain embodiments, the actuators may be structured and arranged to push and pull the rails laterally and/or lift and retract the rail vertically, as necessary, for example, to move the rails into proper position.

In certain embodiments, the active track alignment system may be located in the tube transportation system at points of relatively higher need for such adjustments, e.g., regions of higher seismic activity, regions of higher thermal activity, in proximity to track switching locations, along regions of the path subjected to higher G-forces, and/or other forces.

By implementing aspects of the present disclosure, track misalignment can be reduced or eliminated in a real time manner to ensure proper alignment of the rail(s) of the transportation system.

Rotating Pod Re-Orientating Skid

Additional aspects of the present disclosure are directed to a rotating pod re-orientating skid, e.g., a turntable. Slow pod turnover (e.g., the emptying of a pod or capsule in preparation for the pod's next trip) can produce a series of issues, such as but not limited to, decreased operating frequency, minimized profits, and wasted system energy expenditures. In accordance with aspects of the disclosure, a skid is structured and arranged to support a pod as it comes off of levitation rails, e.g., upon reaching location B from location A. The skid rapidly re-orientates a pod for the opposite tube (e.g., tube configured and/or designated for travel from location B to location A), for example, by laterally translating and rotating the pod (or capsule) on a central, vertical axis all while simultaneously loading it into the opposite tube. By implementing aspects of the disclosure, tube turn-around times may be significantly reduced.

Figure 33:
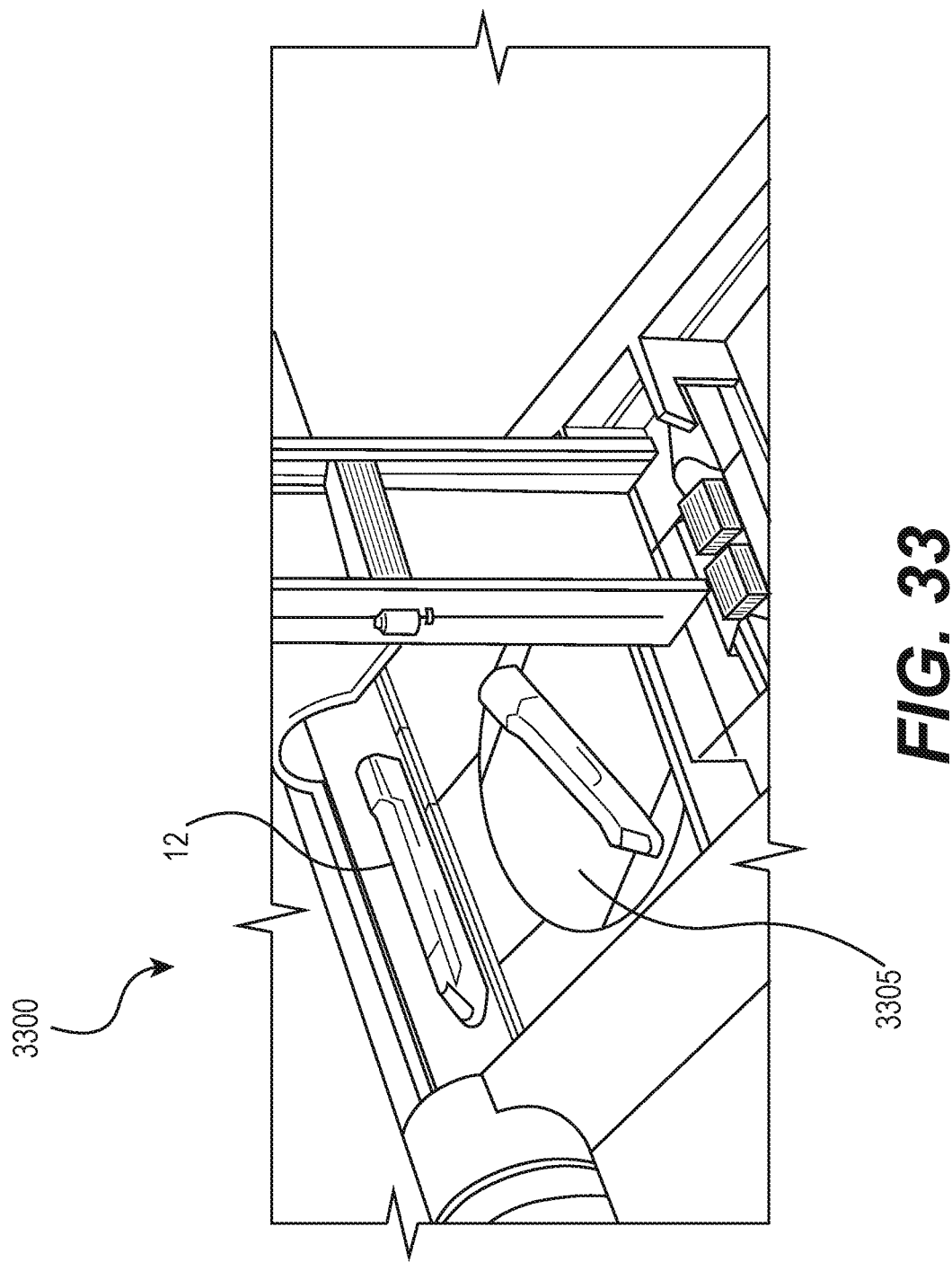
FIG. 33 is an illustration of an exemplary capsule reorientation system for use in the transportation system in accordance with embodiments of the present disclosure.

In accordance with aspects of the disclosure, the pod can be rapidly prepped for reuse. In one embodiment, for example, as depicted in FIG. 33, a pod reorientation system 3300 having a rotating capsule re-orientating skid 3305 may be structured and arranged to autonomously load and turn around the capsule(s) 12 without, for example, taking the capsules 12 to an additional storage bay for receiving and shipping. The rotating capsule re-orientating skid 3305 includes a suitable motor, positional sensors, and controls to actuate and control the rotation. As shown in FIG. 33, for example, once the capsule 12 has been unloaded (wherein the cargo containers are loaded on an elevator for transporting them to the surface) and after new cargo containers may be loaded onto the capsule 12 from the elevator, the capsule 12 is advanced to the rotating capsule re-orientating skid 3305. The rotating capsule re-orientating skid 3305 is operable to rotate the capsule approximately 180°, so as to reorient the capsule 12 for placement in the tube for resending the capsule 12 (e.g., back to where the capsule originated from).

Rotating Pod Loading/Unloading System

Further aspects of the present disclosure are directed to a revolver-styled, rotating pod loading/unloading system. As noted above, slow pod turnover (e.g., the emptying of a pod or capsule in preparation for the pod's next trip) can produce a series of issues, such as but not limited to, decreased operating frequency (e.g., decreased outgoing pod frequency), minimized profits, and wasted system energy expenditures.

Figure 34:
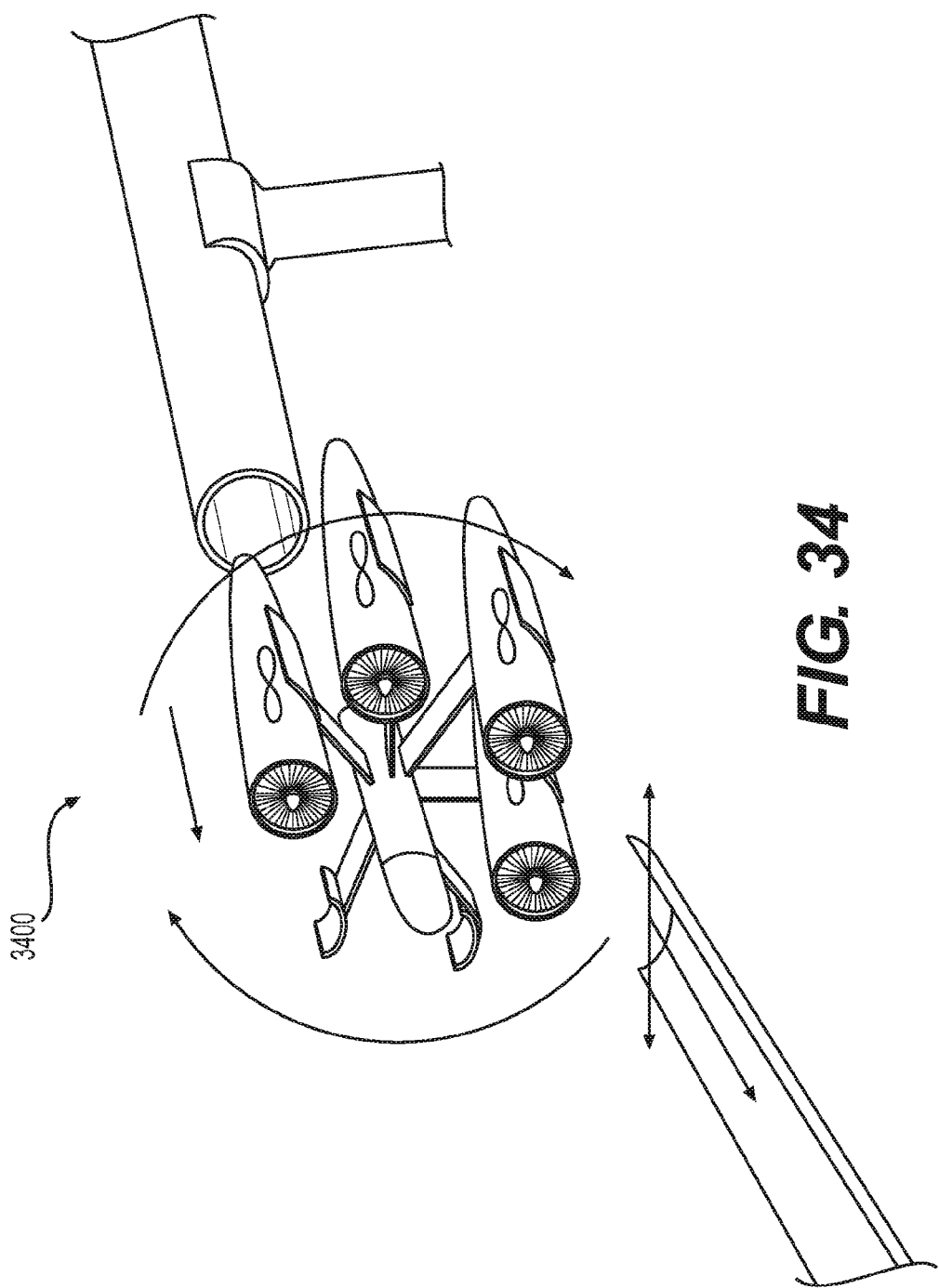
FIG. 34 is an illustration of an exemplary capsule loading system for use in the transportation system in accordance with embodiments of the present disclosure.

In accordance with aspects of the disclosure, as schematically depicted in FIG. 34, with a rotating pod loading/unloading system 3400, a large "wheel" pod support structure rotates, lifting recently prepared pods up to outgoing tube, while simultaneously receiving incoming pods and extracting cargo. The rotating pod loading/unloading system 3400 includes a suitable motor, positional sensors, and controls to actuate and control the rotation.

In such system, a pod (or capsule) can be rapidly prepped for reuse. The rotating capsule loading/unloading system is operable to autonomously load and unload cargo from the capsules, and place the capsules in outgoing/incoming tubes. By implementing such a system, a need for multiple tube entrances may be reduced.

Figure 35:
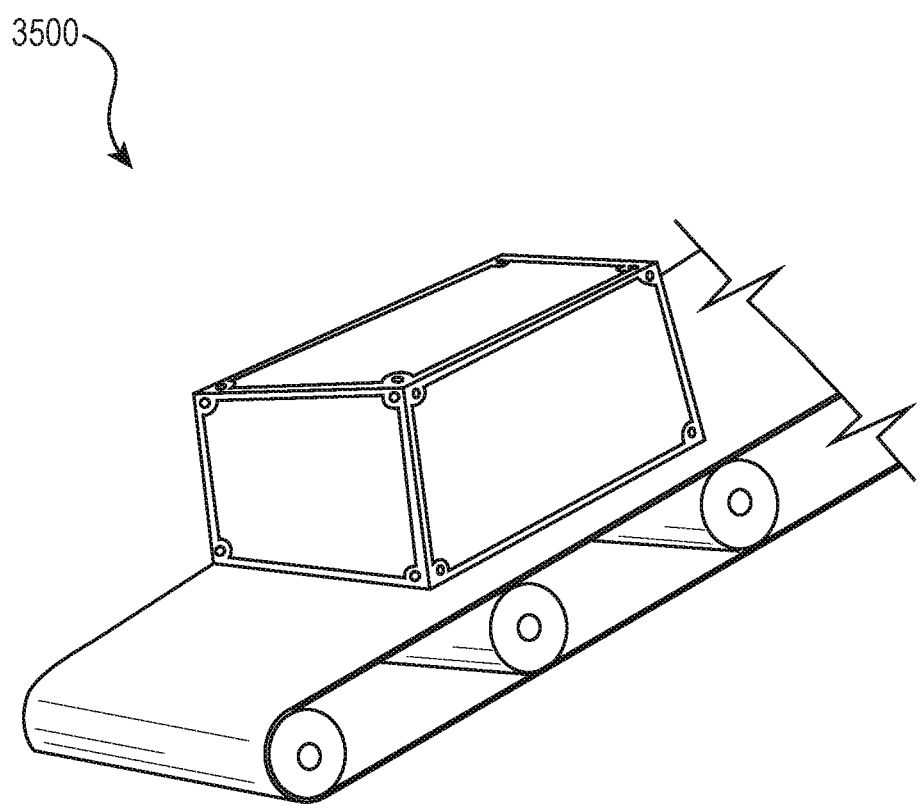
FIG. 35 is an illustration of an exemplary cargo loading system for use in the transportation system in accordance with embodiments of the present disclosure.

Further aspects of the present disclosure are directed to a system of mechanized cargo conveyor belts for rapid pod resupply. Crane-based cargo loading can be slow which will in turn create longer turnaround time and pod prep time, which can lower profit margins. In accordance with aspects of the present disclosure, a conveyor belt system facilitates the cargo preparation and loading procedures from start (e.g., receiving cargo) to finish (sending outgoing pods) and vice versa. In embodiments, as schematically depicted in FIG. 35, a belt 3500 is structured and arranged to queue and ready containers and rapidly drops them into passing capsules.

By implementing aspects of the present disclosure, loading the capsules using queued cargo containers on a belt can drastically decrease load times of the capsule, and thus increase outgoing pod frequency, and efficiency of the overall system.

Emergency/Maintenance Personnel Transportation Vehicle

Additional aspects of the present disclosure are directed to a personnel transportation vehicle to be utilized, for example, in emergencies or maintenance. In accordance with aspects of the disclosure, the transportation tube crosses vast swaths of land. As such, maintaining maintenance/emergency stations over a given (e.g., relatively short) distance may not be economically feasible. The farther away these maintenance/emergency stations are from each other, the slower the response time may be to emergencies.

In accordance with aspects of the disclosure, a safety vehicle is operable to ride the levitation rail, for example, for rapid travel to points of interest in tube. The vehicle may be used to carry, for example, maintenance gear, emergency supplies and/or personnel to a particular site within the tube. Such vehicle may be a pod that is configured to carry emergency/maintenance personnel and/or equipment instead of passengers or cargo. The emergency/maintenance personnel transportation vehicle may be arranged in one or more pre-determined locations along the tube (e.g., in auxiliary tube branches dedicated for accommodating and launching the emergency/maintenance personal transportation vehicle), such that it may be deployed from the closest launching branch when an emergency or maintenance issue arises.

In embodiments, the personal vehicles may utilize magnetic levitation (e.g., Halbach array) and/or alternative propulsion systems (e.g., auxiliary on-board propulsion systems). By implementing aspects of the disclosure, the vehicle would greatly increase response times, for example, to emergencies and quickly transport personnel to maintenance hot spots via the tube.

Figure 36:
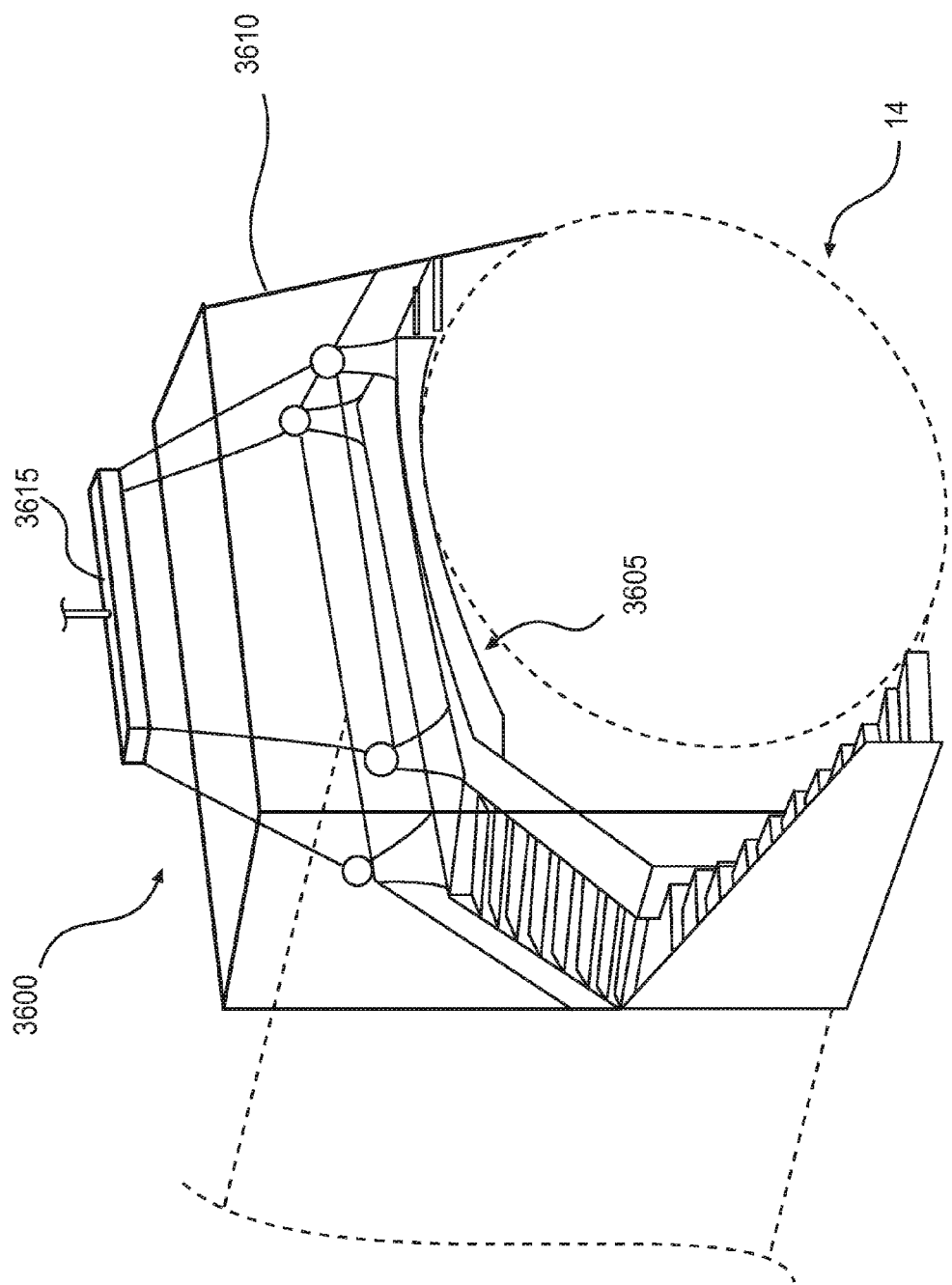
FIG. 36 is an illustration of an exemplary scaffolding system for use with the transportation system in accordance with embodiments of the present disclosure.

Movable, Tube Based, Circular/Saddle-Like Scaffolding Used in Tube Maintenance/Construction In the context of the transportation system described herein, further aspects of the present disclosure are directed to a movable, tube based, circular/saddle-like scaffolding, for example, for use in tube maintenance and/or construction environment. FIG. 36 depicts an exemplary embodiment of a scaffolding system 3600 in accordance with an aspect of the disclosure. The curvature of tube 14 may provide a difficult surface to work on, which may present safety issues, such as workers falling off, or having to work on tube underbelly.

In accordance with aspects of the disclosure, as schematically depicted in FIG. 36, a circular or saddle-like scaffolding 3600 can be placed on top of such a tube 14. This structure is able to support workers as they, for example, conduct repair and/or maintenance work on tube 14.

In embodiments, scaffolding system 3600 may be airlifted, e.g., via connection 3615, and placed directly on tube 14 and fastened thereto, thus providing an instant platform that could be used in a variety of applications, such as maintenance or rescue operations, for example. The scaffolding system 3600 may be attached to the tube, for example, using fabric or metal webbing wrapped and fastened around the tube and/or with fasteners or temporary welds. When tubes 14 are located on the ground any repairs may be easier to carry out. If the transportation tube 14 is suspended high off the ground, however, embodiments of the present disclosure may assist in positioning workers around the tube 14, while providing one or more stable and flat working surfaces 3605. In embodiments, the mobile scaffolding 3600 may also include barriers 3610 to provide protection from the elements (e.g., wind and precipitation). In further embodiments, the mobile scaffolding 3600 may be structured and arranged as a gas enclosure, so as to maintain an operating pressure in the tube 14 while it is accessed to receive maintenance.

Passive Electromagnetic Braking

Aspects of the present disclosure relate to a braking system for high speed vehicles (e.g., capsules), and more specifically to a system that uses electromagnetic drag to slow a vehicle. As discussed herein, a high speed, high efficiency transportation system utilizes a low-pressure environment in order to reduce drag on a vehicle at high operating speeds, thus providing the dual benefit of allowing greater speed potential and lowering the energy costs associated with overcoming drag forces. These systems use a near vacuum (or low-pressure environment) within a tubular structure. These systems may utilize any number of acceleration systems to achieve the high speed allowed, including linear motors, e.g., linear synchronous motors (LSM) and/or linear induction motors (LIM) in conjunction with, for example, electromagnetic levitation or fluid bearings. Due to the scale of the project, tremendous forces are required to accelerate the vehicle to the operating speed. Newton's Laws of Motion dictate that an equal force is necessary to slow the vehicle down when necessary, such as arriving at the terminal at the end of the route. Because of these high speeds, typical braking methods that operate by utilizing friction may be impractical. For example, current practices do not envision a method to create a sustainable frictional braking system designed to handle the immense stress that would be produced by this decelerating force because current transportation systems do not operate at the speeds that a partially-evacuated tubular system allows.

Figure 37:
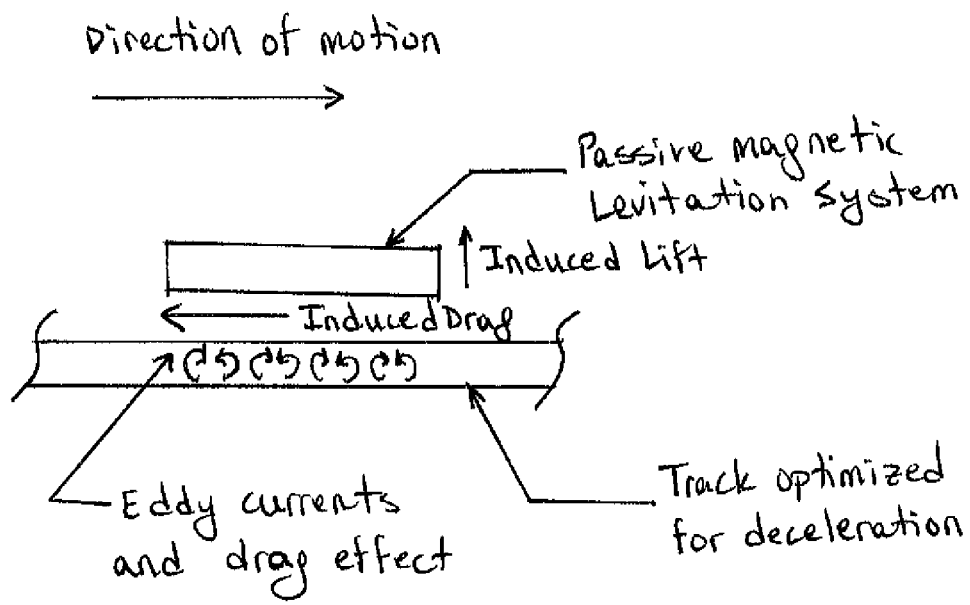
FIG. 37 is a schematic illustration of a passive electromagnetic braking system for use in the transportation system in accordance with embodiments of the present disclosure.

In accordance with aspects of the disclosure, as schematically illustrated in FIG. 37, embodiments of the present disclosure may utilize induced drag caused by eddy currents generated by the passive magnets of the levitation system to produce deceleration of the capsule. These eddy currents are normally an undesirable effect of a levitation system and thus, are reduced or eliminated. In accordance with aspects of the disclosure, however, during portions of the track where deceleration is required, the levitation system is designed and configured to maximize the inefficiency created by the eddy currents to capitalize on the induced drag in order to decelerate the vehicle. In accordance with aspects of the disclosure, by utilizing electromagnetic drag to slow the vehicle down, a safer braking is achieved. For example, braking using eddy currents is safer than conventional friction-based braking systems, as the eddy current braking system do not off-put (or transfer) frictional stress forces onto the vehicle and/or tubular structures.

Figure 38A:
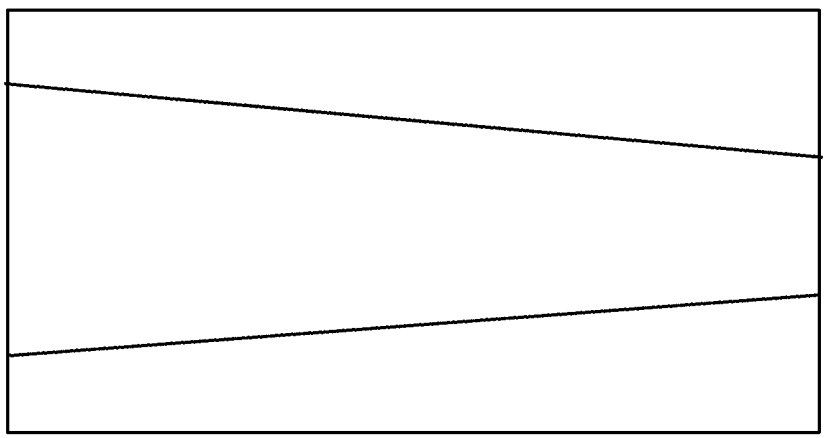
FIGS. 38A and 38B are schematic depictions of exemplary tube passage that is narrowing in accordance with embodiments of the present disclosure.
Figure 38B:
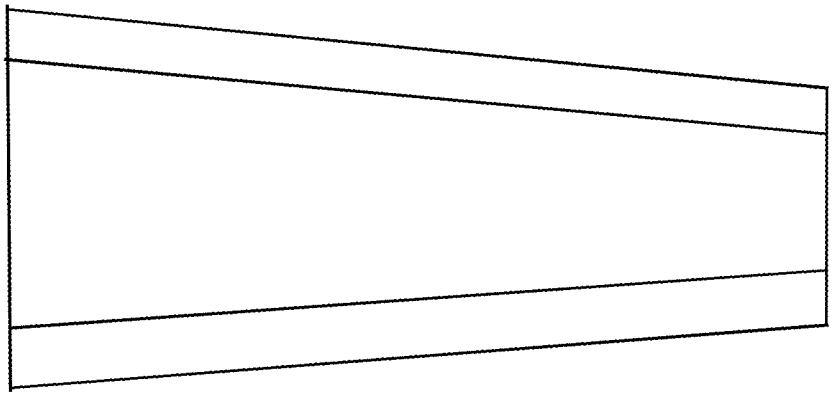

FIGS. 38A and 38B are schematic depictions of exemplary tube passage that is narrowing in accordance with embodiments of the present disclosure. As shown in FIG. 38A, with the exemplary sectional view of tube 3800, a tube passage may be narrowed by increasing the wall thickness of the tube while maintaining the same outer diameter of the tube. As shown in FIG. 38B, with the exemplary sectional view of tube 3850, a tube passage may be narrowed by decreasing the outer diameter of the tube while maintaining the same wall thickness of the tube. By forming the tube with one or more portions having differing wall thicknesses and/or diameters along a transportation route between stations, the airflow passage around the capsule within the tube may be varied to, for example, slow the vehicle through increased drag.

Passive Levitation System

As discussed herein, high-speed transportation systems may utilize any number of acceleration systems to achieve the high speed, including electromagnetic propulsion. Due to the scale of the transportation project, tremendous forces may be necessary to accelerate the vehicle to the operating speed. Due to the unprecedented nature of the sustained, ultra-high speed configuration of the system, the capsule may utilize a carriage that can withstand the frictional demands of the high-speed and high use.

Figure 39:
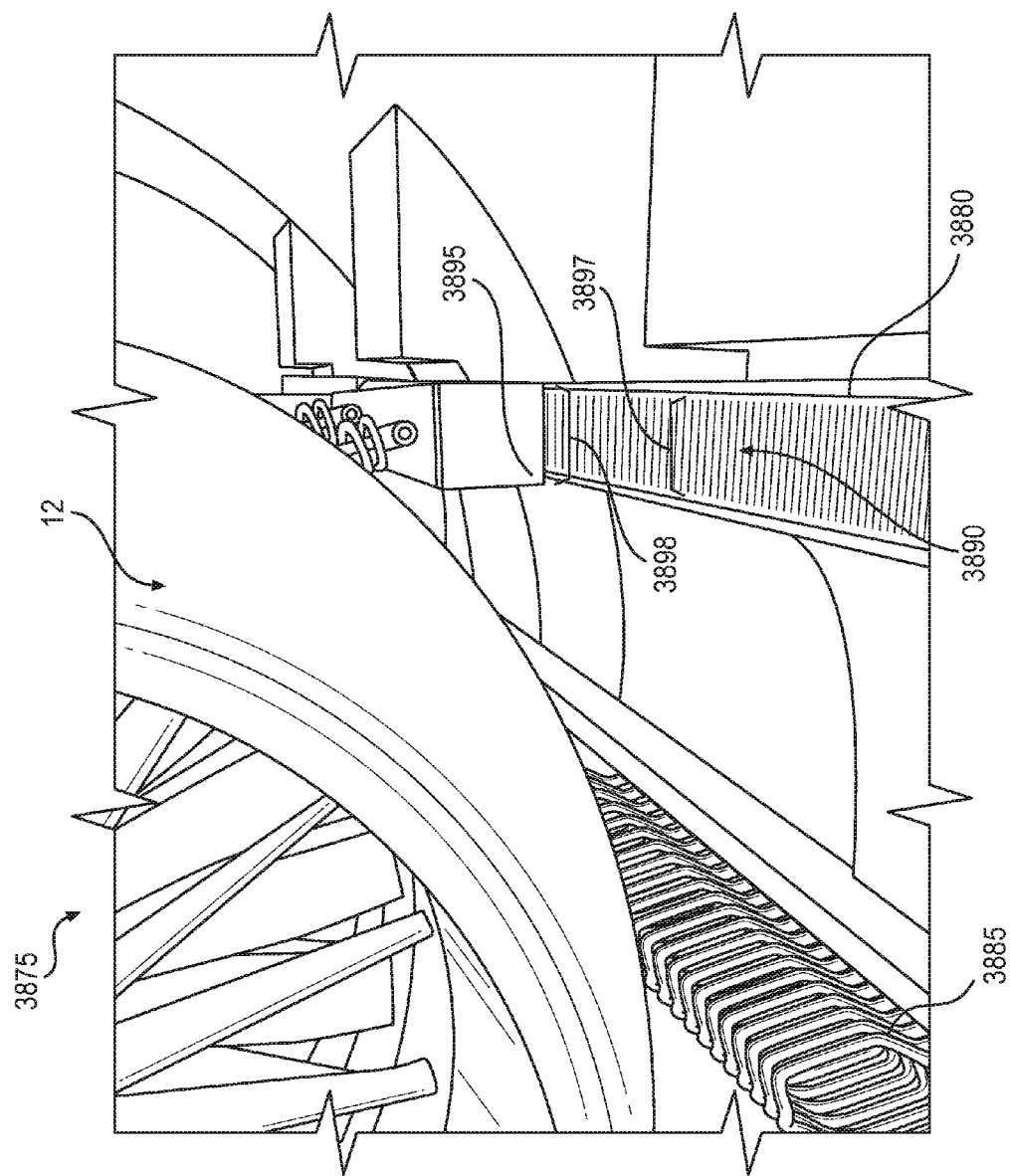
FIG. 39 is a depiction of an exemplary passive levitation system for use in the transportation system in accordance with embodiments of the present disclosure.

FIG. 39 depicts an exemplary embodiment of a passive levitation system 3875 in accordance with aspects of the disclosure. As shown in FIG. 39, a system is configured to utilize the magnetic force as lift, which is created when a magnet assembly 3895 attached to, e.g., a vehicle 12 (for example, a capsule), e.g., with a suspension system, passes at a certain velocity (via a propulsion system 3885) over a track 3880 in order to provide horizontal displacement between the vehicle 12 and the track 3880, thus generating a levitation force on the vehicle 12 that is derived from the velocity.

In one exemplary embodiment, the track 3880 is comprised of at least one section of laminated sheets of slotted conductor, wherein the slots 3890 have a length 3897 that is equal to or shorter than the width 3898 of the associated magnet assembly 3895 on the vehicle 12. In certain embodiments, the slots 3890 may be angled relative to the track 3880 and/or the magnet assembly 3895 in a direction of motion of the vehicle 12. The angle may be perpendicular or an angle more or less than perpendicular, e.g., 88° relative to the position of the track 3880 and/or magnet assembly 3895. In certain embodiments, the magnet assembly 3895 comprises of a plurality of magnets, such as permanent magnets, electromagnets, and/or superconducting magnets, which is configured in an array that optimizes the magnetic force that is generated by the interaction of the array of the magnet assembly 3895 and the track 3880 while in motion. A plurality of tracks 3880 may be used, each with an associated magnet assembly 3895 located on the vehicle 12.

Pre-Fabricated Metal Reinforcement for Pylons

In certain embodiments, the supports (or pylons) may include within a pre-fabricated metal reinforcement, e.g., a chain mail-styled, pre-fabricated metal reinforcement. The pylon construction can be slow, in turn, slowing the rest of fabrication and manufacturing for transportation system. In accordance with aspects of the present disclosure, pre-fabricated rolls of chain mail pylon reinforcement may be rapidly assembled, for example, either before the concrete for the pylons is poured or after the concrete is poured. In some embodiments, metal rods of varying gauge sizes and/or aramid fibers can be fabricated in a cross-stitched pattern and be embedded in cement. By implementing aspects of the present disclosure, the pre-fabricated metal reinforcement material can expedite manufacturing process and provide additional structural support to the sub-structure.

Monitoring Tube Integrity Using Aerial Vehicle

Managing, identifying, and locating leaks in tube system may be very difficult, especially on the size and magnitude of the transportation system. Aspects of the present disclosure are directed to a method for monitoring the transportation tube (or other low-pressure environment) integrity using an aerial vehicle, for example, a remotely-operated aerial vehicle (or drone). In some embodiments, a drone equipped with infrared imaging camera may be configured to fly along the transportation path and searching for thermal plumes (e.g., large thermal plumes) of leaked air. For example, in embodiments, a drone may be configured to autonomously fly the transportation route. Equipped with a FLIR (forward looking infrared), for example, the drone could fly high above tube and monitor heat profile of large sections of tube. For example, expelled or leaked gas from within the tube may have different heat signature than ambient air around tube. By implementing aspects of the present disclosure, leaks, which otherwise may be invisible to the naked eye, would be detectable as large plumes on the FLIR image. In embodiments, by flying at high altitudes, the imaging camera could provide larger scope of leaks in the tube system than conventional pressure transducers and measurement devices.

Laying Cables in the Transportation System

Proper cable/electrical line management and distribution will be an important to the success and longevity of the tube transportation system. Laying and replacing cables over such large distances may require a constant workforce and large amounts of monetary resources. Aspects of the present disclosure are directed to a system and apparatus for cable/electrical line management and distribution in the tube (or other low-pressure environment) transportation system. In an exemplary and non-limiting embodiments, a robot configured to traverse the tube, is also configured to transport and properly lay down lines of cables. In embodiments, a robot (or robotic vehicle) may be outfitted with large spool of wire/cable and with the capability of splicing and joining existing wiring. By implementing aspects of the disclosure, the cable-laying robot/vehicle could efficiently perform the task of laying wire autonomously, decreasing the manpower used to perform cable management and distribution. The tube profile of embodiments of the transportation system, e.g., obtuse tube profile, and the tubes possible remote location add difficulty to the task of laying and managing cable/wire. By implementing aspects of the disclosure, the difficult task would be alleviated by an autonomous cable-laying robot/vehicle. In embodiments, the robot (or robotic vehicle) may be configured to utilize the capsule transportation system to propel the robot (or robotic vehicle).

System Environment

Aspects of embodiments of the present disclosure (e.g., control systems for the tube environment, capsule control systems, tube orientation, tube switching systems) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
    a portable computer diskette,
    a hard disk,
    a random access memory (RAM),
    a read-only memory (ROM),
    an erasable programmable read-only memory (EPROM or Flash memory),
    an optical fiber,
    a portable compact disc read-only memory (CDROM),
    an optical storage device,
    a transmission media such as those supporting the Internet or an intranet,
    a magnetic storage device
    a usb key, and/or
    a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 40:
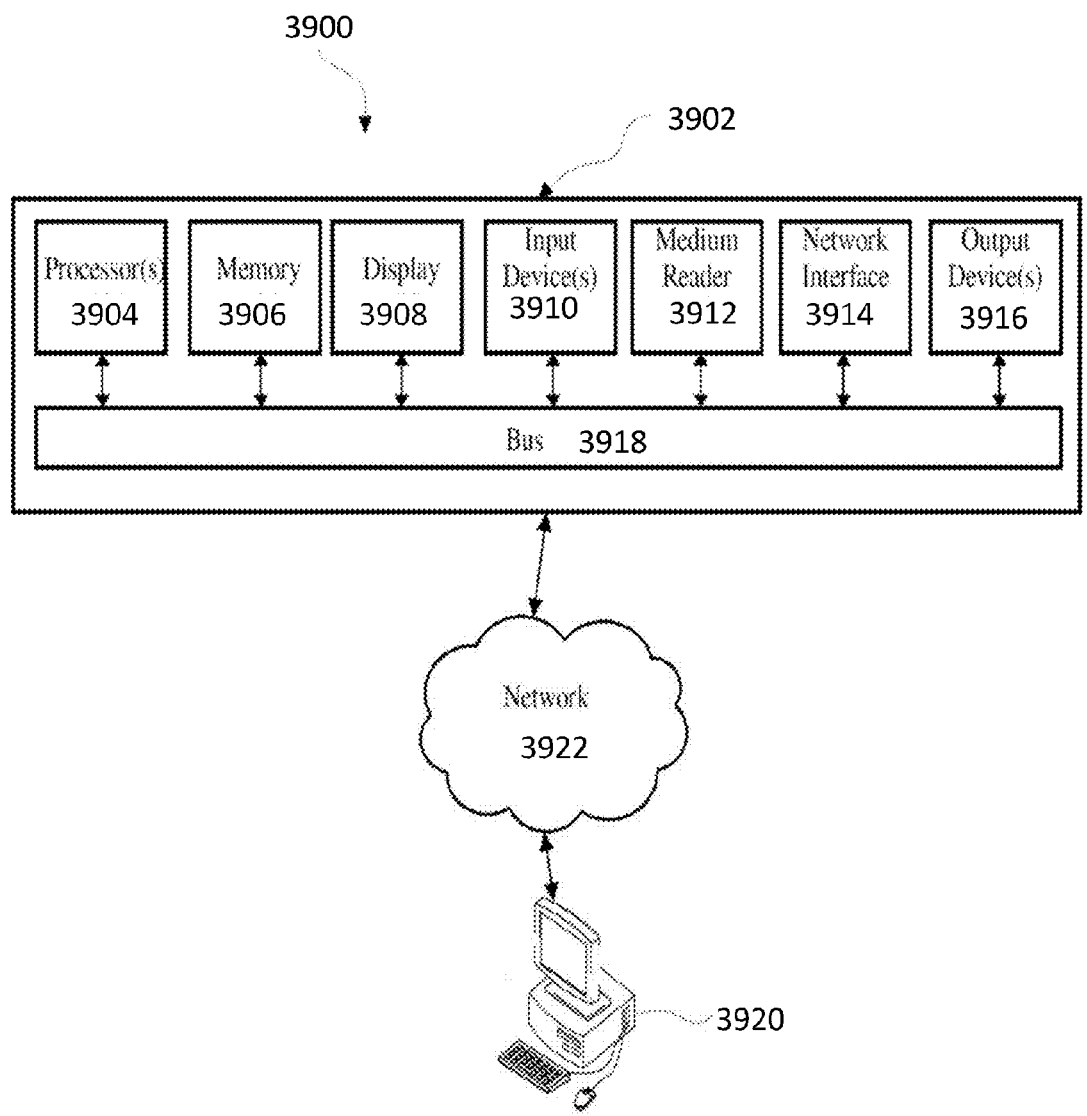
FIG. 40 is an exemplary system environment for use in accordance with the embodiments of control systems described herein.

FIG. 40 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 40, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 40, the computer system 3902 may include a computer display 3908, such as a liquid crystal display, an organic light emitting diode, a flat panel display, a solid state display, a cathode ray tube, a plasma display, or any other known display. The computer system 102 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 40. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. A high-speed transportation system, the system comprising:
    at least one transportation tube having at least one track;
    at least one capsule configured for travel through the at least one tube between stations;
    a propulsion system adapted to propel the at least one capsule through the tube;
    a levitation system adapted to levitate the capsule within the tube,
    wherein the at least one transportation tube is structured and arranged as a net-tension tube.

2. The high-speed transportation system of claim 1, wherein the at least one transportation tube comprises two tubes in a side-by-side configuration.

3. The high-speed transportation system of claim 1, wherein the at least one transportation tube comprises one tube with two discrete capsule passageways.

4. The high-speed transportation system of claim 1, wherein the at least one transportation tube comprises one tube with four discrete capsule passageways.

5. The high-speed transportation system of claim 1, wherein the at least one tube comprises a walkway configured for passengers arranged adjacent the track.

6. The high-speed transportation system of claim 1, wherein the at least one tube is formed from uniform thickness steel or a metal-composite material.

7. The high-speed transportation system of claim 1, further comprising a plurality of supports spaced along a path of the at least one tube to support the at least one tube at an elevation above ground.

8. The high-speed transportation system of claim 7, wherein the at least one tube is self-supporting between adjacent supports.

9. The high-speed transportation system of claim 7, further comprising a support structure arranged between adjacent supports, above the supports and beneath the at least one tube, wherein the support structure is self-supporting and supports the at least one tube between the adjacent supports.

10. The high-speed transportation system of claim 9, wherein each tube between adjacent supports is configured for handling dynamic forces expected within and outside the tube, and wherein the support structure between the adjacent supports is configured for handling the static forces of the weight of the tube and support structure and for dynamic forces acting within and outside the tube.

11. The high-speed transportation system of claim 1, wherein the at least one tube comprises an inner layer and an outer layer, with a middle layer between the inner layer and the outer layer.

12. The high-speed transportation system of claim 11, wherein the inner layer and the outer layer comprise a metal and the middle layer comprises a foam material.

13. The high-speed transportation system of claim 1, wherein the net-tensioned tube comprises at least one compression member extending between different points on an inner wall of the tube, the compression member creating a restrained load that induces tension in an outer wall of the tube.

14. The high-speed transportation system of claim 13, wherein the at least one compression member comprises two compression members positioned orthogonally relative to each other.

15. The high-speed transportation system of claim 1, wherein the at least one tube comprises a plurality of tube sections, wherein the tube sections comprise uniform tube configurations along a transportation route between stations.

16. The high-speed transportation system of claim 1, wherein uniform tube configurations comprise tubes having approximately the same outer diameter and wall thickness.

17. The high-speed transportation system of claim 1, wherein the at least one tube comprises a plurality of tube sections, at least some of the tube sections comprising differing tube configurations along a transportation route between stations.

18. The high-speed transportation system of claim 1, wherein the at least one tube comprises a uniform wall thickness and diameter along a transportation route between stations.

19. The high-speed transportation system of claim 1, wherein the at least one tube comprises one or more portions having different wall cross-sectional areas at different positions along a transportation route between stations so as to vary an airflow passage around the capsule within the tube.

20. The high-speed transportation system of claim 19, wherein the different wall cross-sectional areas are created by different wall thicknesses at the different positions.

21. The high-speed transportation system of claim 19, wherein the different wall cross-sectional areas are created by different tube diameters at the different positions.

22. The high-speed transportation system of claim 1, wherein the at least one tube comprises one or more portions having different wall thicknesses configured for different expected loads.

23. A high-speed transportation system, the system comprising:
   at least one transportation tube having at least one track;
   at least one capsule configured for travel through the at least one tube between stations;
   a propulsion system adapted to propel the at least one capsule through the tube;
   a levitation system adapted to levitate the capsule within the tube,
   wherein the at least one tube comprises an inner layer and an outer layer, and a middle layer positioned between the inner layer and the outer layer, and
   wherein the at least one transportation tube is structured and arranged as a net-tension tube.

24. The high-speed transportation system of claim 23, wherein the inner layer is selected and/or configured for exposure to an interior environment of the tube and the outer layer is selected and/or configured exposure to an exterior environment of the tube.

25. The high-speed transportation system of claim 23, wherein the inner layer and the outer layer comprise metals and the middle layer comprises a foam material.

26. The high-speed transportation system of claim 25, wherein the foam material comprises a foamed metal material.

27. The high-speed transportation system of claim 25, wherein the foam material at least one of reduces thermal conductivity, increases stiffness, increases strength, and reduces weight of the tube.

28. A method of manufacturing a tensioned tube comprising an inner wall and an outer structure, the method comprising:
   expanding the inner wall through a loading process;
   attaching the outer structure to the expanded inner wall as the loading process is completed, creating a net compression state in the outer structure and a net tension state in the inner wall.

29. The method of claim 28, wherein the loading process comprises applying at least one of internal pressure and heat to the inner wall.

* * * * *